United States Patent [19]
Mizutani et al.

[11] Patent Number: 5,583,494
[45] Date of Patent: Dec. 10, 1996

[54] TRAFFIC INFORMATION DISPLAY SYSTEM

[75] Inventors: Yoshisada Mizutani; Masaharu Umezu; Hiroaki Ideno, all of Hyogo, Japan

[73] Assignee: Mitsubishi Denki Kabushiki Kaisha, Tokyo, Japan

[21] Appl. No.: 421,030

[22] Filed: Apr. 13, 1995

Related U.S. Application Data

[63] Continuation of Ser. No. 894,722, Jun. 4, 1992, abandoned.

[30] Foreign Application Priority Data

Jun. 13, 1991 [JP] Japan .................................. 3-167458
Sep. 30, 1991 [JP] Japan .................................. 3-276211

[51] Int. Cl.[6] ................................................ G08G 1/123
[52] U.S. Cl. ...................... 340/995; 340/990; 364/449.1
[58] Field of Search .................................. 340/990, 995, 340/988, 905; 364/444, 449

[56] References Cited

U.S. PATENT DOCUMENTS

| | | | |
|---|---|---|---|
| 4,937,752 | 6/1990 | Nanba et al. | 340/995 |
| 4,963,865 | 10/1990 | Ichikawa et al. | 340/995 |
| 5,107,433 | 4/1992 | Heldörfer et al. | 340/995 |
| 5,168,452 | 12/1992 | Yamada et al. | 340/995 |
| 5,220,507 | 6/1993 | Kirson | 340/995 |
| 5,257,023 | 10/1993 | Furuya | 340/995 |
| 5,272,638 | 12/1993 | Martin et al. | 340/995 |
| 5,285,391 | 2/1994 | Smith, Jr. et al. | 340/995 |
| 5,293,163 | 3/1994 | Kakihara et al. | 340/995 |

FOREIGN PATENT DOCUMENTS

| | | |
|---|---|---|
| 63-11985 | 1/1988 | Japan . |
| 63-271109 | 11/1988 | Japan . |
| 2-141611 | 5/1990 | Japan . |

Primary Examiner—Brent A. Swarthout
Attorney, Agent, or Firm—Burns, Doane, Swecker & Mathis, LLP

[57] ABSTRACT

The present invention relates to a traffic information display system mounted on a vehicle to provide a map which is easy to see and which permits the driver of the vehicle to recognize the present position of the vehicle, etc. A control means used in this system determines a road on which the vehicle is present, on the basis of an output provided from a present position and direction detecting means, and fetches plural road data including the said road from a map information memory means. Then, the control means transforms the coordinates of start and end points of each road present in the road data into coordinates on a display screen, and provides those coordinates and a command to connect the start and end points using a straight line to a deformed map preparing means. The deformed map preparing means displays the road between each start point and each end point using a straight line, thereby providing a map which is easy to understand for the driver.

13 Claims, 78 Drawing Sheets

| NAVIGATION ID | ROAD SECTION TABLE | INTERSECTION SECTION TABLE | PICTURE ID 1/25,000 ENLARGED | PICTURE ID 1/50,000 | PICTURE ID 1/100,000 REDUCED | ROAD SECTION DATA | INTERSECTION SECTION DATA | POLYGON DATA | LINE DATA | CHARACTER DATA | LETTER DATA | INTERSECTION DATA |
|---|---|---|---|---|---|---|---|---|---|---|---|---|

LAYER 4 (INTERSECTION DATA)

LAYER 3 (LETTER DATA)

LAYER 2 (CHARACTER DATA)

LAYER 1 (LINE DATA)

LAYER 0 (POLYGON DATA)

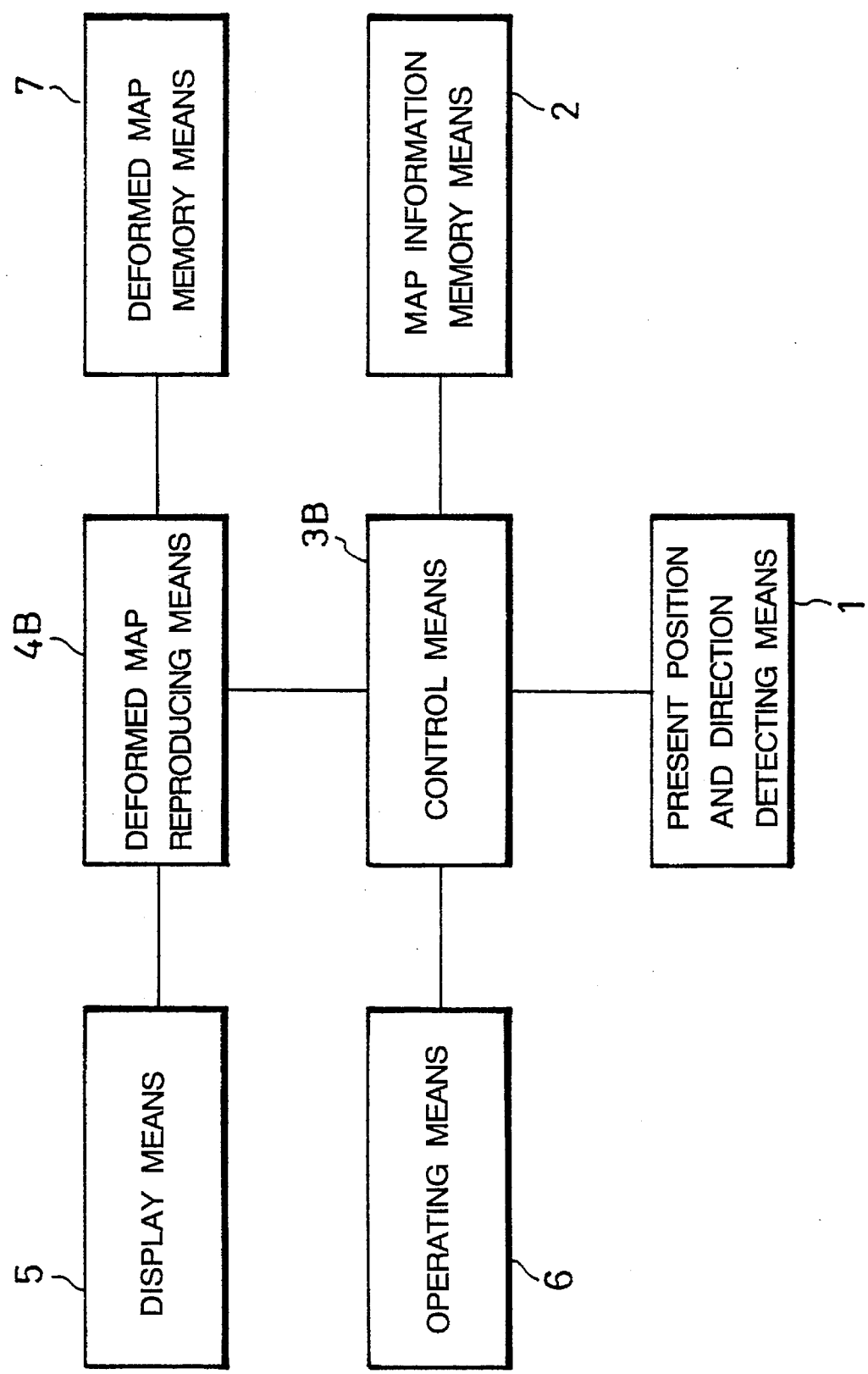

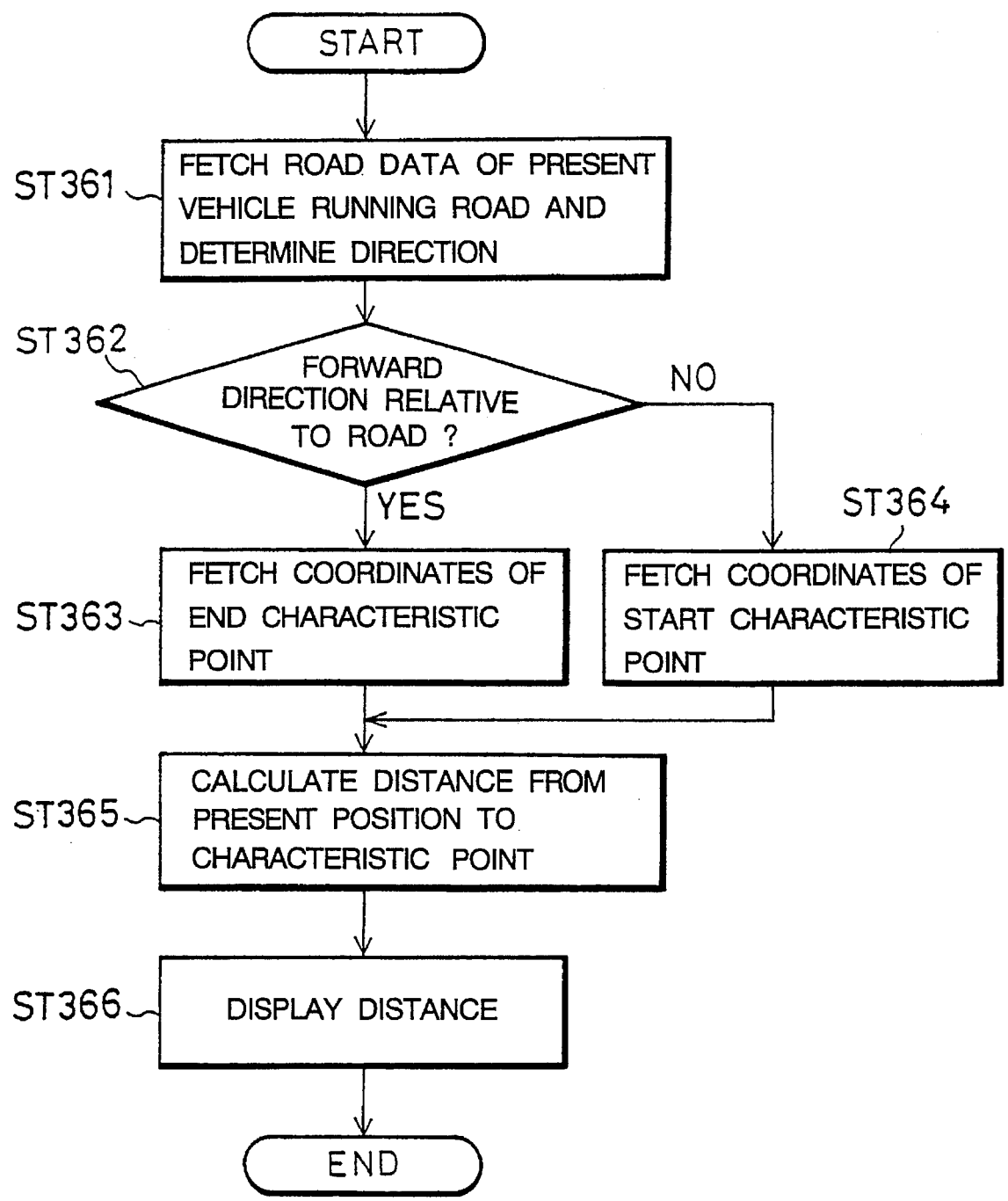

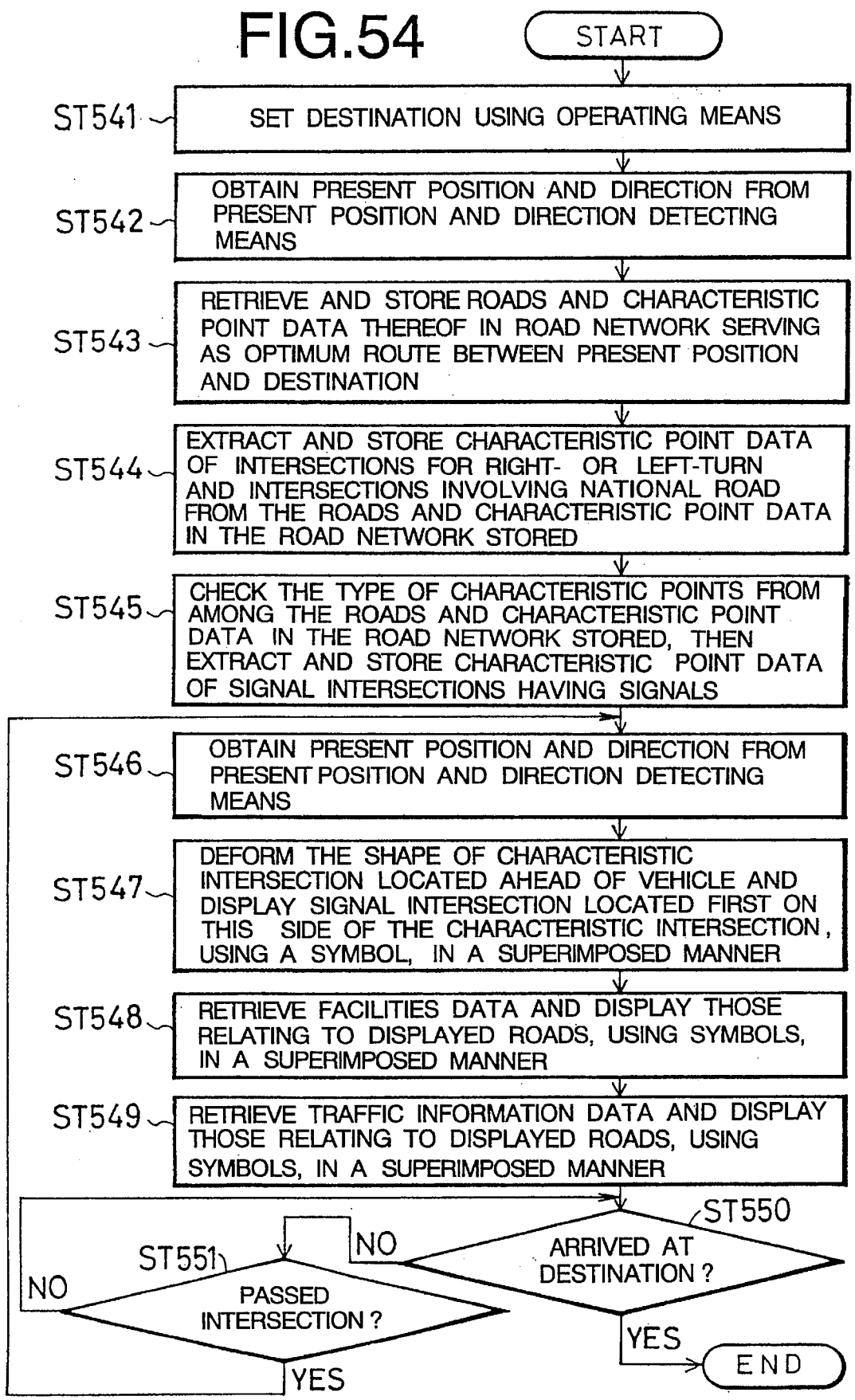

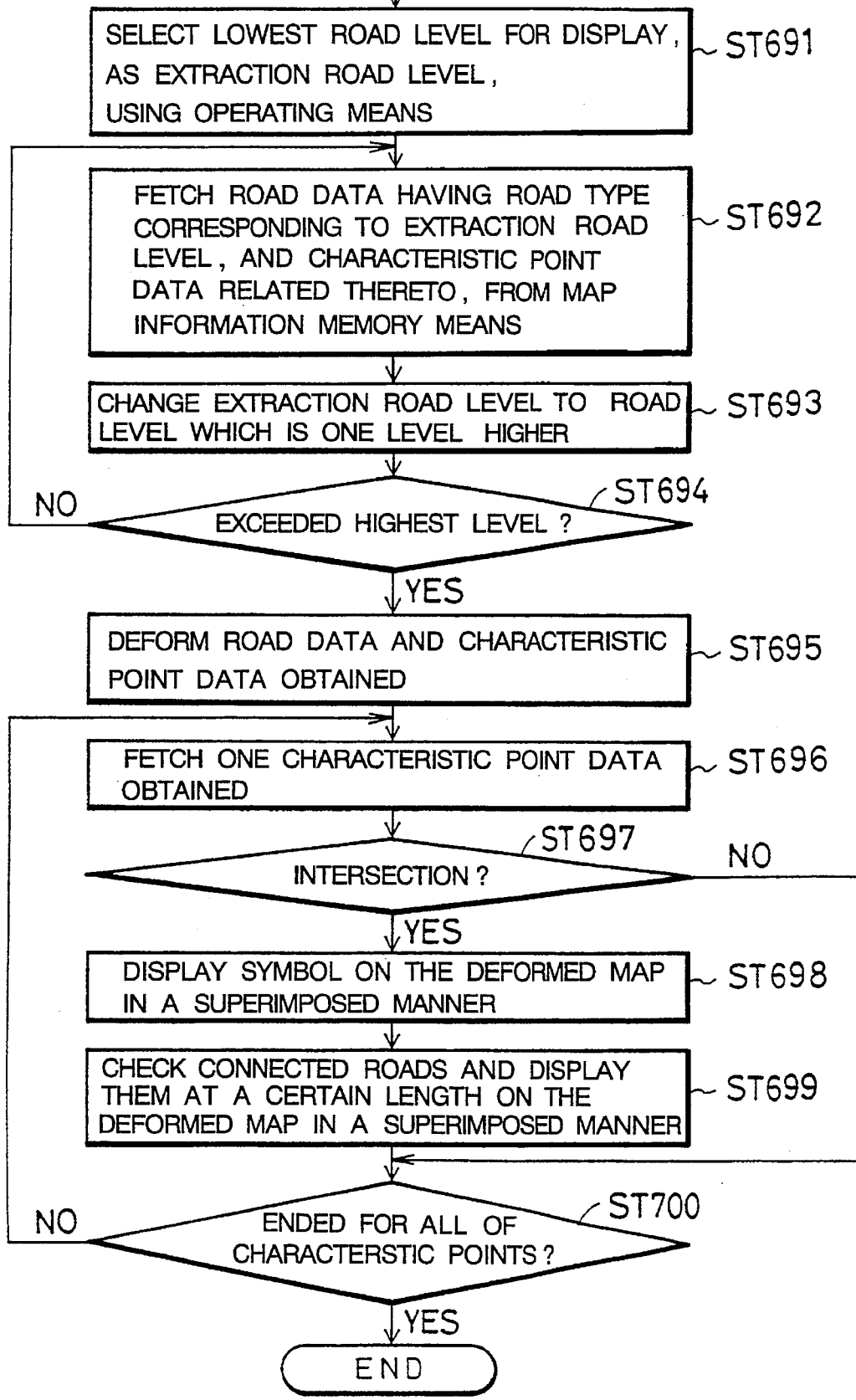

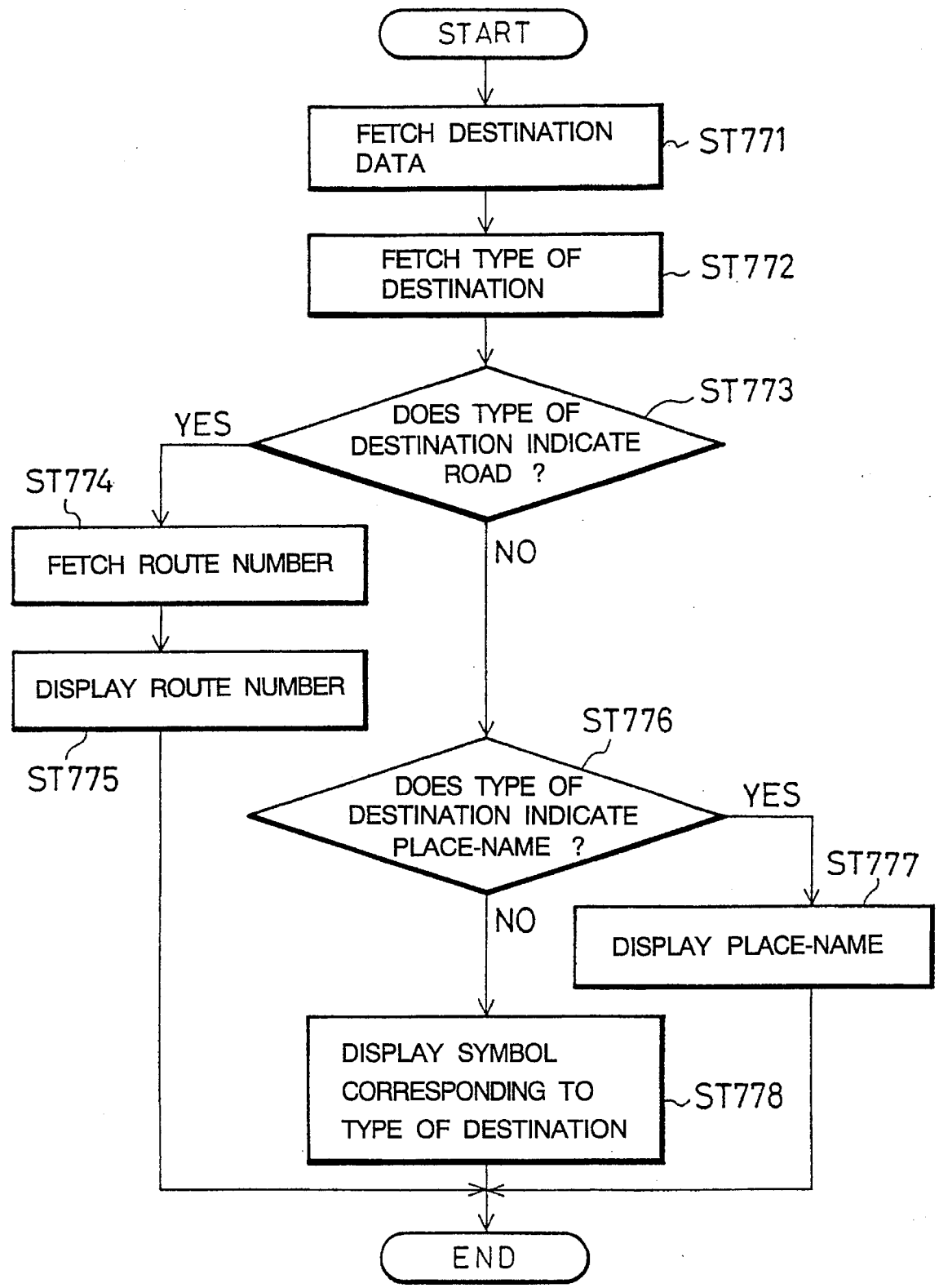

```
MENU OF DESTINATION SELECTING MODE

1. IMPORTANT PLACE PRIORITY MODE

2. SHORT DISTANCE PRIORITY MODE

3. COMPOSITE MODE
```

TRAFFIC INFORMATION DISPLAY SYSTEM

This application is a continuation of application Ser. No. 07/894,722, filed Jun. 4, 1992 and now abandoned.

BACKGROUND OF THE INVENTION

1. Field of the Invention

The present invention relates to a traffic information display system mounted on a vehicle such as an automobile to present map information, etc. to the user, e.g. a driver.

2. Description of the Prior Art

FIG. 1 is a block diagram showing a conventional traffic information display system mounted on an automobile, disclosed in Japanese Patent Laid Open No. 11985/88 for example. In the same figure, the reference numeral 11 denotes an earth magnetism sensor for detecting an earth magnetism and thereby detecting an advancing direction of the vehicle; numeral 12 denotes an angular velocity sensor for detecting an angular velocity of the vehicle; numeral 13 denotes a running distance sensor for detecting a running distance of the vehicle; and numeral 14 denotes a global positioning system (GPS) which receives radio waves from plural artificial satellites and checks the present position, etc.

Numeral 20 denotes a system controller. The system controller 20 includes an interface 21 which receives outputs of the earth magnetism sensor 11, etc.; a CPU 22 which performs, for example, the calculation of a moving distance of the vehicle; a ROM 23 in which is stored a program to be executed by the CPU 22; a RAM 24 for temporarily storing data necessary for the execution of the program; a recording medium 25 constituted by, for example, CD-ROM or IC card, with digitized map information (map data) stored therein; a graphic memory 26 constituted by a video RAM for example; and a graphic controller 27 which prepares a map in the graphic memory 26 on the basis of graphic data fed from the CPU 22 and displays the map on a display unit 5. Numeral 28 denotes an input device, e.g. keyboard.

FIG. 2(A) shows an example of map data stored in the recording medium 25. This data is concerned with one area (called "unit") after the division of a predetermined area into a predetermined number of small areas (e.g. 256 areas). A navigation ID is an ID of this unit. The map data has such a hierarchical structure as shown in FIG. 2(B).

A road section table, an intersection table and three picture ID areas, which are shown in FIG. 2(A), are tables for control, and other road section data, etc. are effective map data.

A polygon data shown in the same figure is prepared in such a manner as illustrated in FIG. 3. A sea-land boundary in the unit, the contour of a park, etc. are approximated polygonally, and coordinates of the vertex of the polygon are determined as polygon data. A line data shown in FIG. 2(A) is prepared in such a manner as illustrated in FIG. 4. Roads, railway, etc. in the unit are approximated as a polygonal line and coordinates of the vertex of the polygonal line are determined as line data. Coordinates of intersections in the unit are used as intersection data. Further, coordinates and the kind of characters and letters required in the unit serve as character data and letter data.

The unit is divided into a large number of sections (e.g. 16). A set of start point coordinates and end point coordinates of straight lines representing roads, etc. in each section serves as road section data, and a set of coordinates of intersections in each section serves as intersection section data. In the road section table a leading address is set in the recording medium 25 of the road section data corresponding to each section. In the intersection section table a leading address is set in the recording medium 25 of the intersection section data corresponding to each section. In the three picture ID areas address data showing the polygon data portion, line data portion, character data portion and letter data portion are set which are required in the case of displaying the unit on respective scales.

The operation of this conventional system will now be described. The CPU 22 receives outputs of the earth magnetism sensor 11, angular velocity sensor 12, running distance sensor 13 and GPS 14 through the interface 21, then calculates the present position and a running direction of the vehicle on the basis of those outputs and the intersection data stored in the recording medium 25.

Next, the CPU 22 determines the unit in which the present position of the vehicle is present, and prepares a map according to the scale which has been input from the input device 28. In other words, the CPU inputs polygon data, etc. of that unit and prepares a map on the basis of those data. Further, a symbol representing the present position of the vehicle is added onto the map. Then, graphic data which constitute the map thus prepared are output to the graphic controller 27, which in turn plots images onto the information graphic memory 26 on the basis of the graphic data thus provided. The images on the graphic memory 26 are displayed on the display unit 5.

Since the conventional traffic information display system is constructed as above, the following problems have been involved therein:

(1) A complicated road map is displayed on the display unit 5, so when this display is presented to the vehicular driver, it is not easy for the driver to recognize the present position of the vehicle. Particularly, since the on-vehicle display is mounted in the peripheral portion of the dash board so as not to be an obstacle to driving and so as to facilitate the driver's recognition of the display, the display size is 6 to 9 inches at most, thus making it more difficult for the driver to recognize the present position.

(2) Since the destination of the road along which the vehicle is running is not displayed on the display unit 5, the driver feels uneasy. When the destination is to be displayed in the conventional system, it is required to retrieve line data, letter data, etc. in the map data through a complicated process.

(3) Since only two-dimensional displays are made on the display unit 5, it is impossible to distinguish between an at-grade intersection and a solid intersection (grade separation), so the driver cannot recognize the identity between the display on the display unit and the outside scenery, sometimes resulting in the driver feeling uneasy.

SUMMARY OF THE INVENTION

The present invention has been accomplished for eliminating the above-mentioned problems, and it is an object of the invention to provide a traffic information display system capable of presenting a map to a driver so that the driver can recognize the present position, etc. more quickly and easily.

It is another object of the present invention to provide a traffic information display system capable of providing a map on which a destination corresponding to each road can be displayed quickly and accurately.

It is a further object of the present invention to provide a traffic information display system capable of providing a map which permits the recognition of a vertical relation between plural roads and also permits a driver to exactly recognize the identity between display and an actual scenery.

The traffic information display system according to the present invention has any of the following constructions:

(a) A construction including a map information memory means having road data involving information which represents start and end points of each road and also having characteristic point data involving coordinates relating to start and end points of each road; a control means which fetches coordinates of start and end points of roads in a predetermined area from the map information memory means and transforms them into display coordinates; a deformed map preparing means which receives the display coordinates of start and end points, sets a straight line between each pair of start and end points and prepares a map for display; and a display means for displaying the map prepared by the deformed map preparing means.

(b) A construction including a deformed map memory means having road data involving start point display coordinates and end point display coordinates of each road; a control means which determines a display area; a deformed map reproducing means which receives the start point display coordinates and end point display coordinates of each road in the thus-determined area from the deformed map memory means, sets a straight line between each pair of start and end points and prepares a map for display; and a display means for displaying the map prepared by the deformed map reproducing means.

(c) A construction including a map information memory means having road data involving information which represents start and end points of each road and the type of each road and also having characteristic point data involving coordinates relating to start and end points of each road; a control means which fetches road data of roads present in a predetermined area, as well as the coordinates of start and end points of each road and the type of the road from the map information memory means, then determines a display width of each road and a symbol size of the start and end points of each road on the basis of the type of the road, transforms the start and end point coordinates into display coordinates, then assumes a lattice having spacings larger than the display width of each road and the symbol size of the start and end points of each road, and further performs a coordinate transformation into coordinates closest to display coordinates after the transformation out of the intersections of the lattice; a deformed map preparing means which receives the display coordinates after the transformation into intersection coordinates on the lattice as well as the display width of each road and the symbol size of the start and end points of each road, then sets a straight line of a width corresponding to the display road width between each pair of start and end points, and preparing a map for display having the start and end points of each road represented by symbols of a size corresponding to the determined symbol size; and a display means for displaying the map prepared by the deformed map preparing means.

(d) A construction including a present position and direction detecting means for detecting a present position and a moving direction of a vehicle; a map information memory means having road data involving information which represents start and end points of each road and the type of each road, also having characteristic point data involving coordinates of start and end points of each road, and further having facilities data involving coordinates of facilities present near each road; a control means which fetches coordinates of start and end points of the road on which the vehicle is present and of roads which are in a predetermined relation to the said road as a reference, from the map information memory means and then transforms the coordinates of the start and end points and facilities into display coordinates; a deformed map preparing means which receives the start and end point display coordinates, then sets a straight line between each pair of start and end points, and prepares a map for display having the start and end points and facilities represented by symbols; and a display means for displaying the map prepared by the deformed map preparing means.

(e) A construction including a map information memory means having road data involving information which represents start and end points of each road and the type of each road, also having characteristic point data involving coordinates of start and end points of each road, and further having facilities data involving coordinates of facilities present near each road; a route selecting means for selecting an optimum route between the present position of a vehicle and a destination; a deformed map preparing means which fetches coordinates of start and end points of the road on which the vehicle is present and of roads which are in a predetermined relation to the said road as a reference, from the map information memory means, then transforms the coordinates of the start and end points into display coordinates, then on the basis of the start and end point display coordinates, sets a straight line between each pair of start and end points and prepares a map for display having the start and end points represented by symbols; and a display means for displaying the map prepared by the deformed map preparing means.

(f) A construction including a present position and direction detecting means for detecting a present position and a moving direction of a vehicle; a map information memory means having road data involving information which represents start and end points of each road and also having characteristic point data involving coordinates of start and end points of each road; a real-time information receiving means for receiving real-time information such as traffic congestion or temporary traffic regulations from the exterior; a control means which fetches coordinates of start and end points of the road on which the vehicle is present and of roads which are in a predetermined relation to the said road as a reference, from the map information memory means, then transforms the coordinates of the start and end points into display coordinates, receives real-time information from the real-time information receiving means and instructs a symbolic display according to the real-time information; a deformed map preparing means which receives the start and end point display coordinates, sets a straight line between each pair of start and end points and prepares a map for display having the start and end points and real-time information represented by symbols; and a display means for displaying the map prepared by the deformed map preparing means.

(g) A construction including a present position and direction detecting means for detecting a present position and a moving direction of a vehicle; a map information memory means having road data involving information which represents start and end points of each road and also having characteristic point data involving coordinates of start and end points of each road; a route selecting means for selecting an optimum route between the present position of the vehicle and a destination; a real-time information receiving means for receiving real-time information such as traffic congestion or temporary traffic regulations from the exterior;

a control means which fetches coordinates of start and end points of the road on which the moving body is present and of roads which are in a predetermined relation to the said road as a reference, from the map information memory means, then transforms the coordinates of the start and end points into display coordinates, receives real-time information from the real-time information receiving means and instructs a symbolic display according to the real-time information; a deformed map preparing means which receives the start and end point display coordinates, sets a straight line between each pair of start and end points and prepares a map for display having the start and end points represented by symbols; and a display means for displaying the map prepared by the deformed map preparing means.

(h) A construction including a present position and direction detecting means for detecting a present position and a moving direction of a vehicle; a map information memory means having road data involving information which represents start and end points of each road and also having characteristic point data involving coordinates of start and end points of each road; a control means which sets a characteristic point ahead of the road on which the vehicle is present, as a reference intersection, sets characteristic points at opposite ends of roads connected to the reference intersection, as primary intersections, further sets characteristic points at opposite ends of roads connected to any of the primary intersections, as secondary intersections, then selects nine or less intersections out of the reference intersection and the primary and secondary intersections, and transforms the coordinates of the selected intersections into display coordinates; a deformed map preparing means which receives the display coordinates from the control means, sets a straight line between each pair of start and end points and prepares a map for display having the start and end points represented by symbols; and a display means for displaying the map prepared by the deformed map preparing means.

(i) A construction including a map information memory means having road data involving information which represents start and end points of each road and the type of each road and also having characteristic point data involving coordinates of start and end points of each road; a control means which fetches coordinates of start and end points of roads present in a predetermined area and exhibiting a road type of a predetermined level or higher, from the map information memory means and sets a route connecting the start and end points; a deformed map preparing means for preparing a map for display which shows the route set by the control means; and a display means for displaying the map prepared by the deformed map preparing means.

(j) A construction including a present position and direction detecting means for detecting a present position and a moving direction of a vehicle; a map information memory means having road data involving information which represents start and end points of each road and the type of each road and also having characteristic point data involving coordinates of start and end points of each road; a control means which fetches coordinates of start and end points of roads present in a predetermined area and exhibiting the same level as that of the road on which the vehicle is present, from the map information memory means and sets a route connecting the start and end points; a deformed map preparing means for preparing a map for display showing the route set by the control means; and a display means for displaying the map prepared by the deformed map preparing means.

(k) A construction including a map information memory means having map data involving information which represents a relation of connection of roads and information which represents a destination of each road; a control means which retrieves coordinates of roads present in a predetermined area and information representing destinations of the roads, from the map information memory means, and prepares a map for display involving the roads and information representing destinations; and a display means for displaying the map prepared by the control means.

(l) A construction including a map information memory means having map data involving information which represents a relation of connection of roads and information which represents a destination of each road; a selection results memory means for storing selected destinations for display; an operating means to which is inputted a request for change of a destination being displayed; a control means which, at the time of display of a map, fetches a destination of a road to be displayed in the case where the destination is present in the selection results memory means, or takes out information representing the said destination of the road from the map information memory means in the case where the road destination is not present in the selection results memory means or upon input of a request for change of the destination being displayed, then prepares a map for display involving roads and information representing destinations of the roads, and sets the destination being displayed in the selection results memory means upon change of the road to be displayed; and a display means for displaying the map prepared by the control means.

(m) A construction including a map information memory means having map data involving information which represents a relation of connection of roads and also represents a relation of grade separation of roads; a control means which fetches coordinates of roads present in a predetermined area and coordinates of intersections of roads which are in a relation of grade separation out of the roads present in the predetermined area, from the map information memory means, then eliminates the grade separation portion of the lower road of two roads which are in a relation of grade separation, and then prepares a map for display involving the roads present in the predetermined area; and a display means for displaying the map prepared by the control means.

(n) A construction including a map information memory means having map data involving information which represents a relation of connection of roads and a parallel and vertically spaced relation of roads; a control means which fetches coordinates of roads present in a predetermined area and those which are in a parallel and vertically-spaced relation out of the roads present in the predetermined area, from the map information memory means, and prepares a map for display involving the roads present in the predetermined area in a more expanded state in width of the lower road than the upper road of two roads which are in a parallel and vertically-spaced relation; and a display means for displaying the map prepared by the control means.

Various means used in the present invention operates as follows.

The deformed map preparing means displays roads present in a predetermined range on the display means, using straight lines, in accordance with instructions given by the control means.

The deformed map reproducing means displays roads present in an area determined by the control means, on the display means, using straight lines.

A coordinate normalizing means allocates characteristic points (start point and end point) at both ends of each road displayed using straight lines to lattice intersections which have been assumed beforehand on a display screen.

A coordinate shifting means prevents two characteristic points from being allocated to one lattice intersection.

A display symbol indicating means operates so that, in the event two characteristic points are allocated to one lattice intersection, specific symbols are displayed at that lattice intersection.

A control means assumes on a display screen a lattice having spacings larger than the width of roads displayed and the size of symbols of characteristic points displayed.

A present position indicating means operates to add a symbol indicative of a present position of a vehicle onto a deformed map with roads displayed thereon using straight lines.

A display position changing means operates to display a symbol indicative of a vehicle in an appropriate position proportional to the distance between a characteristic point of a road and the vehicle, the vehicle being present on that road which is displayed on a deformed map with roads displayed thereon using straight lines.

A residual distance calculating means operates to display a symbol indicative of a vehicle in an appropriate position proportional to the distance between a characteristic point present ahead (the moving direction side of the vehicle) on a road and the vehicle, the vehicle being present on that road which is displayed on a deformed map with roads displayed thereon using straight lines.

A flicker means operates to flicker a symbol indicative of a moving body on a deformed map with roads displayed thereon using straight lines.

The deformed map preparing means also functions to display roads present in a predetermined area on the display means, using straight lines, in accordance with instructions given by the control means, and display symbols indicative of facilities adjacent to the roads on the display means. Or, in accordance with instructions given by the control means, the deformed map preparing means displays the roads present in the predetermined area on the display means, using straight lines, and add symbols indicative of traffic congestion, etc. to the displayed road concerned.

A screen updating means operates to update the display screen automatically when a vehicle passed a characteristic point.

A display road selecting means recognizes a road on which a vehicle is present and selects, as roads also to be displayed, roads of the same type as that of the road with the vehicle present thereon and contained in the road data.

A screen switching instructing means instructs which of a front map and a rear map in the moving direction of a vehicle is to be displayed, in accordance with an operating input.

The control means also functions to instruct the deformed map preparing means to display nine or less intersections and roads between the intersections using straight lines, or when the road type of road data indicates roads of a predetermined level or higher, the control means sets roads corresponding to the road data as roads to be displayed.

The deformed map preparing means puts a specific symbol on each specific intersection to which is connected a road not to be displayed, in the deformed map, or not only puts a specific symbol on such specific intersection but also indicates roads connected to the specific intersection, using symbols, in the deformed map.

The control means further operates to set roads of the same level as the road with a vehicle present thereon, as roads to be displayed, or display information indicative of roads and destinations thereof on the display means.

A destination selecting means displays a road and information indicative of a destination which is considered to be most important out of plural destinations associated with that road, on the display means. Or, the destination selecting means selects, as destinations to be displayed, a destination which is considered to be useful out of destinations far from the present position of a vehicle, and a destination which is considered to be useful out of destinations close to the present position of the vehicle.

A specific destination designating means operates to display, on a preferential basis, specific destinations which are associated with roads to be displayed and which have already been registered.

The control means further operates to first display a destination if any which is associated with a road to be displayed and stored in the selection results memory means, or operates to display a map which permits easy recognition of grade separation portions on the display means, or display on the display means a map permitting easy recognition of two roads which are in a parallel and vertically spaced relation to each other.

BRIEF DESCRIPTION OF THE DRAWINGS

FIG. 11 is a block diagram of a traffic information display system according to a second embodiment of the present invention;

FIG. 36 is a flowchart showing a portion of the operation of a traffic information display system according to a thirteenth embodiment of the present invention;

FIG. 54 is a flowchart showing the operation of a traffic information display system according to a twentieth embodiment of the present invention;

FIG. 69 is a flowchart showing the operation of a traffic information display system according to a twenty-sixth embodiment of the present invention;

FIG. 77 is a flowchart showing the operation of a traffic information display system according to a twenty-ninth embodiment of the present invention;

DETAILED DESCRIPTION OF THE PREFERRED EMBODIMENTS

Embodiments of the present invention will be described in detail hereinunder with reference to the accompanying drawings.

Embodiment 1

Figure 5:
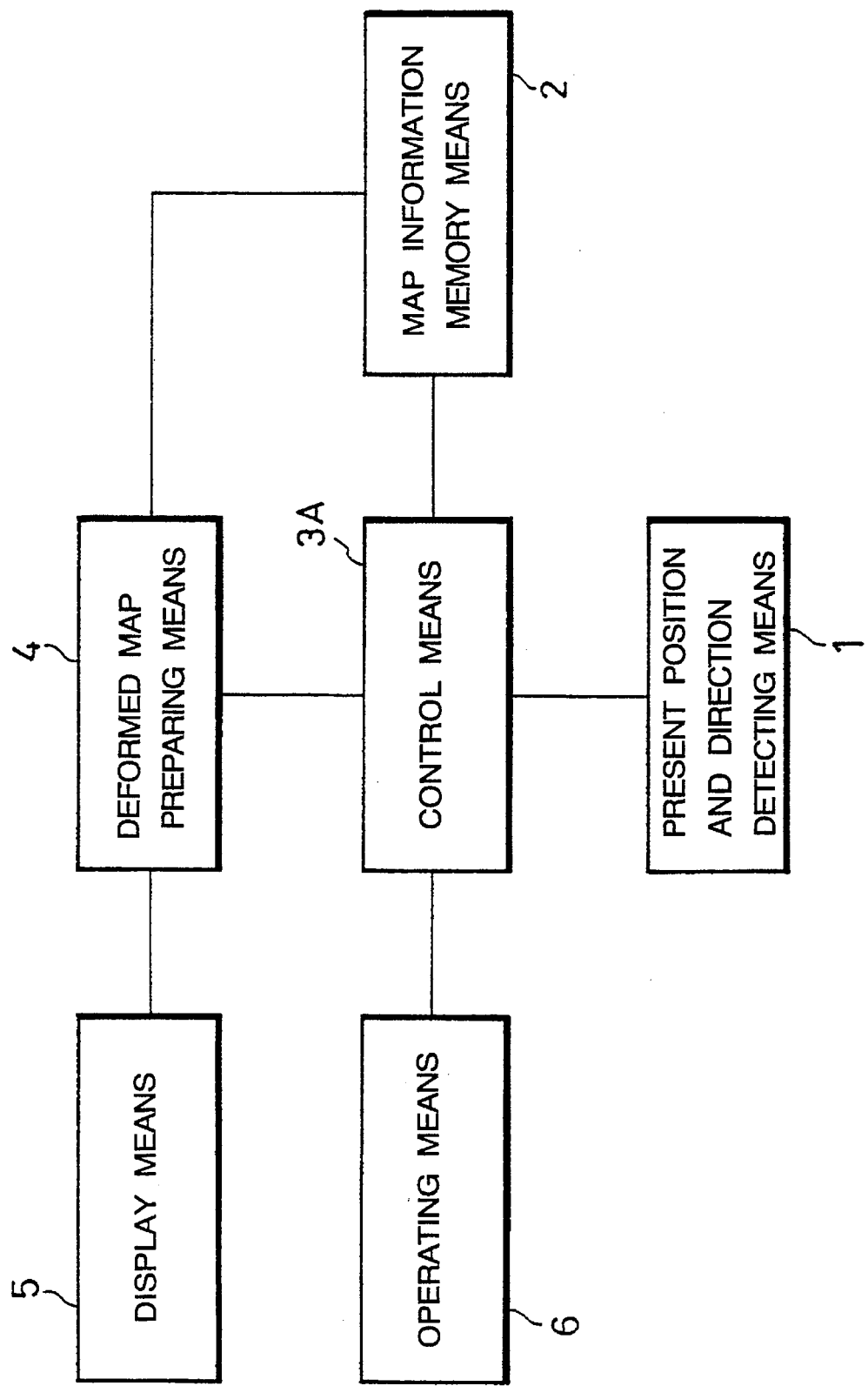
FIG. 5 is a block diagram of a traffic information display system according to a first embodiment of the present invention.

FIG. 5 is a block diagram of a traffic information display system according to a first embodiment of the present invention. In the same figure, the reference numeral 1 denotes a present position and direction detecting means for detecting a present position and a moving direction of a vehicle; numeral 2 denotes a map information memory means in which are stored map data; numeral 3A denotes a control means which, for example, determines coordinates required for preparing a map for display; numeral 4 denotes a deformed map preparing means for preparing a map for display; numeral 5 denotes a display means, e.g. CRT; and numeral 6 denotes an operation means, e.g. keyboard.

Figure 1:
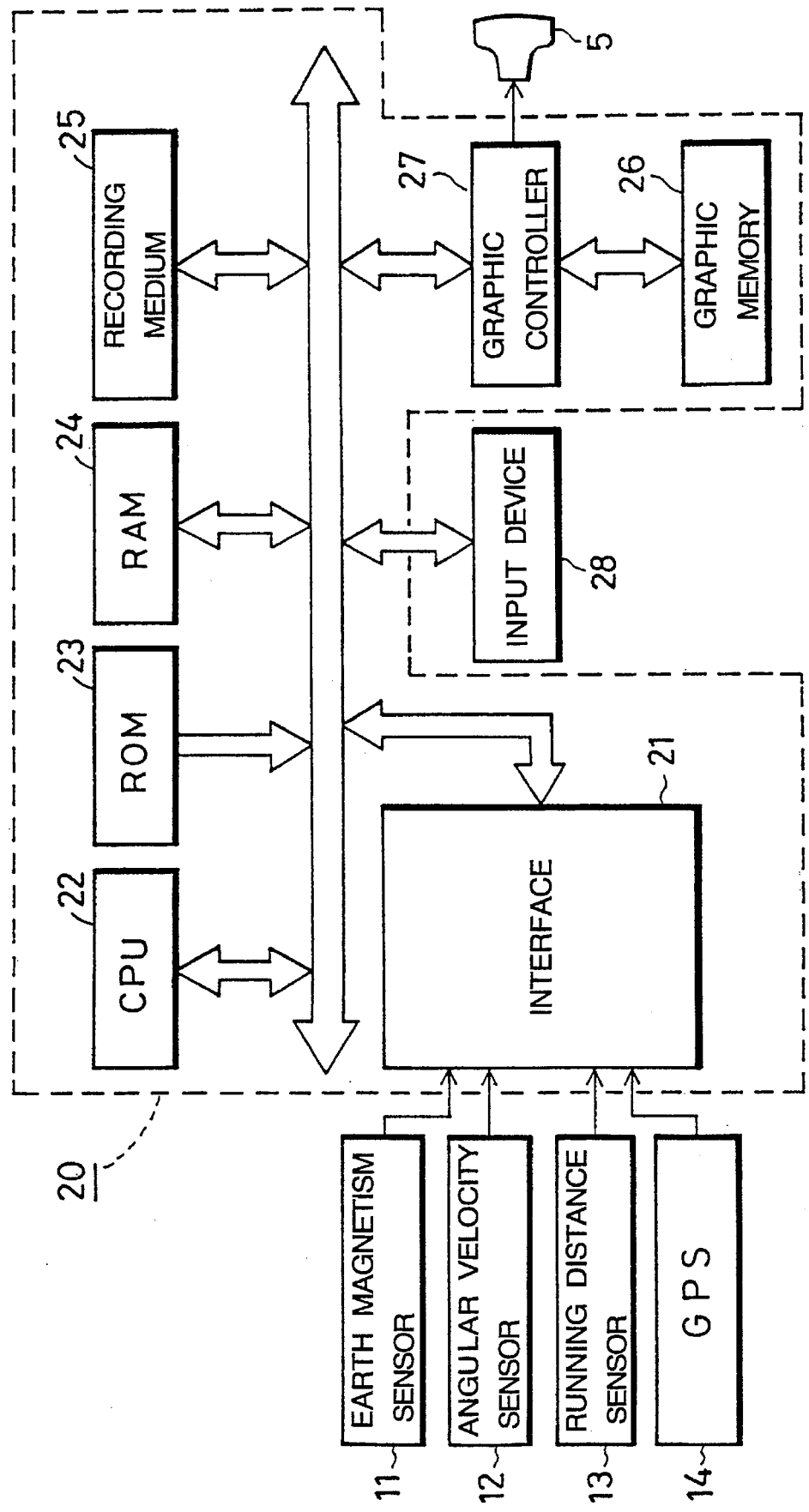
FIG. 1 is a construction diagram of a conventional traffic information display system.

The present position and direction detecting means is realized, for example, by the earth magnetism sensor 11, angular velocity sensor 12, running distance sensor 13 and GPS 14, which are illustrated in FIG. 1. The map information memory means 2 comprises a CD-ROM for example. The control means 3A can be realized by a microcomputer (including CPU and program), and the deformed map preparing means 4 can be realized by a portion of the said microcomputer as well as the graphic controller 27 and the graphic memory 26 which are illustrated in FIG. 1.

Figure 6:
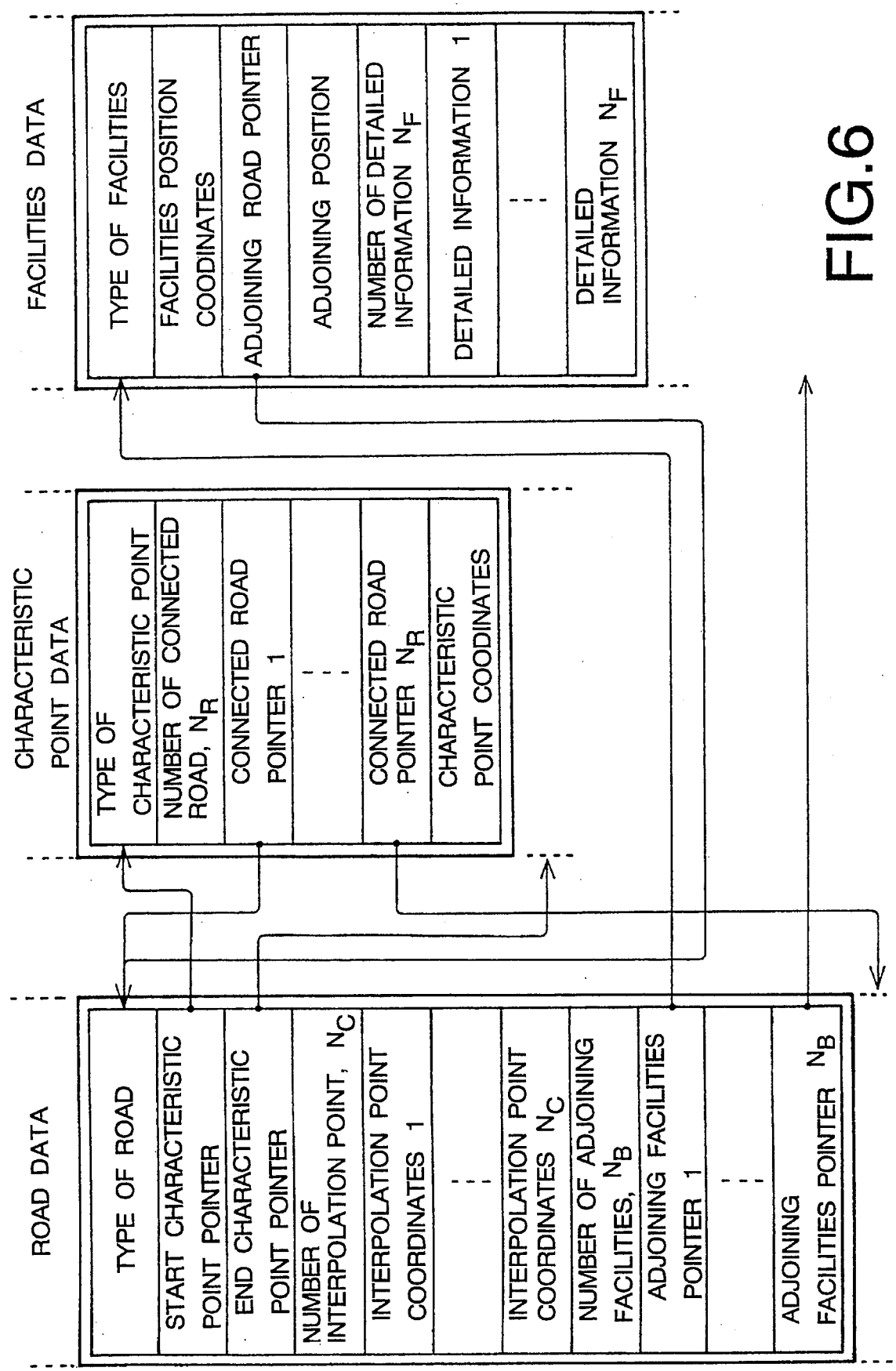
FIG. 6 is an explanatory view showing an example of map data.

FIG. 6 shows a construction example of map data, comprising road data, characteristic point data and facilities data each in a large number. Each road is defined to be present between two characteristic points (start point and end point). The road data include road types for distinction among expressway, national road, prefectural road, etc., a start characteristic point pointer indicating an address with data of a characteristic point as a start point set therein, an end characteristic point pointer indicating an address with data of a characteristic point as an end point set therein, interpolation point coordinates (values normalized in terms of longitude and latitude or according to a certain rule) such as curved points on each road, the number of interpolation points, and adjoining facilities pointers each indicating an address with data of facilities adjoining to each road set therein.

The characteristic points indicate intersections, curved points and dead ends. The characteristic point data include characteristic point types for distinction among important intersections, general intersections, curved points and dead ends, the number of roads connected to the characteristic points, characteristic point coordinates showing coordinates of the characteristic points, and connected road pointers indicating addresses with road data of those roads set therein. The facilities data include facilities types for distinction among parking lots, gas stations, restaurants, etc., facilities position coordinates showing coordinates of the facilities, an adjoining road pointer indicating an address in which is set data of each road adjoining the facilities, adjoining position information indicating which of right and left sides of each adjoining road the facilities are positioned or whether the facilities are close to the start or end point of the road, and detailed information indicating names, operation times, etc. of the facilities.

Generally, the information which the driver of an automobile requires during running of the automobile on a road is a relation of connection of roads such as, for example, in which direction the driver should steer the automobile at the next intersection. An actual road shape is not required unless the road involves a large curve or the like. In a map presented to the driver, therefore, small curves and roads of less importance should be deformed into straight lines although large curves or the like are expressed, and this is easier for the driver to see the map. Therefore, in this embodiment there is provided a traffic information display system which presents a deformed map to the driver.

Figure 7:
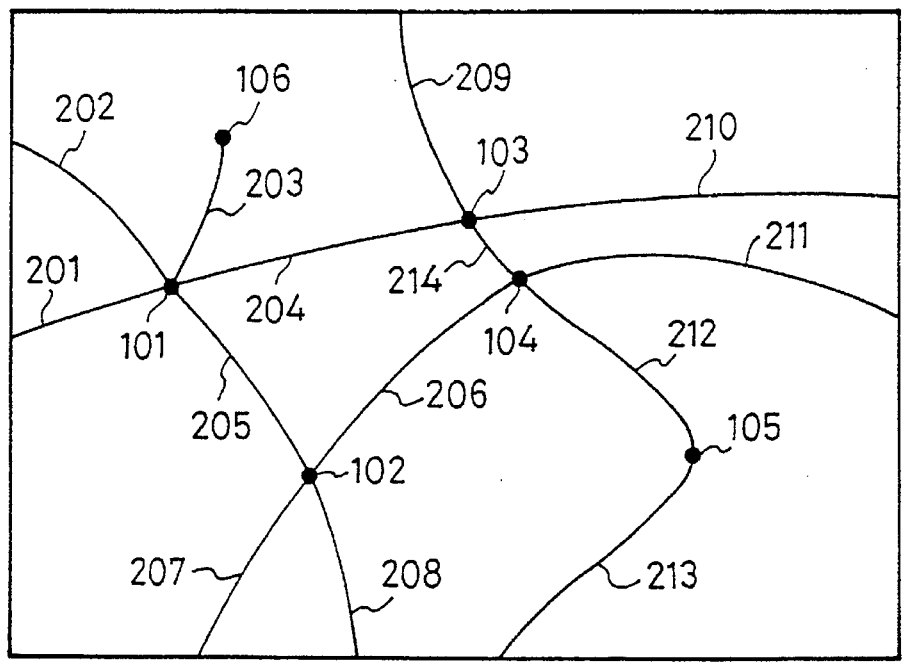
FIG. 7 is an explanatory view showing an example of an actual map.
Figure 8:
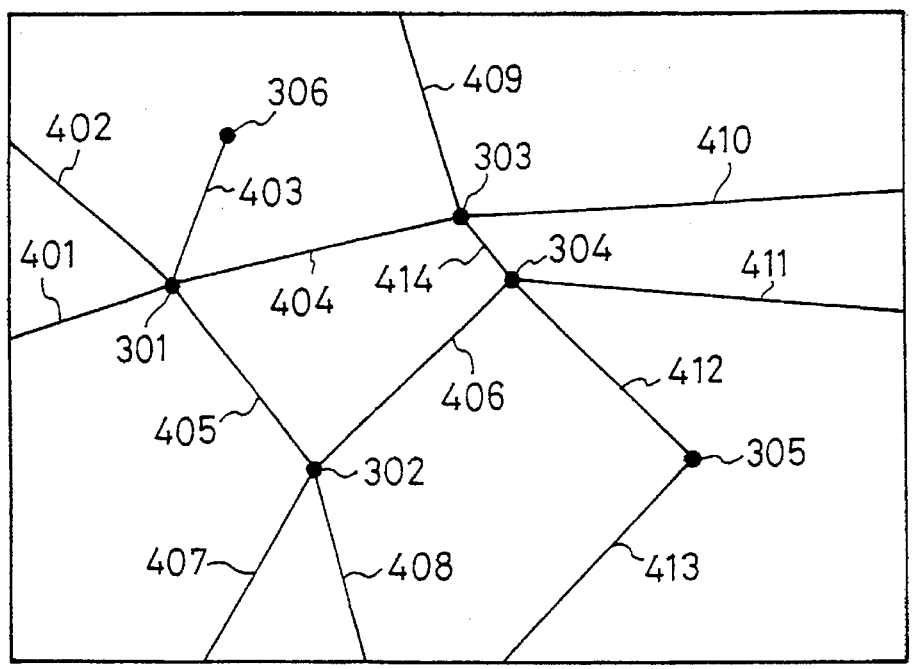
FIG. 8 is an explanatory view showing an example of a deformed map for display.

More specifically, in the case where actual roads are provided as in FIG. 7, there is presented such a deformed map as shown in FIG. 8. In FIG. 7, numerals 101 to 106 represent actual characteristic points, and numerals 201 to 213 represent actual roads, while in FIG. 8, numerals 301 to 306 represent characteristic points on a deformed map, and numerals 401 to 413 represent roads on the deformed map.

Figure 9:
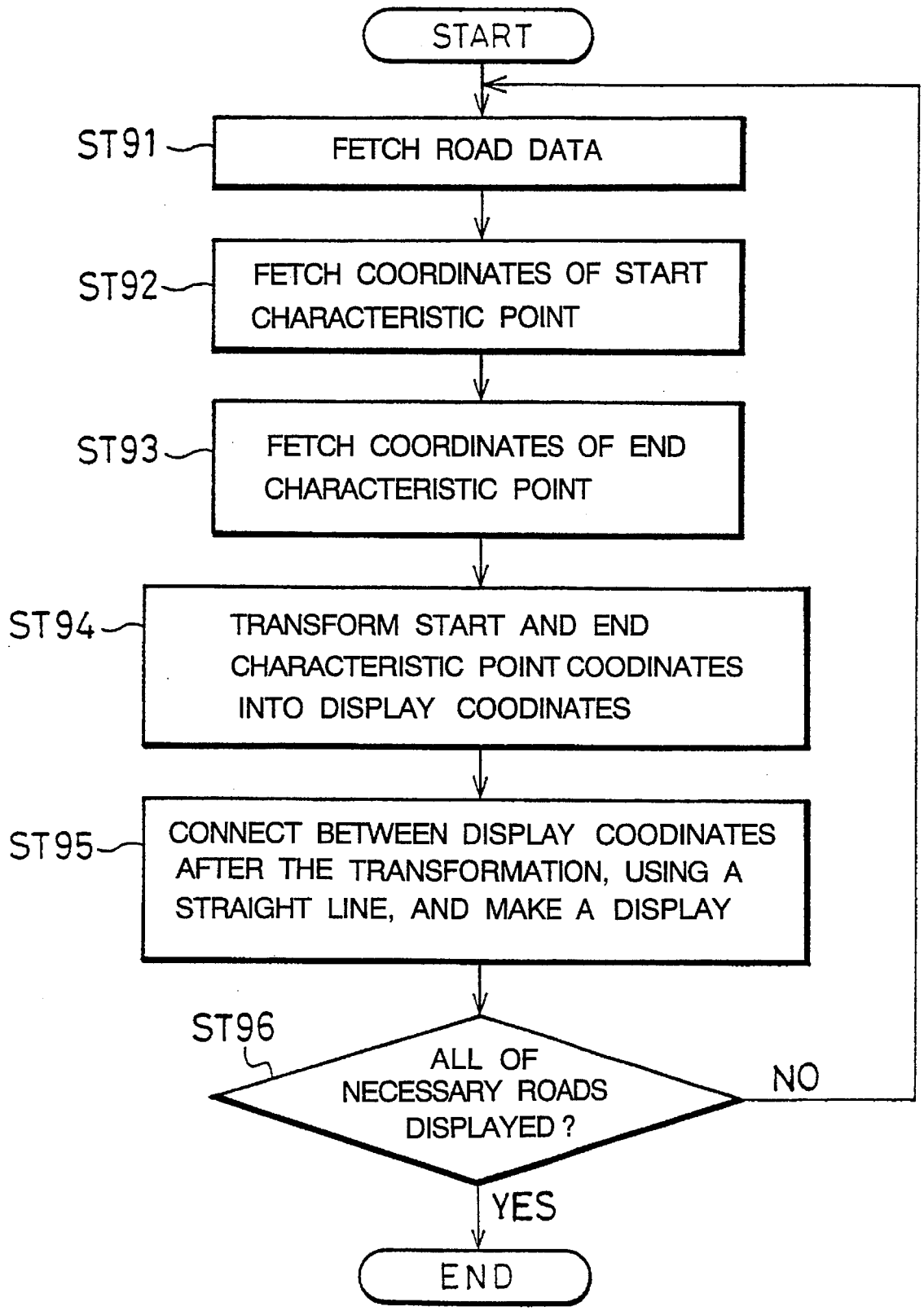
FIG. 9 is a flowchart showing the operation of the traffic information display system of the first embodiment.

The operation of this traffic information display system will now be described with reference to the flowchart of FIG. 9. In the road data, the road types, adjoining facilities and adjoining facilities pointers are not specially required in this embodiment. Facilities data are not particularly needed, either.

First, the control means 3A takes out one of road data required (step ST91). It is assumed that the road data required are concerned with roads connecting characteristic points which are present ahead of a present vehicular position detected by the present position and direction detecting means 1. Next, the control means obtains coordinates of characteristic points on the basis of addresses indicated by the start and end characteristic point pointers in the road data (steps ST92 and ST93). Further, the control means transforms those coordinates into coordinates (display coordinates) on a display screen (step ST94). The control means 3A then instructs the deformed map preparing means 4 to connect between those coordinates with a straight line. In accordance with the instruction, the deformed map preparing means 4 deforms one road into a straight line and displays the straight line on the display means 5 (step ST95). When the processings of steps ST91 to ST95 have been performed with respect to all of the road data required (steps ST96), the control means 3A terminates the processing. Through the above processing, a deformed map such as is shown in FIG. 8 is displayed on the display means 5.

Figure 10:
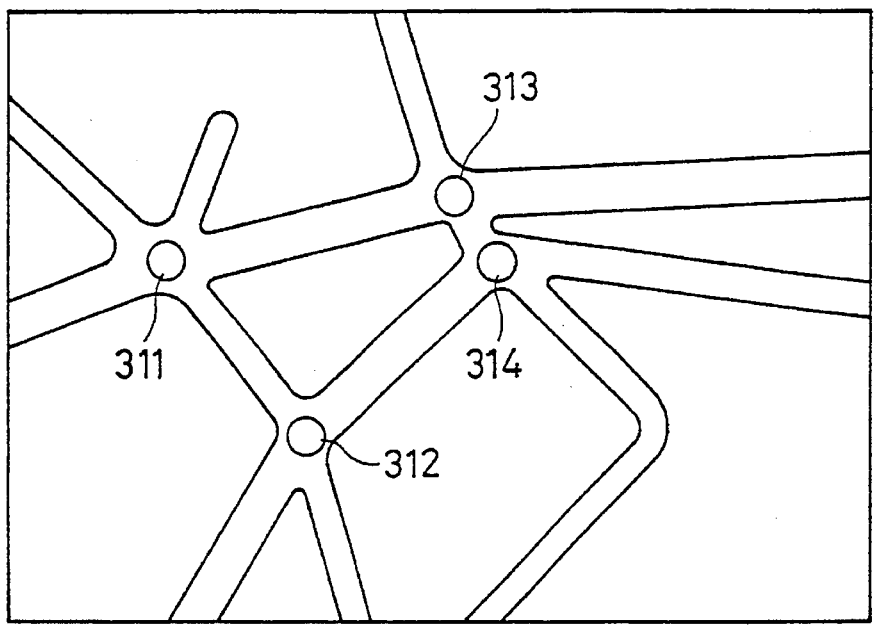
FIG. 10 is an explanatory view showing an example of a deformed map for display.

Although the roads between characteristic points are all deformed using straight lines in the above embodiment, curves may be given near the characteristic points, or the characteristic points may be displayed using symbols. Further, those symbols may be made different in shape, display color and size according to characteristic point types. FIG. 10 illustrates a deformed map in which, out of characteristic points, intersections 311 to 314 are indicated symbolically and roads each have a width, with curves being given near the characteristic points. This deformed map is easier to see.
Embodiment 2

FIG. 11 is a block diagram of a traffic information display system according to a second embodiment of the present invention. In the same figure, the numeral 4B denotes a deformed map reproducing means; numeral 7 denotes a deformed map memory means in which are stored the data shown in FIG. 12; and numeral 3B denotes a control means which takes out road data from the map information memory means 2 and instructs the deformed map reproducing means 4B to read out data from the deformed map memory means 7. Other constituent members of this embodiment are the same as those indicated by the same reference numerals in FIG. 5. Also in this embodiment, the deformed map reproducing means 4B can be realized by a portion of a microcomputer as well as a graphic controller and a graphic memory.

Figure 12:
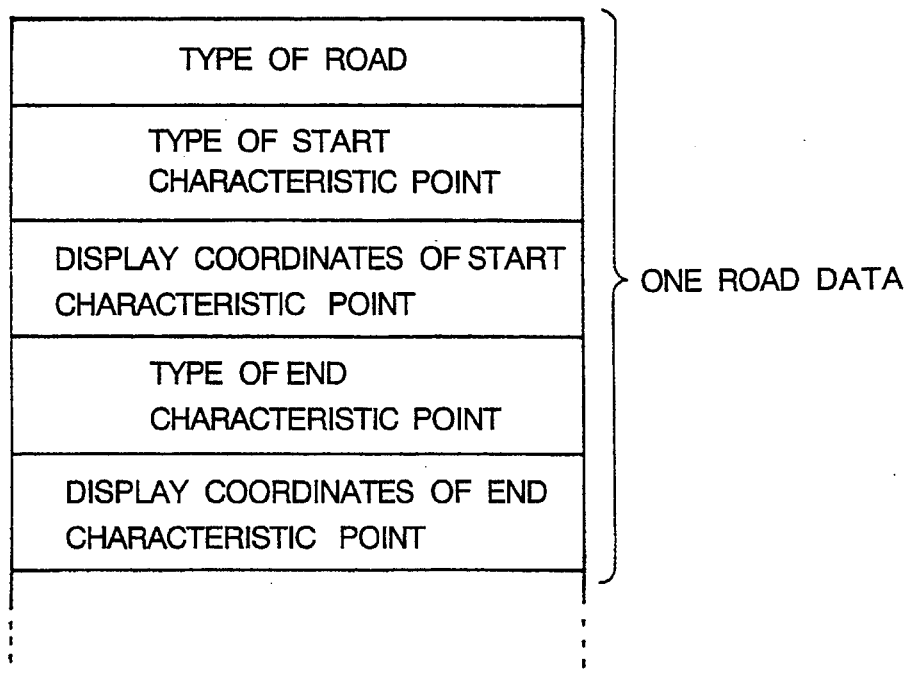
FIG. 12 is an explanatory view showing an example of map data.

FIG. 12 illustrates the data stored in the deformed map memory means 7, which data each comprise road type, start characteristic point type, start characteristic point display coordinates, end characteristic point type, and end characteristic point display coordinates. The start and end characteristic point display coordinates are coordinates on the display screen.

Figure 13:
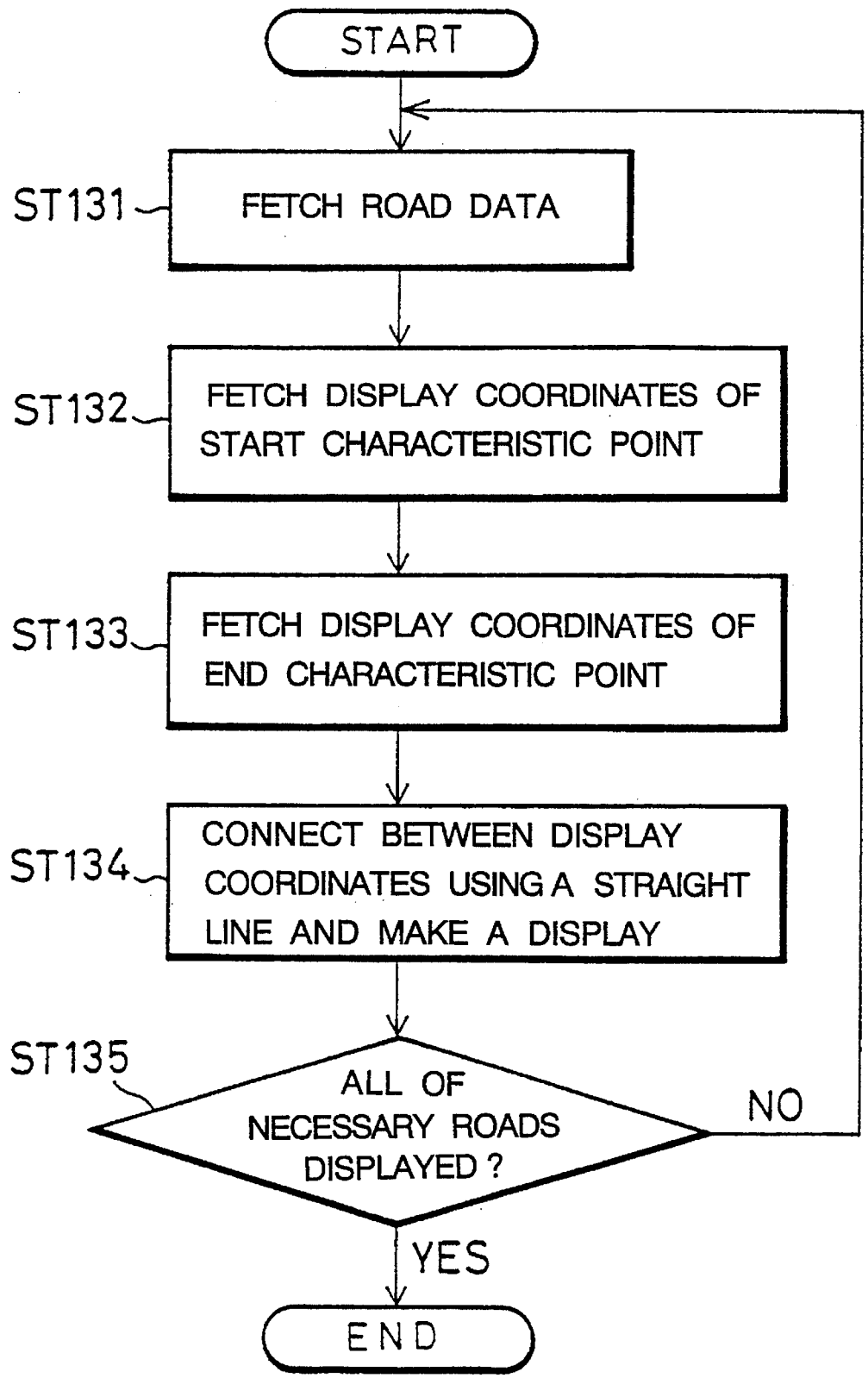
FIG. 13 is a flowchart showing the operation of the traffic information display system of the second embodiment.

The operation of this embodiment will now be described with reference to the flowchart of FIG. 13. First, the deformed map reproducing means 4B takes out one of required road data from the deformed map memory means 7 (step ST131). It is assumed that the required road data are concerned with roads connecting characteristic points which are present ahead of a present vehicular position detected by the present position and direction detecting means 1. The required road data are notified from the control means 3B.

Next, the start and end characteristic point display coordinates contained in the road data thus taken out are extracted (steps ST132 and ST133). Then, the display coordinates of the two characteristic points are connected using a straight line (step ST134). When the processings of steps ST131 to ST134 have been done with respect to all of the required road data, the processing operation is over (step ST135). In this way a map involving the required roads deformed with straight lines is displayed on the display means 5. The map thus displayed is the same as that shown in FIG. 8 or FIG. 10. In the case where the required road data are not present in the deformed map memory means 7, the control means 3B can cause the deformed map reproducing means 4B to prepare a deformed map through the same processings as in the embodiment 1. In this case, the deformed map reproducing means 4B also possesses the function of the deformed map preparing means shown in FIG. 5.

In this embodiment, by encoding and storing a deformed map in advance, that is, by storing the coordinates of characteristic points as display coordinates, it is made possible to display the deformed map more quickly. Instead of storing such display coordinates in the deformed map memory means 7 as a deformed map, image data capable of being displayed directly on the display means 5, or data obtained by compressing such image data, may be stored in the memory means 7.
Embodiment 3

Figure 14:
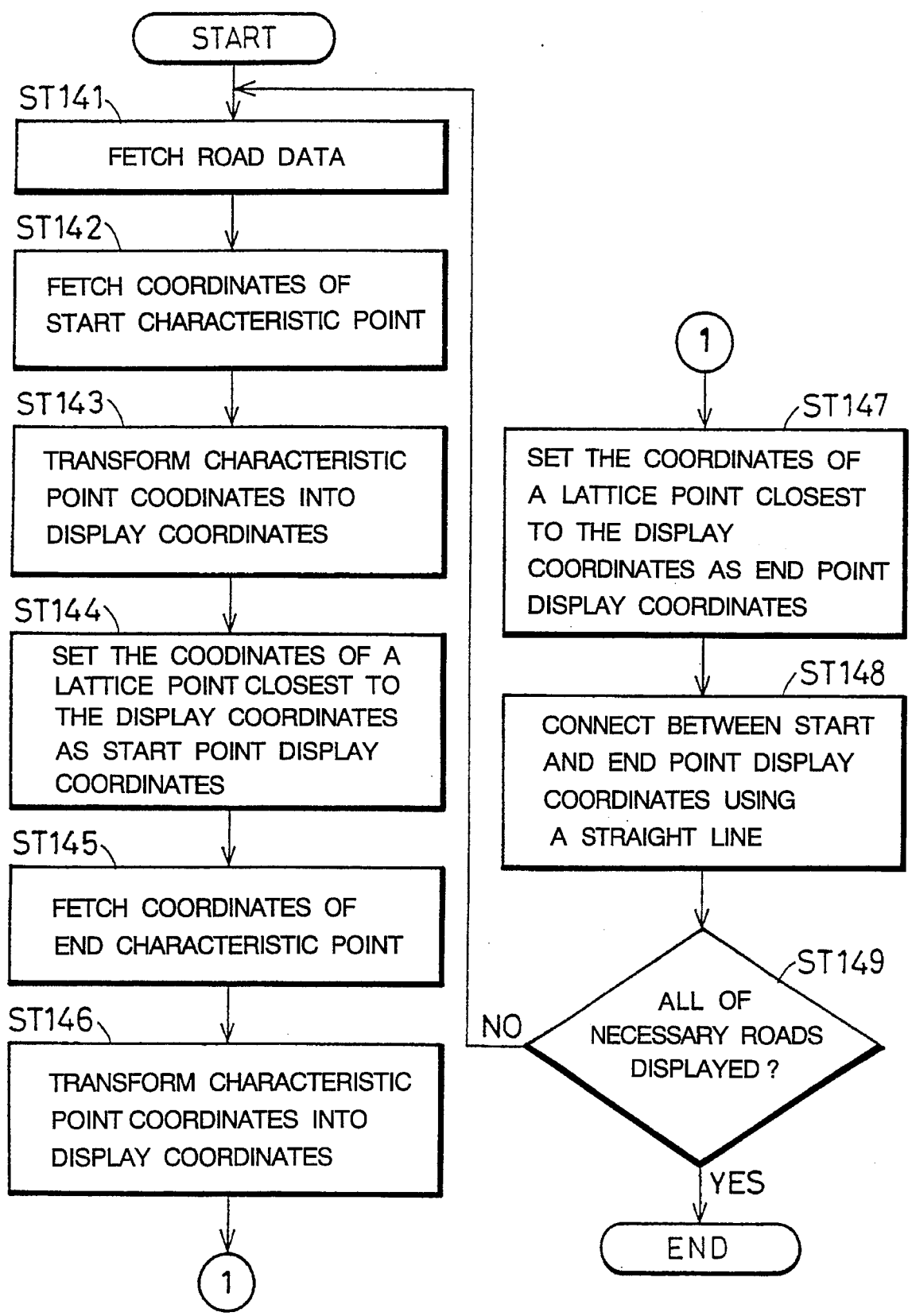
FIG. 14 is a flowchart showing the operation of a traffic information display system according to a third embodiment of the present invention.
Figure 15:
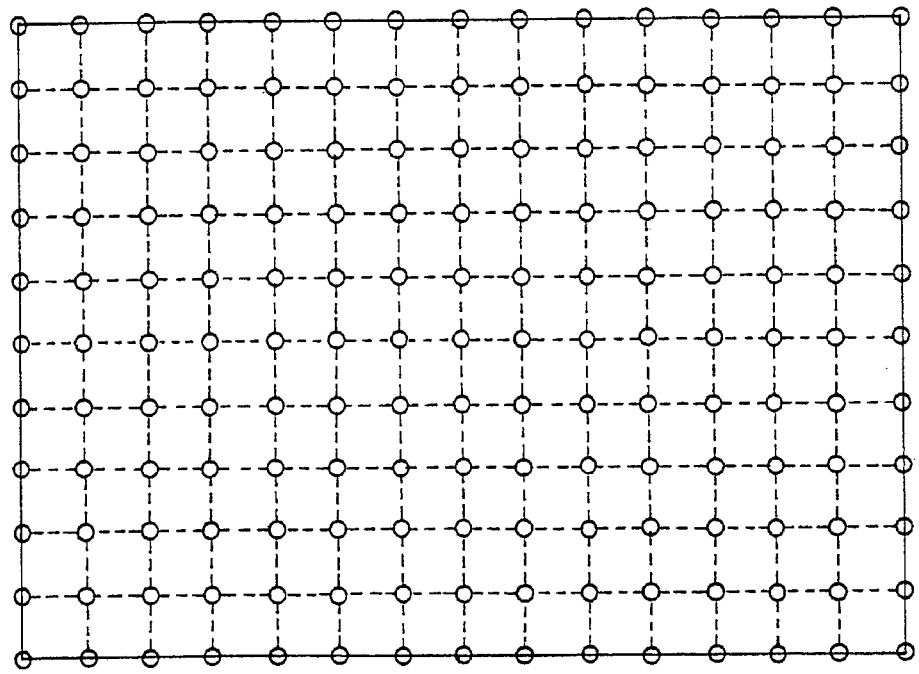
FIG. 15 is an explanatory view showing a lattice and lattice points assumed on a display screen.

FIG. 14 is a flowchart showing the operation of a traffic information display system according to a third embodiment of the present invention. A control means used in this embodiment comprises the control means 3A shown in FIG. 5 and a coordinate normalizing means as an additional means (this control means will hereinafter be referred to as "control means 3C"). The coordinate normalizing means can be realized as a microcomputer program. Other constructional elements of this embodiment than the control means 3C are the same as in FIG. 5. In other words, the construction of this embodiment comprises the construction illustrated in FIG. 5 and the coordinate normalizing means as an additional element. FIG. 15 shows an example of a lattice (indicated by dotted lines in the figure) on the display screen assumed in this embodiment as well as intersections (indicated by circular marks in the figure; "lattice points" hereinafter) of the lattice.

Figure 16:
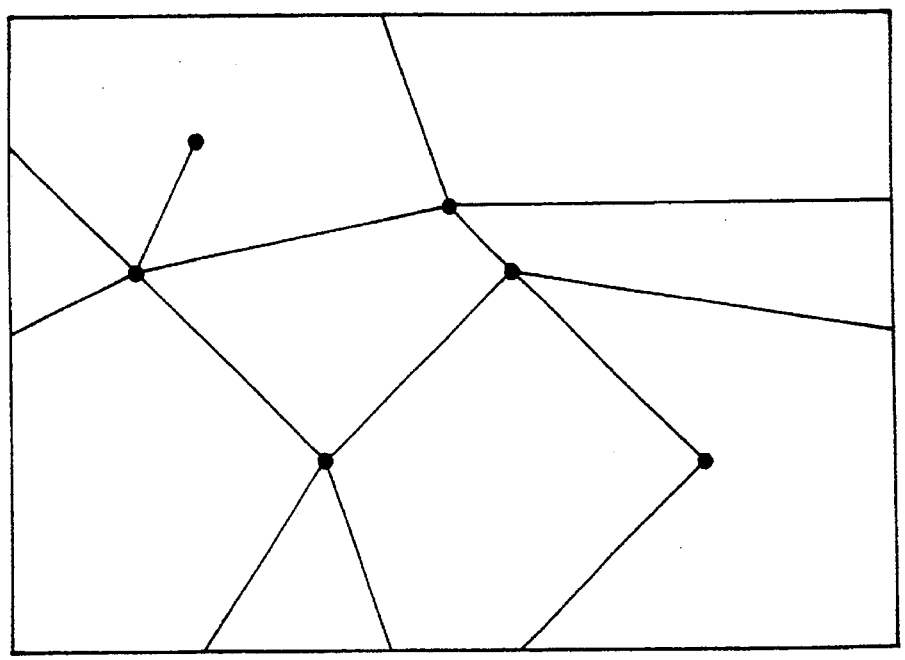
FIG. 16 is an explanatory view showing an example of a deformed map for display.

The operation of this embodiment will now be described. Like the control means 3A in the first embodiment, the control means 3C fetches road data from the map information memory means 2 and transforms start characteristic point coordinates contained in the road data into display coordinates (steps ST141 to ST143). The coordinate normalizing means sets the coordinates of a lattice point closest to the display coordinates as start point display coordinates (step ST144). Next, also as to the end characteristic point coordinates, the same processing is performed to obtain end point display coordinates (steps ST145 to ST147). The control means 3C provides the start and end point display coordinates, as well as instructions to connect those coordinates using a straight line, to the deformed map preparing means 4, which in turn displays a straight line connecting the start and end point display coordinates, on the display means 5 (step ST148). These processings are performed with respect to all of required roads and such a deformed map as shown in FIG. 16 is displayed on the display means 5 (step ST149).

According to this embodiment, the distance between characteristic points is sure to be not smaller than a certain value, thus making it possible to present to the driver a map which is easier to see. There may be adopted a construction wherein display coordinates after the transformation of characteristic point coordinates into lattice point coordinates are stored and a deformed map is reproduced on the basis of those display coordinates.

Embodiment 4

Figure 17:
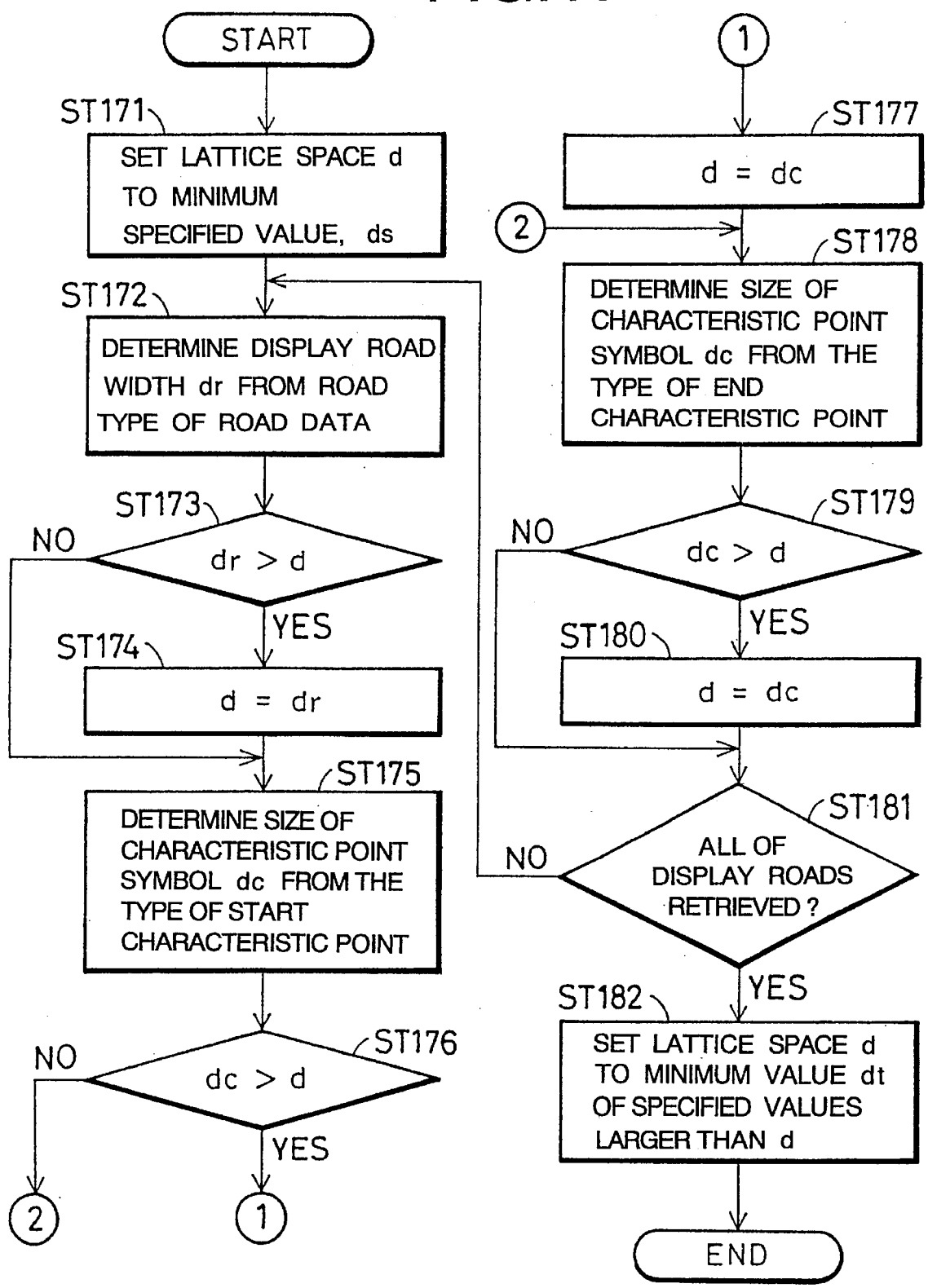
FIG. 17 is a flowchart showing the operation of a traffic information display system according to a fourth embodiment of the present invention.

FIG. 17 is a flowchart showing a portion of the operation of a traffic information display system according to a fourth embodiment of the present invention. The construction of this embodiment is the same as in FIG. 5 except that the control means 3A is replaced with a control means having additional functions, which control means is indicated by the reference numeral 3D in this embodiment. In the additional functions there are included the function of the coordinate normalizing means used in the third embodiment and a function of further transforming display coordinates. In this case, display roads each have a width and intersections are represented using symbols.

The operation of this embodiment will now be described. The control means 3D determines a lattice spacing before map display, as shown in the flowchart of FIG. 17. First, the control means sets a lattice space d at a minimum specified value ds (step ST171). Then, the control means fetches one road data of a required road from the map information memory means 2 and determines a display road width dr of that road in accordance with the type of the road (step ST172), then modifies the lattice space d, into a value not smaller than the display road width dr (steps ST173 and ST174). Likewise, the size dc of display symbols of start and end characteristic points is determined from the characteristic point types, and the lattice space d is modified into a value not smaller than the display symbol size dc (steps ST175 to ST180).

When the processings of steps ST172 to ST180 have been done with respect to all roads required, a finally determined lattice space d is replaced with a minimum value dt of specified values larger than the lattice space d (steps ST181 and ST182). After the lattice space d is determined in this way, the control means 3D performs the same processing as that based on the flowchart of FIG. 14, using the lattice space thus determined, and causes the deformed map preparing means 4 to display a map.

Each specified value is usually set at one per integer of the display means 5. For example, if the resolution is 320×240 dots, specified values are 5, 10, 20 and 40 dots. In this case, if the answer in the processing of step ST181 is affirmative and the value of lattice space d is 14, the lattice space d, determined in step ST182 is 20.

Figure 18:
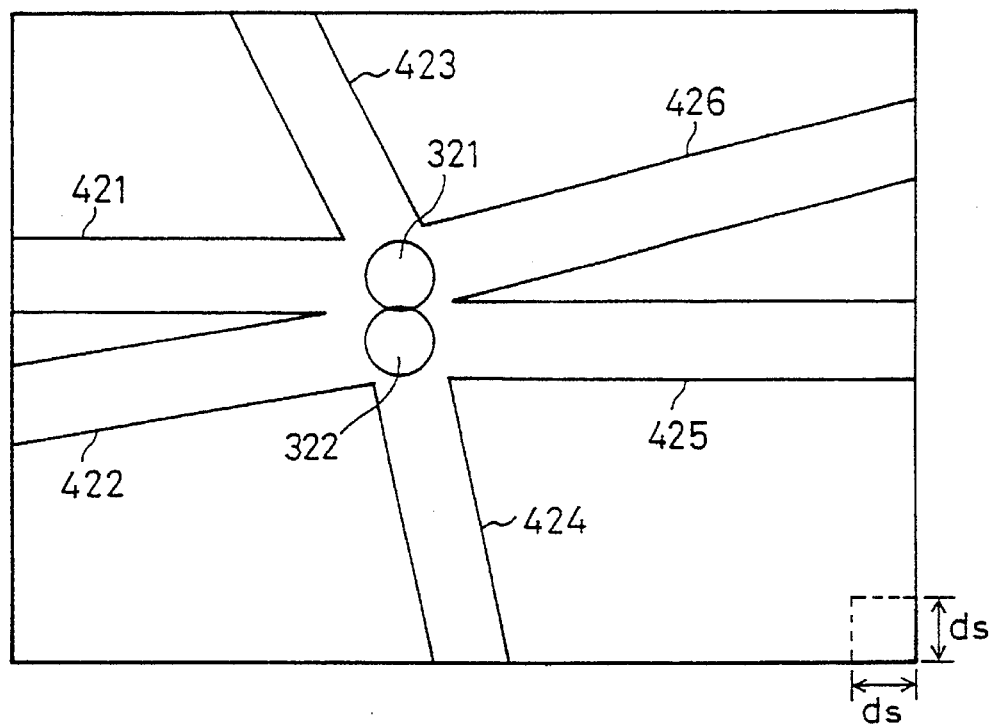
FIG. 18 is an explanatory view showing an example of overlapped symbols representing intersections.
Figure 19:
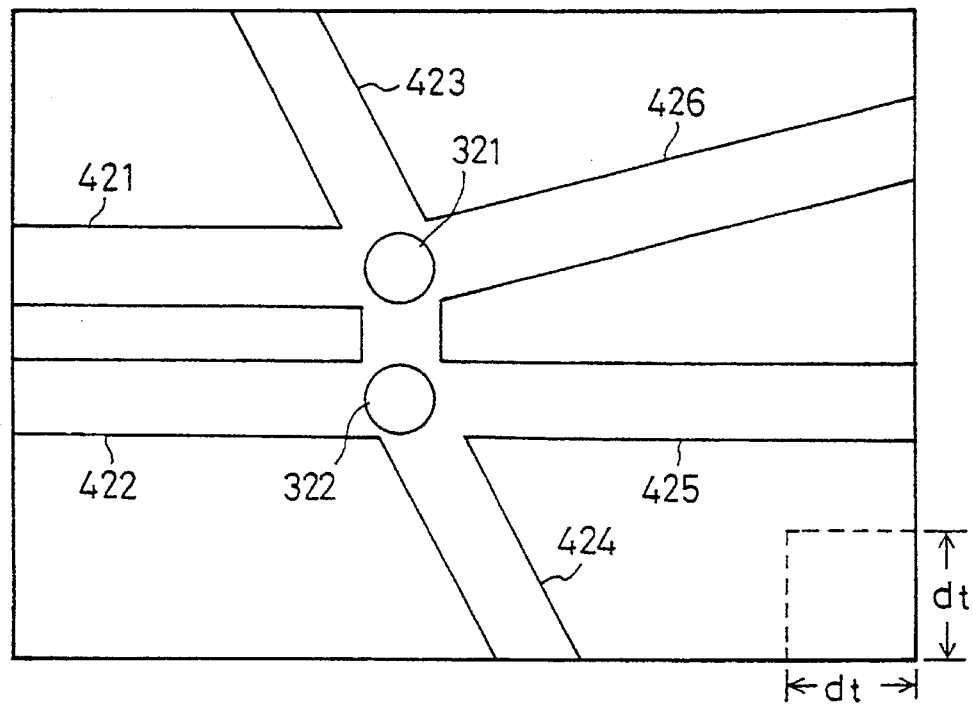
FIG. 19 is an explanatory view showing an example of a deformed map for display.

In this way, a map as shown is in FIG. 19 is displayed on the display means 5. If the processing shown in the flowchart of FIG. 17 has not been performed, a map as is shown in FIG. 18 is displayed in which two intersections 321 and 322 overlap each other on the screen. In the drawings, the reference numerals 421 to 426 represent roads.

Embodiment 5

Figure 20:
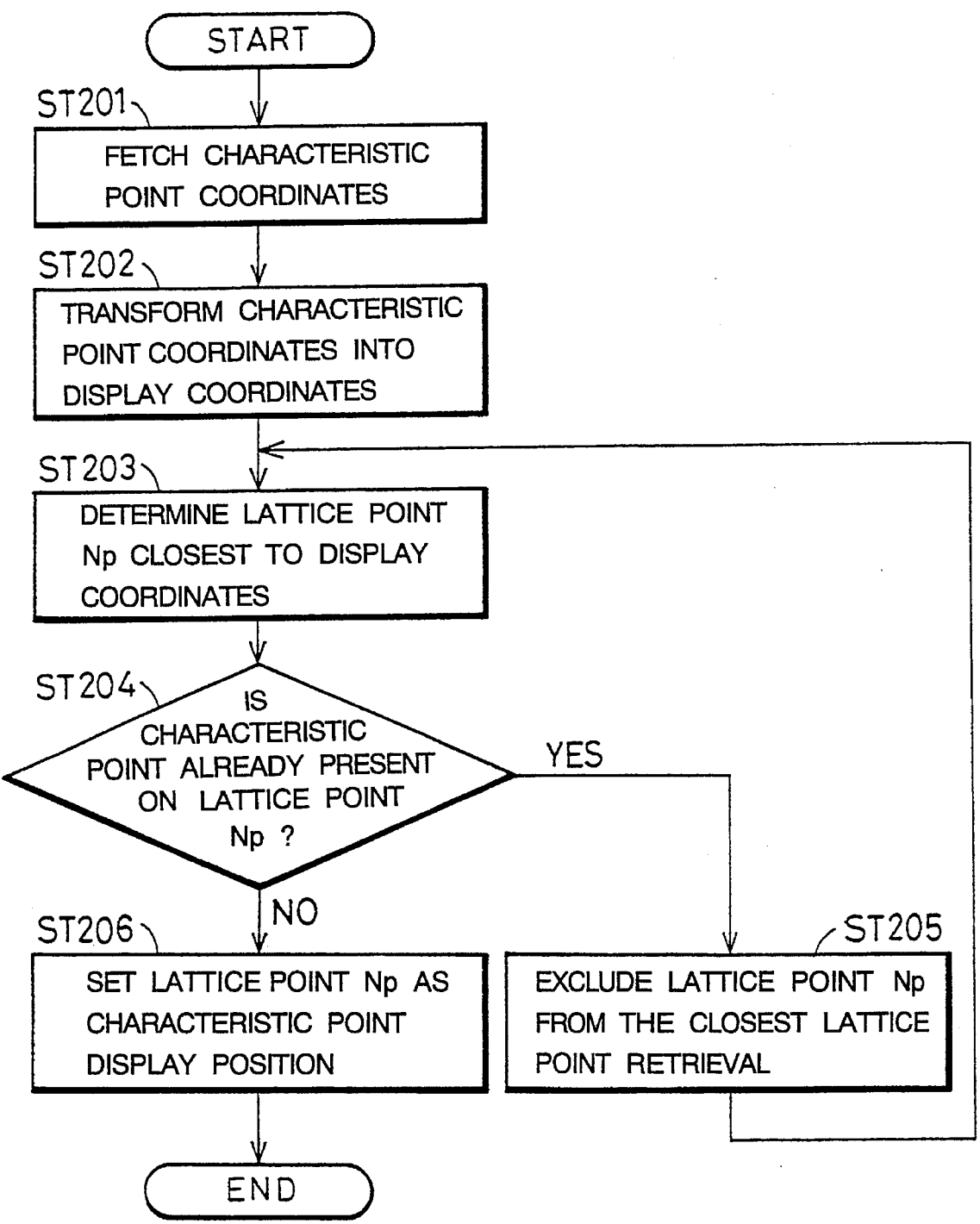
FIG. 20 is a flowchart showing the operation of a traffic information display system according to a fifth embodiment of the present invention.

FIG. 20 is a flowchart showing a portion of the operation of a traffic information display system according to a fifth embodiment of the present invention. The construction of this embodiment is the same as in FIG. 5 except that the control means 3A is replaced with another control means, which comprises the control means 3C used in the third embodiment and a coordinate shifting means as an additional means. This control means used in the fifth embodiment will hereinafter be referred to as control means 3E.

Figure 21:
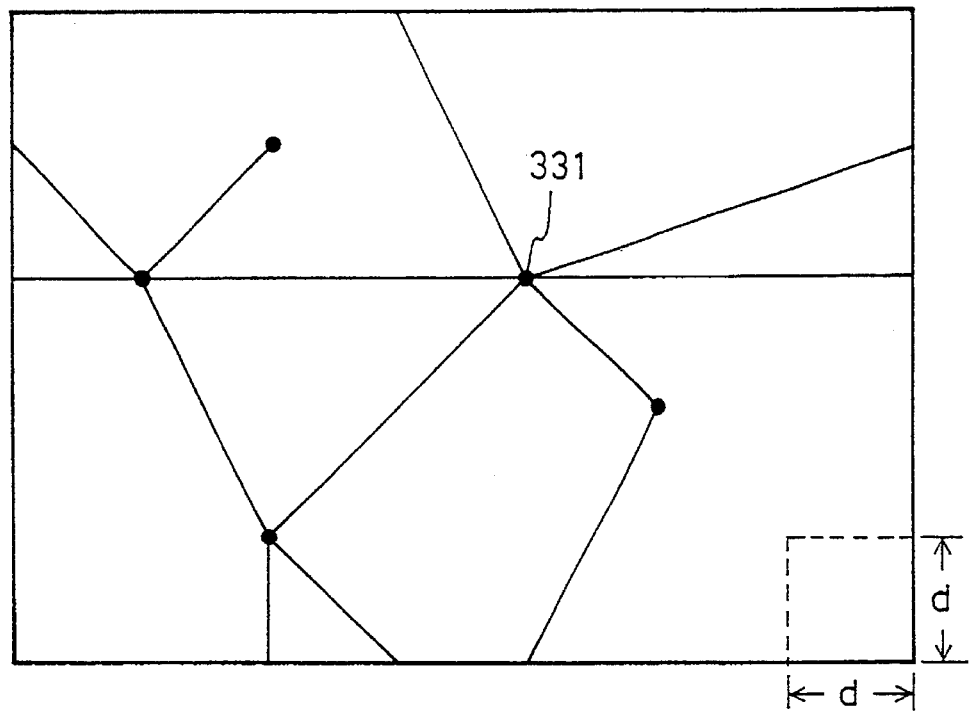
FIG. 21 is an explanatory view showing an example in which two intersections are allocated to one lattice point.
Figure 22:
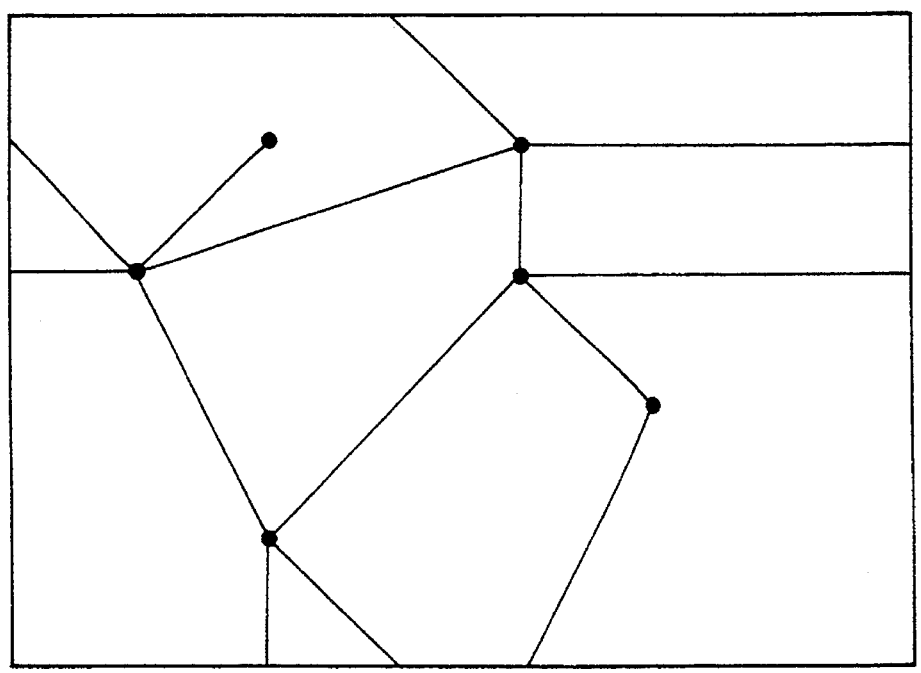
FIG. 22 is an explanatory view showing an example of a deformed map for display.

According to the third embodiment, as shown in FIG. 21, when the space between two intersections is smaller than the lattice space d, the two intersections are represented by one point on the screen, resulting in that the driver may misunderstand a connectional relation of roads. But according to this fifth embodiment, as shown in FIG. 22, there is no fear of an overlapped display of intersections.

The operation of this embodiment will now be described with reference to the flowchart of FIG. 20. The processings based on the flowchart of FIG. 20 correspond to the processings of steps ST142–ST144 and of steps ST145–ST147 in the flowchart (relating to the third embodiment) of FIG. 14. First, the control means 3E fetches road data from the map information memory means 2 and transforms characteristic point coordinates (start or end characteristic point coordinates) into display coordinates (steps ST201 and ST202).

Then, the coordinate normalizing means sets as the display coordinates (start or end point display coordinates) the coordinates of a lattice point $N_p$ which is closest to the display coordinates (step ST203). In the case where the coordinates of the lattice point $N_p$ has already been adopted as the display coordinates, the coordinate shifting means re-executes the processing of step ST203 with respect to the other lattice points than the lattice point $N_p$ (steps ST204 and ST205). In this way there are obtained characteristic point coordinates (on the lattice) not overlapping with other characteristic point coordinates (step ST206). The control means 3E causes the deformed map preparing means 4 to display a map on the basis of the display coordinates thus determined. Thus, such a deformed map as shown in FIG. 22 is prepared.

Embodiment 6

Figure 23:
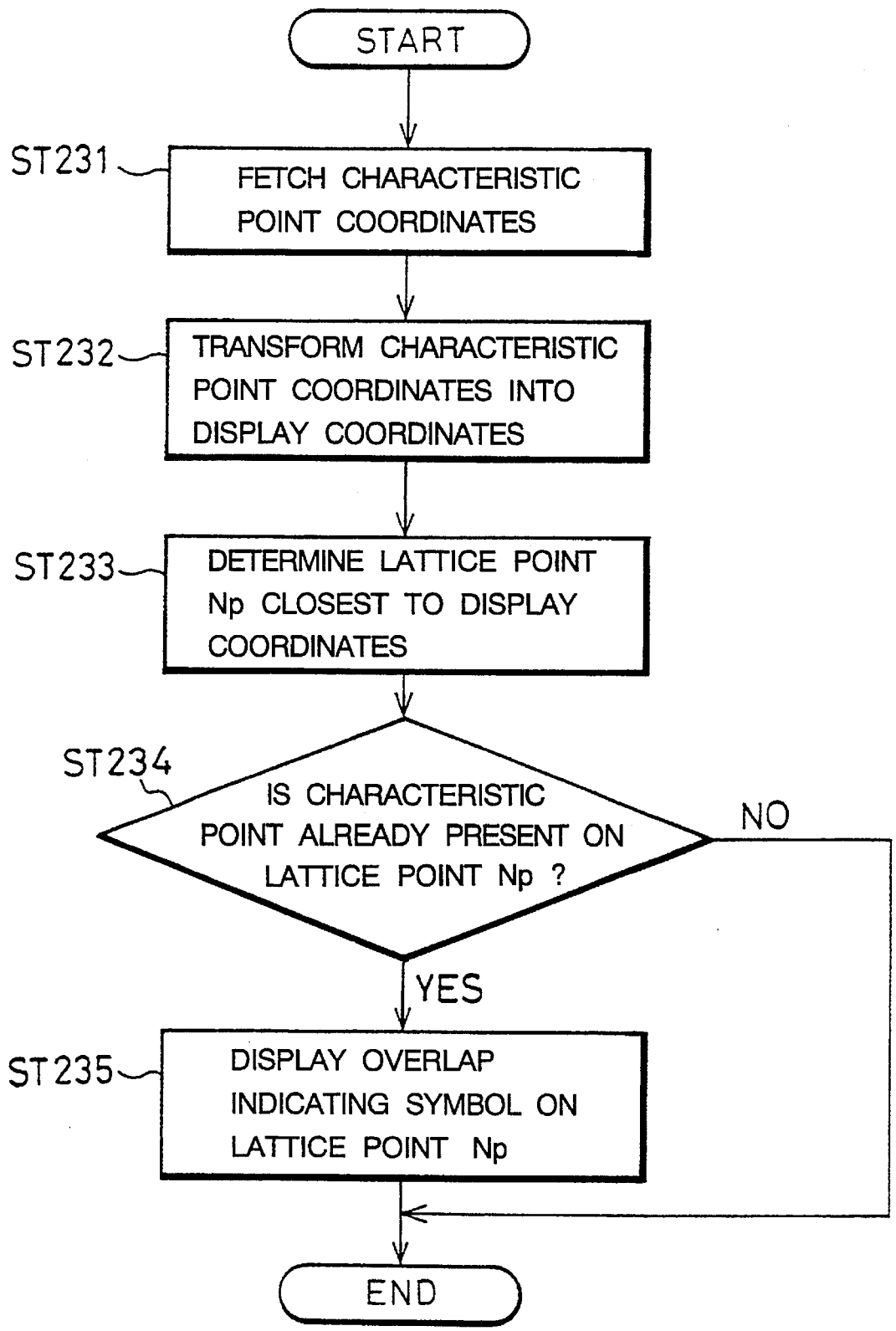
FIG. 23 is a flowchart showing the operation of a traffic information display system according to a sixth embodiment of the present invention.

FIG. 23 is a flowchart showing the operation of a traffic information display system according to a sixth embodiment of the present invention. The construction of this embodiment is the same as in FIG. 5 except that the control means 3A is replaced with another control means, which comprises the control means 3C used in the third embodiment and a display symbol indicating means as an additional means. The control means used in this sixth embodiment will hereinafter be referred to as control means 3F.

The operation of this embodiment will now be described. The processings based on the flowchart of FIG. 23 correspond to the processings of steps ST142–ST144 and of steps ST145–ST147 in the flowchart (relating to the third embodiment) of FIG. 14. The control means 3F fetches road data from the map information memory means 2 and transforms characteristic point coordinates (start or end characteristic point coordinates) into display coordinates (steps ST231 and ST232).

Figure 24:
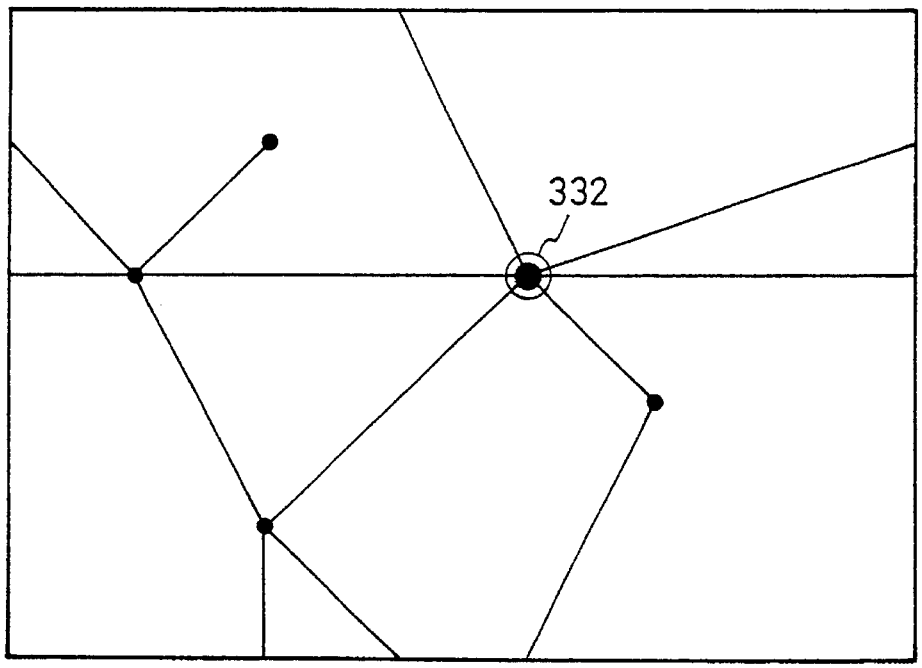
FIG. 24 is an explanatory view showing an example of a deformed map for display.

Next, the coordinate normalizing means sets as the display coordinates (start or end point display coordinates) the coordinates of a lattice point $N_p$ which is closest to the display coordinates (step ST233). In the case where the coordinates of the lattice point $N_p$ have already been adopted as the display coordinates, the display symbol indicating means instructs the deformed map preparing means 4 to make a display to the effect that characteristic points are overlapped at the display coordinates. In accordance with this instruction, the deformed map preparing means makes a symbolic display on the display means 5 (steps ST234 and ST235). The control means 3F performs the road display processing with respect to all of required roads, and finally a map having an overlapped intersection 332 indicated symbolically is displayed on the display means 5, as shown in FIG. 24.

The symbol color, size and shape may be rendered different according to the number of overlapped characteristic points, or the number of overlapped characteristic points may be displayed, or roads connected to one characteristic point out of characteristic points whose coordinates overlap each other, may be unified in the same color and roads connected to the other characteristic point unified in another color, or unique symbols may be put respectively on the roads connected to characteristic points.

Embodiment 7

Figure 25:
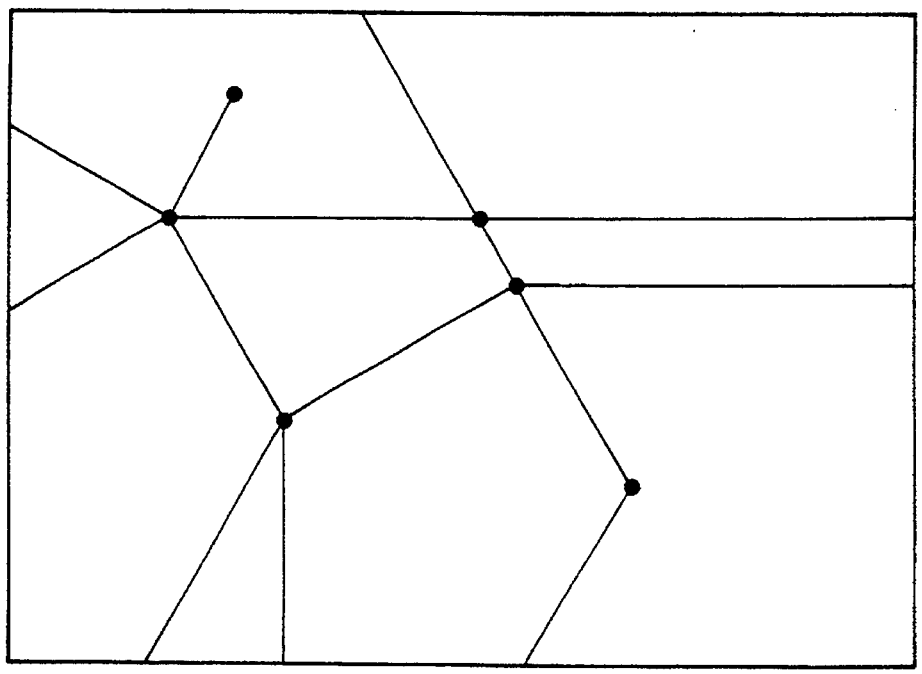
FIG. 25 is an explanatory view showing a deformed map displayed by a traffic information display system according to a seventh embodiment of the present invention.

FIG. 25 shows an example of a map displayed by a traffic information display system according to a seventh embodiment of the present invention. The construction of this embodiment is the same as in FIG. 5 except that the control means 3A is replaced with another control means which has, in addition to the function of the control means 3A, a function of calculating a road angle relative to a predetermined reference direction on the basis of start and end point coordinates of a required road and thereby normalizing the direction of the road.

The operation of this embodiment will now be described. In this embodiment, the angle of each road relative to the horizontal direction of the screen is set so as to be a multiple of 30°. More specifically, the control means fetches road data from the map information memory means 2 and calculates an angle of the road relative to a reference direction (e.g. the latitude direction) on the basis of start and end characteristic point coordinates. Then, the control means approximates the angle by a closest angle out of those which are multiples of 30° from the reference direction, then transforms the coordinates of start and end points at the approximated angle into display coordinates and provides the display coordinates to the deformed map preparing means 4. Usually, it is not always necessary for the driver that the road angle be displayed accurately. Rather, it is sometimes easier for the driver to see if the angle is normalized at every 30° or so. Thus, the map prepared in this embodiment is easier to understand for the driver.

Although the unit of normalization is set at 30° in this embodiment, it may be set at 45° for example. Further, start and end point display coordinates corresponding to normalized road angles may be stored in advance as start and end characteristic point coordinates.

Embodiment 8

Figure 26:
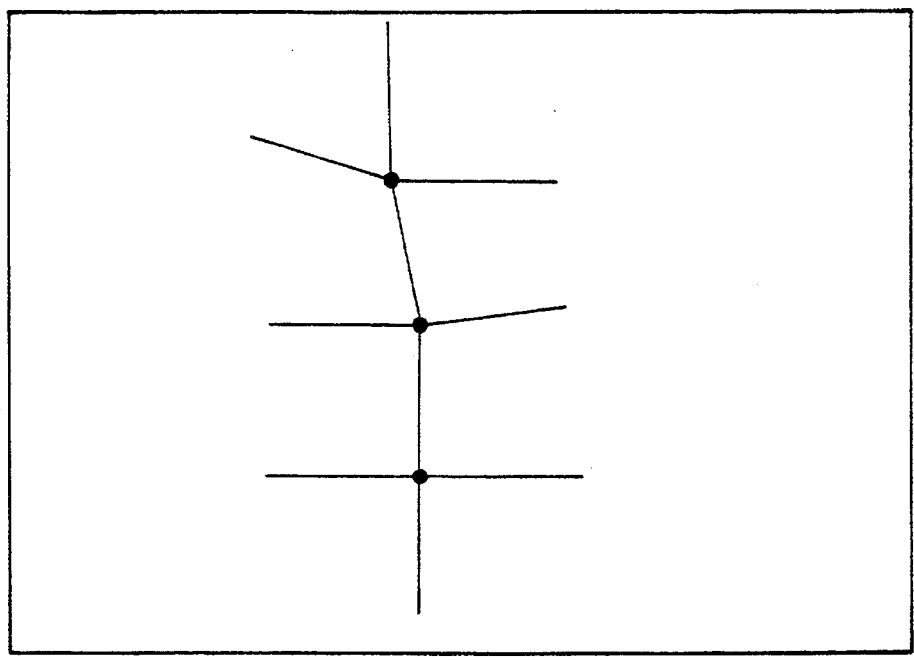
FIG. 26 is an explanatory view showing a deformed map displayed by a traffic information display system according to an eighth embodiment of the present invention.

FIG. 26 shows an example of a map displayed by a traffic information display system according to an eighth embodiment of the present invention. The construction of this embodiment is the same as in FIG. 5 except that the control means 3A is replaced with another control means which has, in addition to the function of the control means 3A, a function of calculating the length of each required road on the basis of start and end point coordinates of the road and then transforming the thus-calculated road lengths into the same length.

The operation of this embodiment will now be described. The control means fetches road data from the map information memory means 2 and transforms the coordinates of start and end characteristic points of each road so that the distance between the start and end points assumes a predetermined value. The control means further transforms the coordinates into display coordinates and provides them to the deformed map preparing means 4, which in turn displays on the display means 5 a map wherein the displayed roads are of a constant spacing between start and end points, as shown in FIG. 26. Thus, since the displayed roads on the map are unified in length, the map is easy to see for the driver.

Although the control means performs such coordinate transformations in this embodiment, start and end point display coordinates of roads having a unified length may be stored in advance.

Embodiment 9

Figure 27:
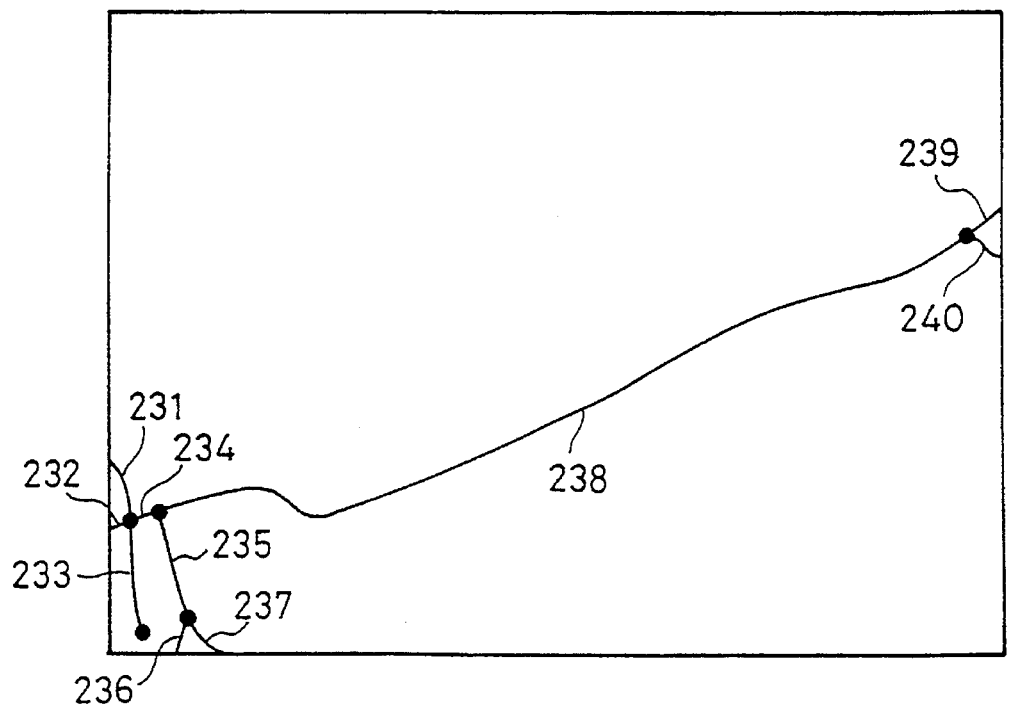
FIG. 27 is an explanatory view showing an example of a map actually.
Figure 28:
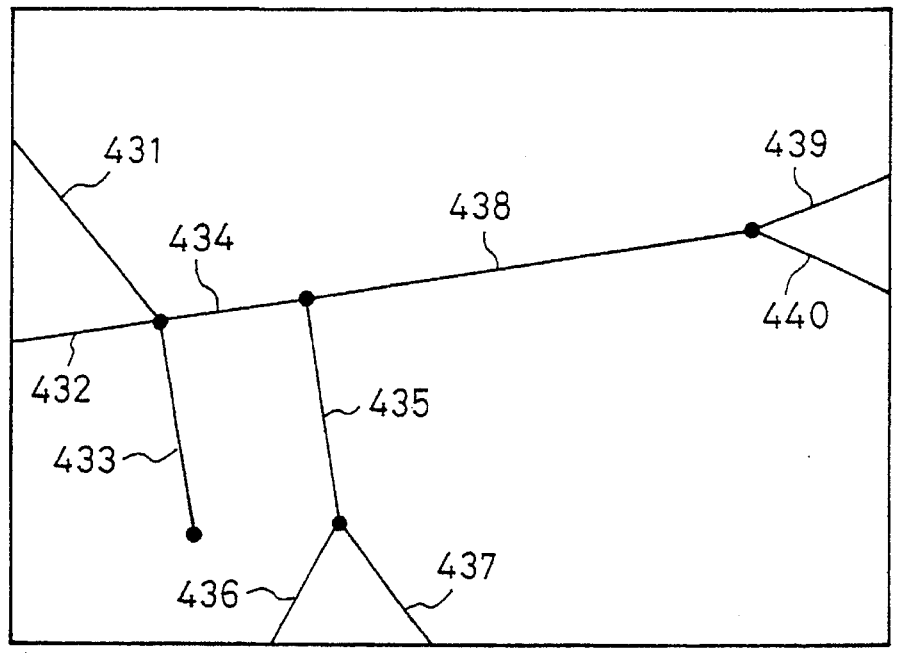
FIG. 28 is an explanatory view showing a deformed map displayed by a traffic information display system according to a ninth embodiment of the present invention.

FIG. 27 shows an example of an ordinary map, while FIG. 28 shows an example of a map displayed by a traffic information display system according to a ninth embodiment of the present invention. The construction of this embodiment is the same as in FIG. 5 except that the control means 3A is replaced with another control means which has, in addition to the function of the control means 3A, a function of calculating road lengths on the basis of start and end point coordinates of required roads and transforming them into predetermined values.

In the map shown in FIG. 27, the numerals 231 to 240 represent roads. Of these roads, the road 238 occupies the greater part of the map, so if this map is displayed as it is, the map will be very difficult to see. In view of this point, the road lengths are transformed in accordance with a predetermined rule before display.

The operation of this embodiment will now be described. The control means fetches road data from the map information memory means 2 and calculates road lengths on the basis of start and end characteristic point coordinates, then classifies the road lengths into three kinds—long, medium and short. Further, the control means allocates a length which symbolizes long roads, a length which symbolizes roads of a medium length, and a length which symbolizes short roads, to the three kinds, respectively, then transforms the road lengths into the allocated lengths and determines start and end point coordinates corresponding to the road lengths after the transformation. Then, the control means transforms the coordinates thus determined into display coordinates and provides them to the deformed map preparing means 4.

In the map shown in FIG. 27, the long, medium and short road lengths are allocated to the road 238, the roads 231, 233, 235 and the other roads, respectively. As a result, such a map as shown in FIG. 28 is displayed on the display means 5. In FIG. 28, a road 438 is of the long road length, while roads 431, 433 and 435 are of the medium road length. By thus displaying plural roads of greatly different lengths on one screen, there can be obtained a map which is easy to see. Although in this embodiment the control means classifies roads according to their lengths, start and end point display coordinates of roads pre-transformed into corresponding lengths out of the three kinds of lengths may be stored in advance.

Embodiment 10

Figure 29:
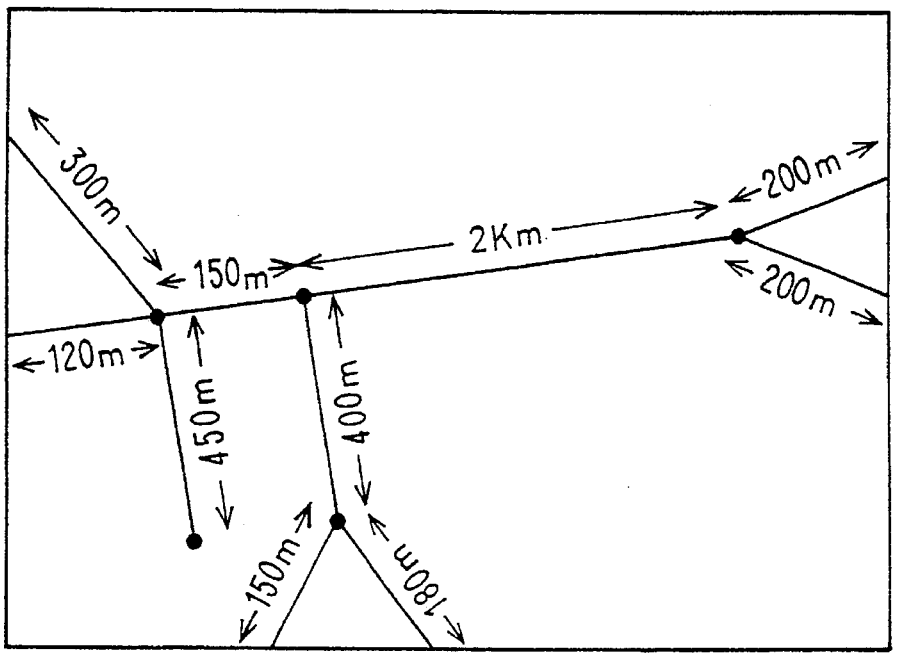
FIG. 29 is an explanatory view showing a deformed map displayed by a traffic information display system according to a tenth embodiment of the present invention.

FIG. 29 shows an example of a map displayed by a traffic information display system according to a tenth embodiment of the present invention. For example, in the displayed maps according to the seventh to ninth embodiments, the relation in length of the displayed roads is not coincident with the actual relation in length of the roads. In view of this point, the control means used in this embodiment provides information on the length of each road to the deformed map preparing means 4 and causes the display means 5 to also display road lengths. Thus, on seeing the deformed map, the driver can understand accurate road lengths.

Figure 30:
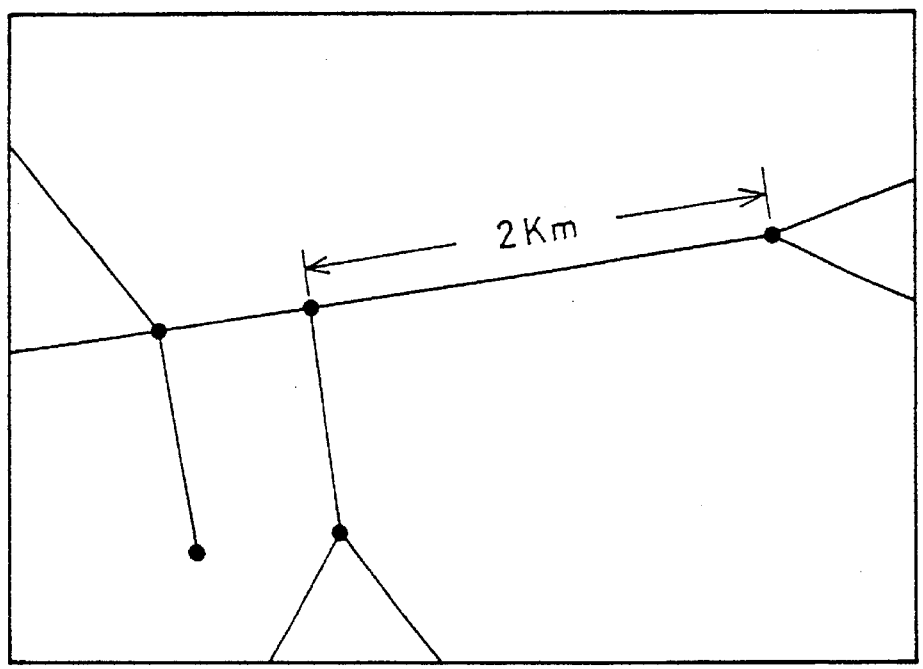
FIG. 30 is an explanatory view showing an example of a deformed map for display.
Figure 31:
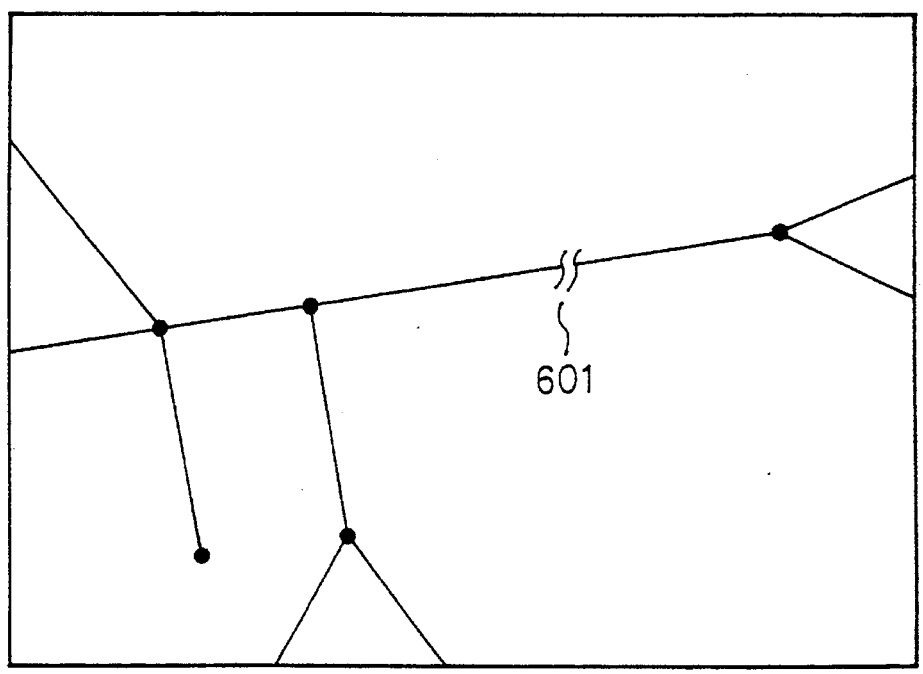
FIG. 31 is an explanatory view showing an example of a deformed map for display.

The display of length may be applied to only roads having lengths not smaller than a predetermined length, as shown in FIG. 30. This figure shows an example of a map in which the display of length is applied to only roads not shorter than 1 km. As shown in FIG. 31, a symbol, indicated at 601, may be put on each road having a length not smaller than a predetermined length. In this case, even when the driver has seen such a map having road lengths deformed, not concretely indicated, he can quickly recognize a road whose length is not smaller than the predetermined length.

Embodiment 11

Figure 32:
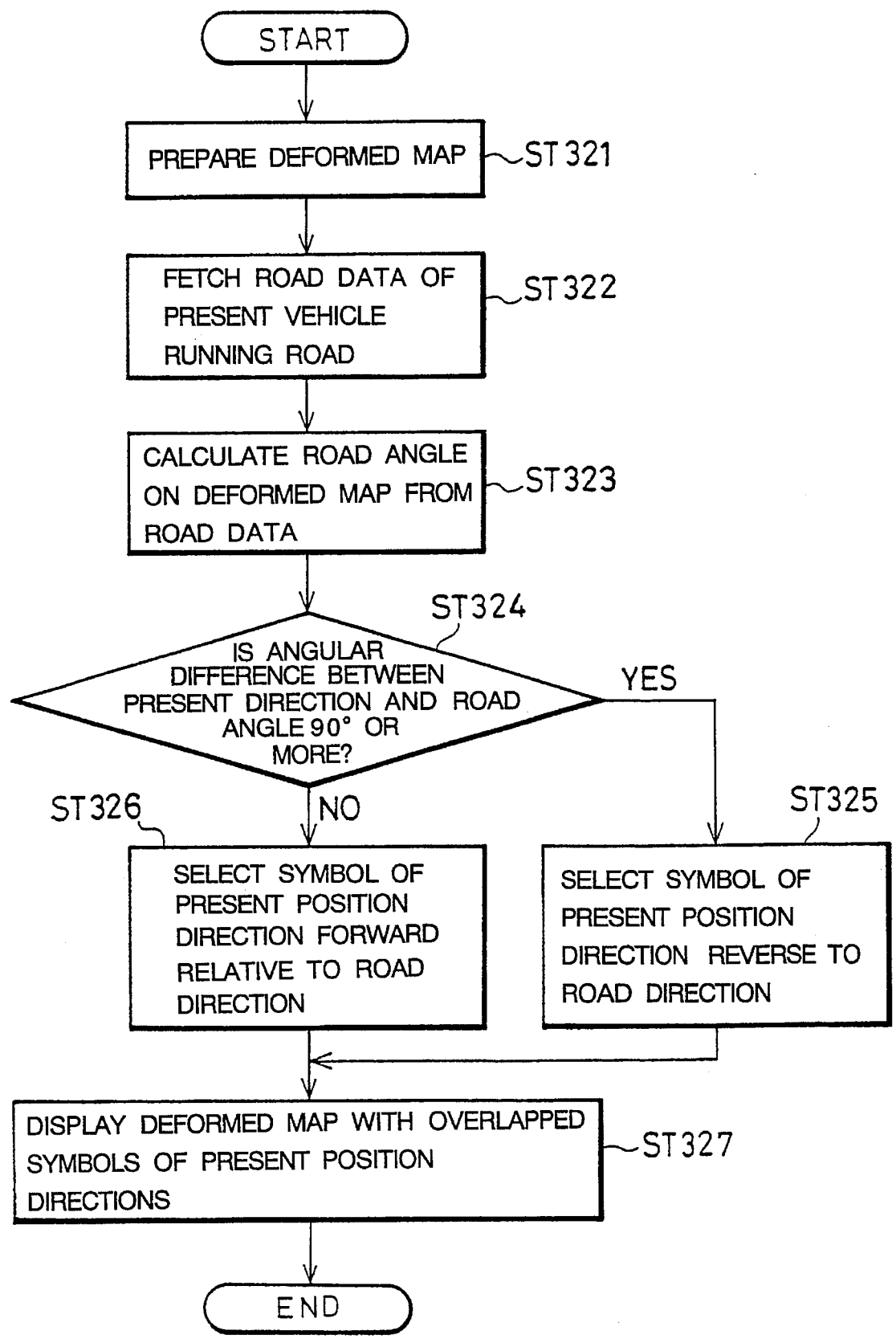
FIG. 32 is a flowchart showing the operation of a traffic information display system according to an eleventh embodiment of the present invention.

FIG. 32 is a flowchart showing the operation of a traffic information display system according to an eleventh embodiment of the present invention. The construction of this embodiment is the same as in FIG. 5 except that the control means 3A is substituted with a control means including a present position indicating means. This control means will hereinafter be referred to as control means 3G.

The operation of this embodiment will now be described. The control means 3G performs such processings as shown in the flowchart of FIG. 9 and causes the display means 5 to display a map through the deformed map display means 4 (step ST321).

Next, the present position indicating means fetches road data of the road (hereinafter referred to also as the "present road") on which the vehicle is present, from the map information memory means 2 (step ST322), and calculates an angle (relative to the latitude direction) on the basis of start and end characteristic point coordinates (step ST323).

Further, the present position indicating means compares the calculated angle with the vehicular advancing direction (expressed in terms of a clockwise angle, assuming due north to be 0°), and in the case of an angular difference of 90° or more, selects a symbol indicating an opposite direction with respect to the road direction (steps ST324 and ST325). If the angular difference is less than 90°, the present position indicating means selects a symbol indicating a forward direction with respect to the road direction (step ST326) and instructs the deformed map preparing means 4 to display the symbol indicating the selected direction. In accordance with that instruction, the deformed map preparing means 4 displays the symbol indicating the vehicular advancing direction on the display means 5 (step ST327).

Figure 33:
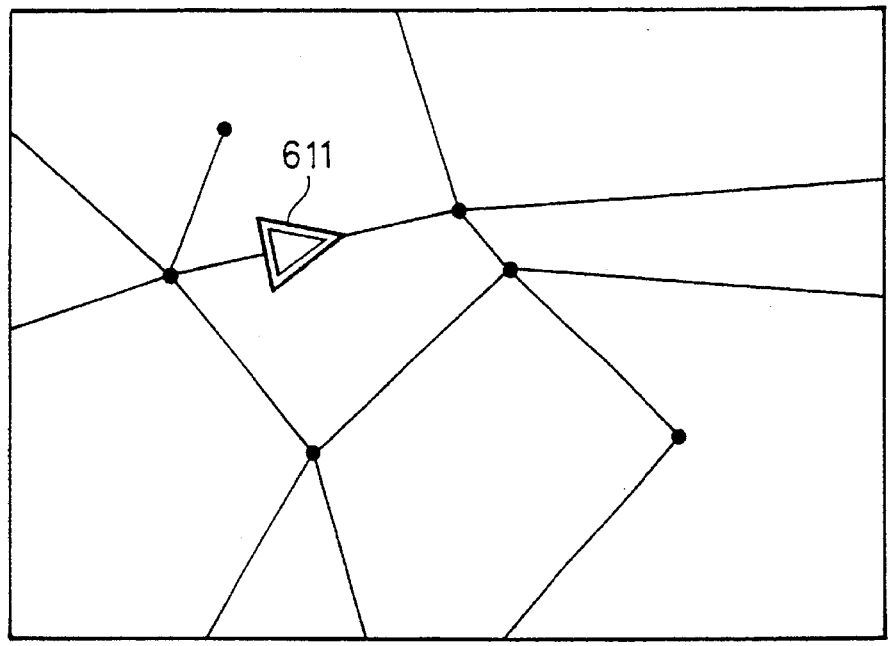
FIG. 33 is an explanatory view showing an example of a deformed map for display.

In this way, a deformed map having a symbol indicating the vehicular advancing direction and designated 611 is displayed on the display means 5, as shown in FIG. 33. On seeing this map, the driver can immediately recognize the present position and advancing direction of the vehicle.

Embodiment 12

Figure 34:
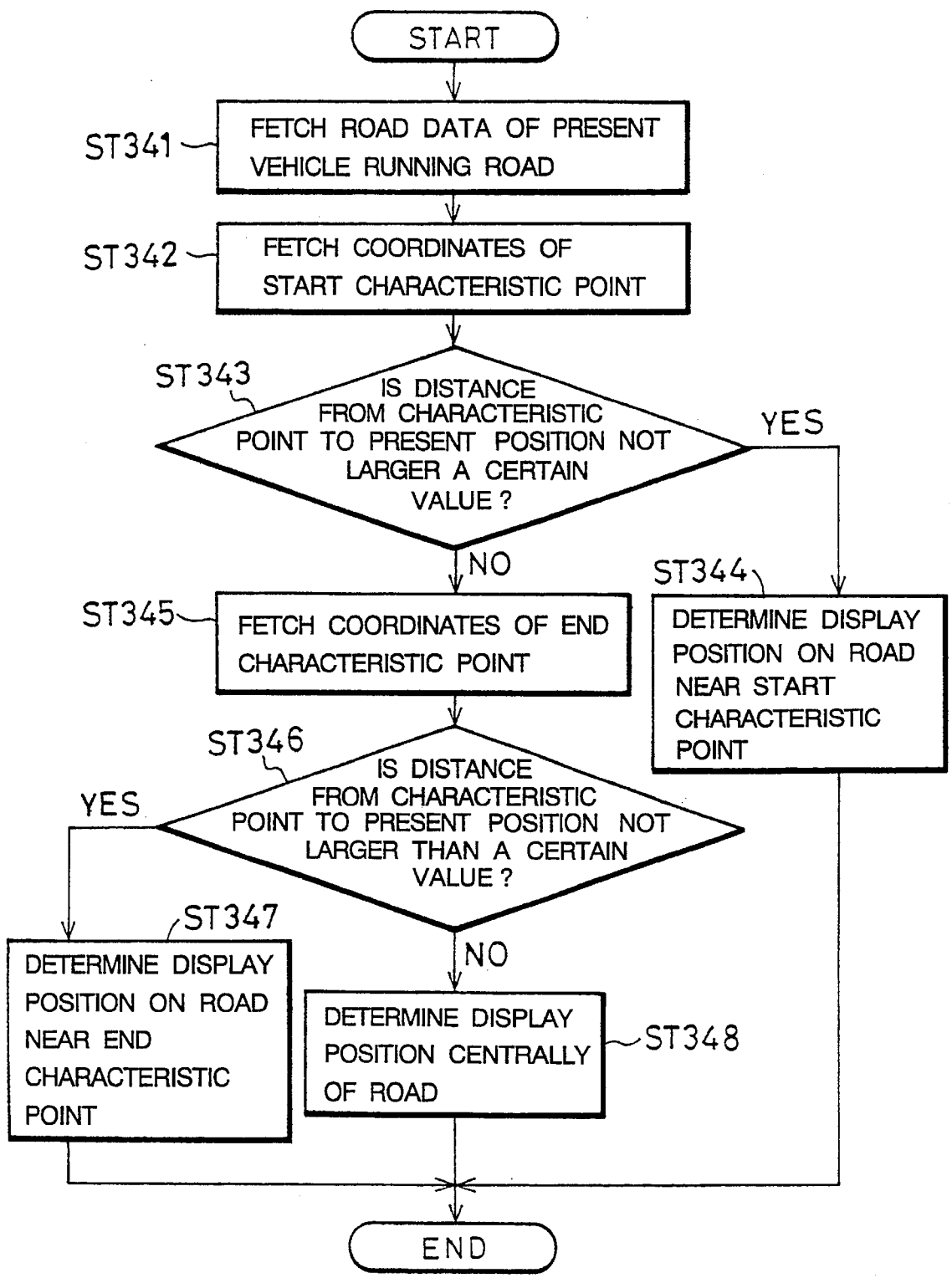
FIG. 34 is a flowchart showing a portion of the operation of a traffic information display system according to a twelfth embodiment of the present invention.

FIG. 34 is a flowchart showing a portion of the operation of a traffic information display system according to a twelfth embodiment of the present invention. The construction of this embodiment is the same as in FIG. 5 except that the control means 3A is substituted with a control means including both a present position indicating means and a display position changing means. The control means used in this embodiment will hereinafter be referred to as control means 3H.

The operation of this embodiment will now be described. The control means 3H performs such processings as shown in the flowchart of FIG. 9 and displays a map on the display means 5 through the deformed map display means 4. Next, the present position indicating means fetches road data of the road on which the vehicle is present, from the map information memory means 2 (step ST341), and selects a symbol indicating a vehicular advancing direction (this processing is not shown in FIG. 34) in the same way as in the eleventh embodiment. Further, the display position changing means fetches start characteristic point coordinates (step ST342), then compares the coordinates with the present position (step ST343), and determines the vicinity of the start characteristic point [see FIG. 35(a)] to be a display position if the distance between the coordinates and the present position is not larger than a certain value (e.g. 100 m) (step ST344). If not, the display position changing means fetches end characteristic point coordinates (step ST345), then compares the coordinates with the present position (step ST346) and determines the vicinity of the end characteristic point [see FIG. 35(C)] to be a display position if the distance therebetween is not larger than the certain value (step ST347). If not, the display position changing means determines a middle point [see FIG. 35(B)] to be a display position (step ST348).

Figure 35:
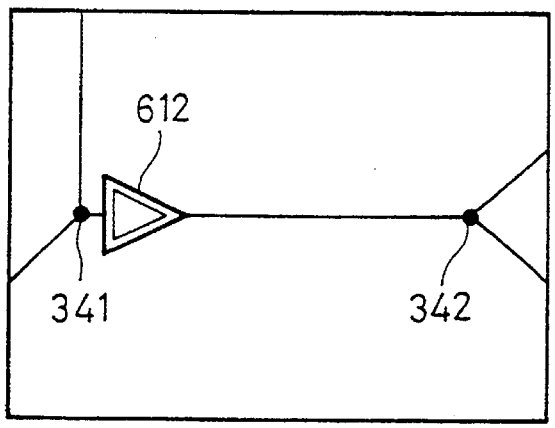
FIGS. 35A–C are explanatory view showing an example of a deformed map for display.
Figure 35:
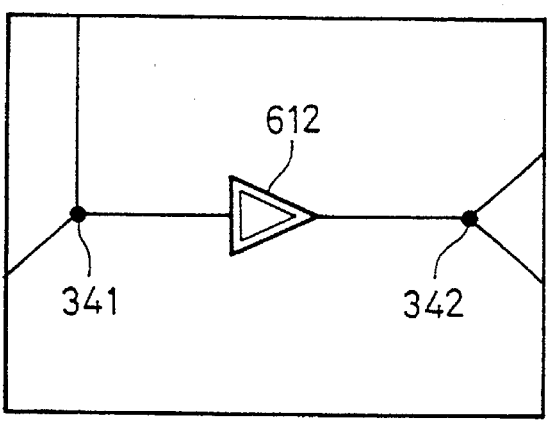
Figure 35:
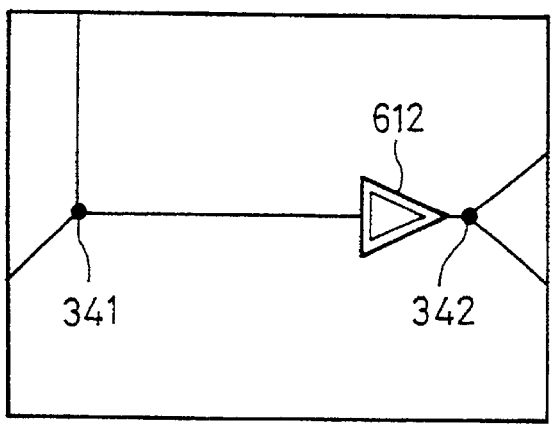

Then, the present position indicating means provides the symbol indicating the selected direction, as well as the display position thereof, to the deformed map preparing means 4. In this way, the map shown in FIG. 35(A), 35(B) or 35(C) is displayed on the display means 5. On seeing the map thus displayed, the driver can grasp an approximate present position of the vehicle. Updating of the display position of the displayed symbol is performed only at a timing corresponding to the time when the distance of the present position from a characteristic point has become above or below the certain value. Therefore, the frequency of the updating is low, and the burden on the control means 3H is small.

Embodiment 13

FIG. 36 is a flowchart showing a portion of the operation of a traffic information display system according to a thirteenth embodiment of the present invention. The construction of this embodiment is the same as in FIG. 5 except that the control means 3A is substituted by a control means including both a present position indicating means and a residual distance calculating means. The control means used in this embodiment will hereinafter be referred to as control means 31.

The operation of this embodiment will now be described. The control means 31 performs such processings as shown in the flowchart of FIG. 9 and displays a deformed map on the display means 5 through the deformed map preparing means 4. Next, the present position indicating means fetches road data of the present road from the map information memory means 2, then determines a vehicular advancing direction in the same way as in the eleventh embodiment (step ST361) and selects a symbol indicating the advancing direction. Further, the residual distance calculating means fetches end or start characteristic point coordinates according to whether the vehicular advancing direction is forward or reverse (steps ST362, ST363 and ST364), and calculates the distance from the present position up to the characteristic point (step ST365). The present position indicating means instructs the deformed map preparing means 4 to display a symbol indicating the selected direction, and the residual distance calculating means provides the calculated distance to the deformed map preparing means 4.

Figure 37:
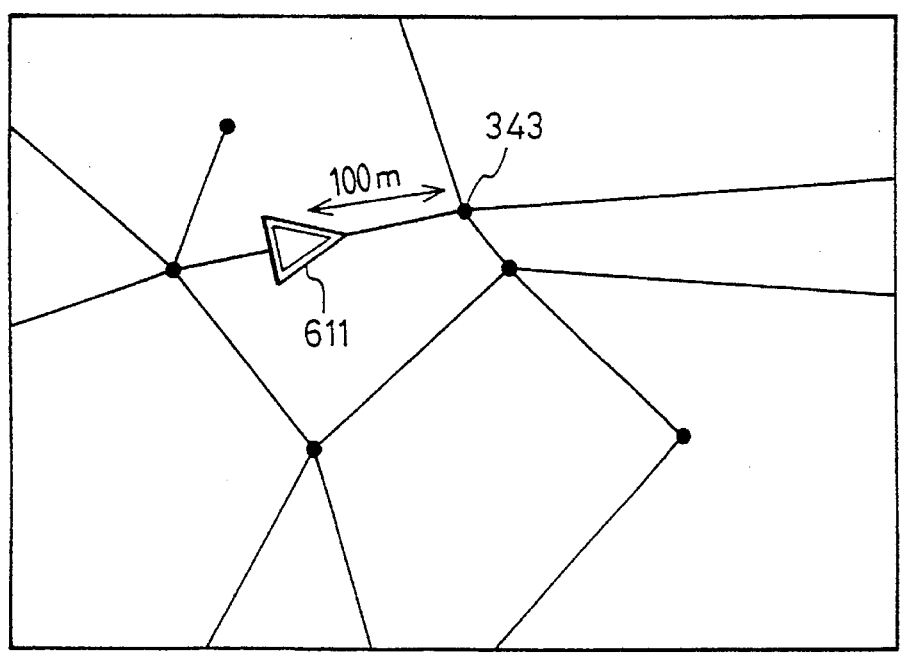
FIG. 37 is an explanatory view showing an example of a deformed map for display.

The deformed map preparing means displays on the display means 5 not only the symbol 611, indicating the vehicular advancing direction but also the distance up to the start or end point 343. In this way, a map such as, for example, the one shown in FIG. 37 is displayed on the display means 5. On seeing the displayed map, the driver can recognize the distance from the present position up to the next characteristic point and grasp the vehicular present position in more detail. Although the case where the distance from the present position up to the next characteristic point is to be displayed has been described above, when the next characteristic point is not an intersection or a dead end but a mere curved point, there may be displayed the distance up to the next intersection or dead end. Or there may be provided a voice output means to output the distance phonetically in accordance with instructions input to the operation means 6.

Embodiment 14

Figure 38:
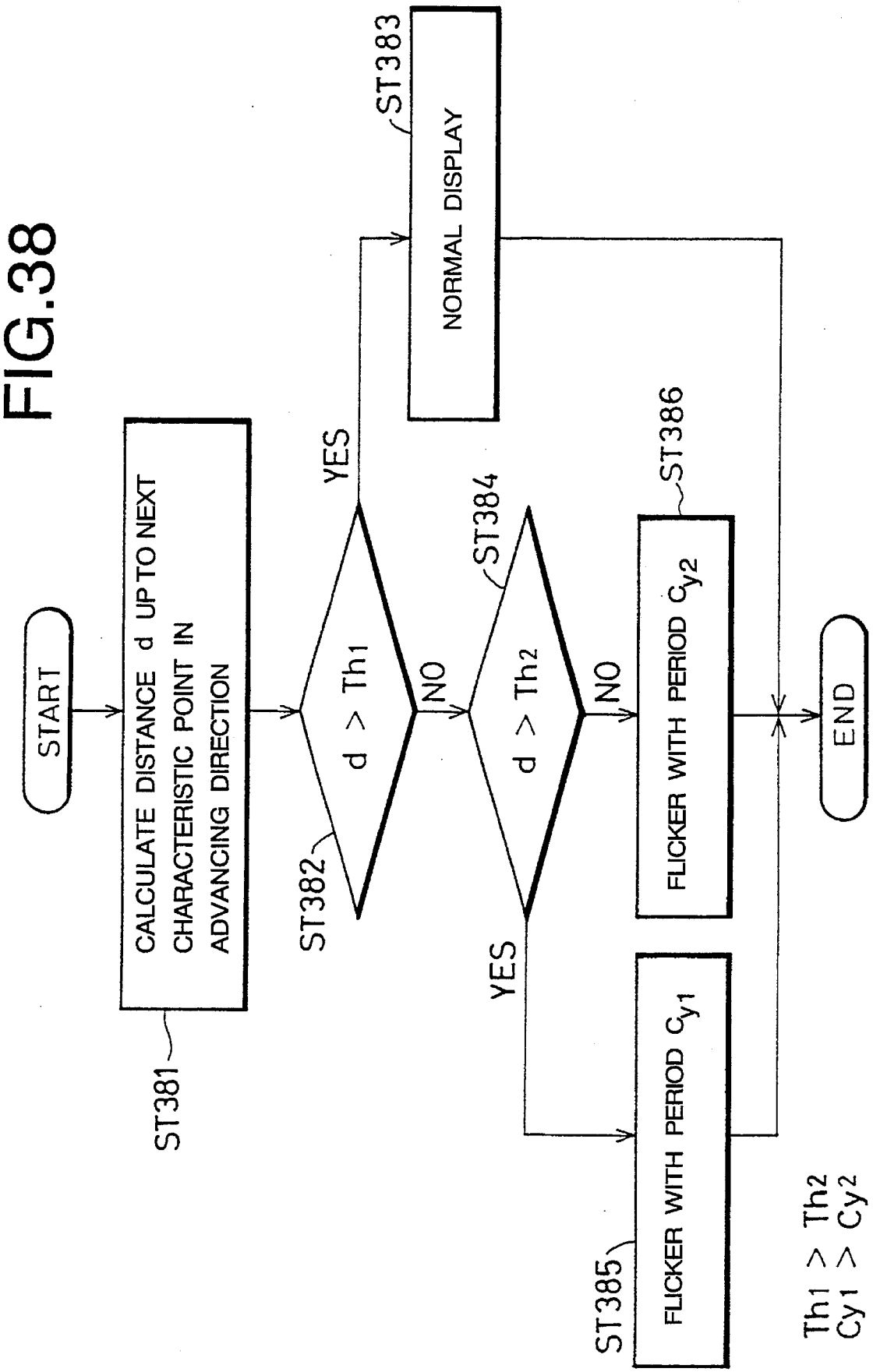
FIG. 38 is a flowchart showing a portion of the operation of a traffic information display system according to a fourteenth embodiment of the present invention.

FIG. 38 is a flowchart showing a portion of the operation of a traffic information display system according to a fourteenth embodiment of the present invention. The construction of this embodiment is the same as in FIG. 5 except that the control means 3A is substituted by a control means including both a present position indicating means and a flicker means. The control means used in this embodiment will hereinafter be referred to as control means 3J.

The operation of this embodiment will now be described. The control means 3J performs such processings as shown in the flowchart of FIG. 9 and displays a deformed map on the display means 5 through the deformed map preparing means 4. Next, the present position indicating means executes such processings as steps ST322 to ST327 shown in the flowchart of FIG. 32 and adds a symbol indicative of the present position of the vehicle to the displayed map.

The flicker means calculates the distance between the present vehicular position and a characteristic point present in the vehicular advancing direction on the present road (step ST381) and compares the calculated distance with threshold values $Th_1$, $Th_2$ ($Th_1 > Th_2$) (steps ST382 and ST384). If the distance is larger than the threshold value $Th_1$, the flicker means determines not to make a flicker display (step ST383). When the distance is between the threshold values $Th_1$ and $Th_2$, the flicker means determines to flicker the displayed symbol 611 (see FIG. 33) with a period of $Cy_1$ (step ST385). And when the distance is smaller than the threshold value $Th_2$, the flicker means determines to flicker the displayed symbol 611 with a period of $Cy_2$ ($Cy_1 > Cy_2$) (step ST386).

When the flicker means determines flickering, it outputs a command for lighting the symbol and a command for putting out the light to the deformed map preparing means 4 repeatedly in accordance with the flicker periods $Cy_1$ and $Cy_2$. Through the above processings, the displayed symbol 611 flickers with a shorter period as the vehicle approaches a characteristic point, whereby the driver can easily understand that the vehicle is approaching the characteristic point. Instead of flickering the displayed symbol 611, a characteristic point present ahead of the symbol 611 may be flickered. Further, instead of changing the flicker periods $Cy_1$ and $Cy_2$, the color, size and brightness of the symbol 611 may be changed.

Embodiment 15

Figure 39:
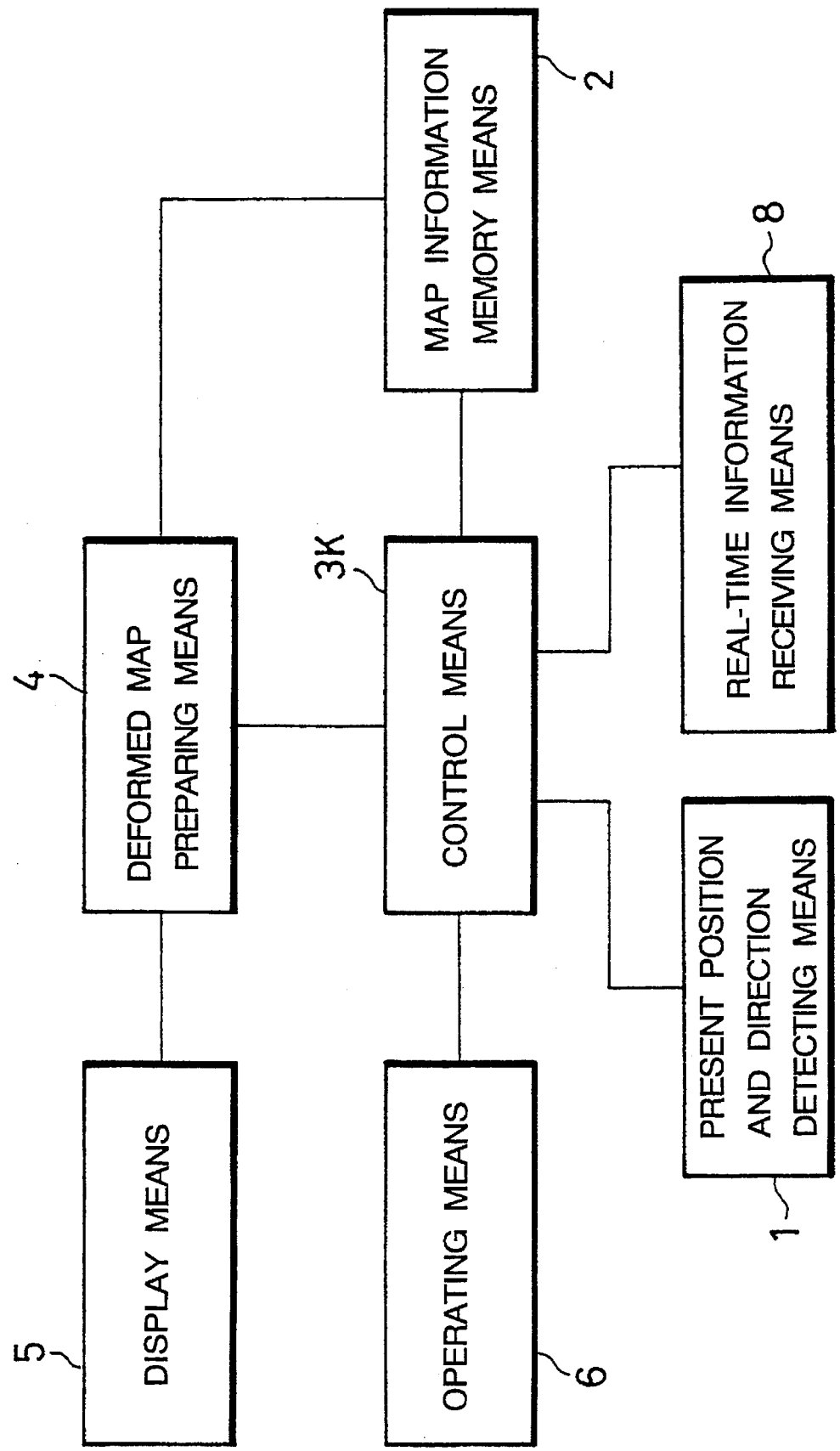
FIG. 39 is a block diagram of a traffic information display system according to a fifteenth embodiment of the present invention.

FIG. 39 is a block diagram of a traffic information display system according to a fifteenth embodiment of the present invention. In the same figure, the numeral 3K denotes a control means which has, in addition to the function of the control means 3A shown in FIG. 5, a function of instructing a symbolic display according to real-time information and a function of a display road selecting means for selecting roads of the same road type, and the numeral 8 denotes a real-time information receiving means for receiving real-time information such as a traffic congestion information from the exterior. Other constructional elements of this embodiment are the same as and indicated by the same reference numerals as in FIG. 5.

Figure 40:
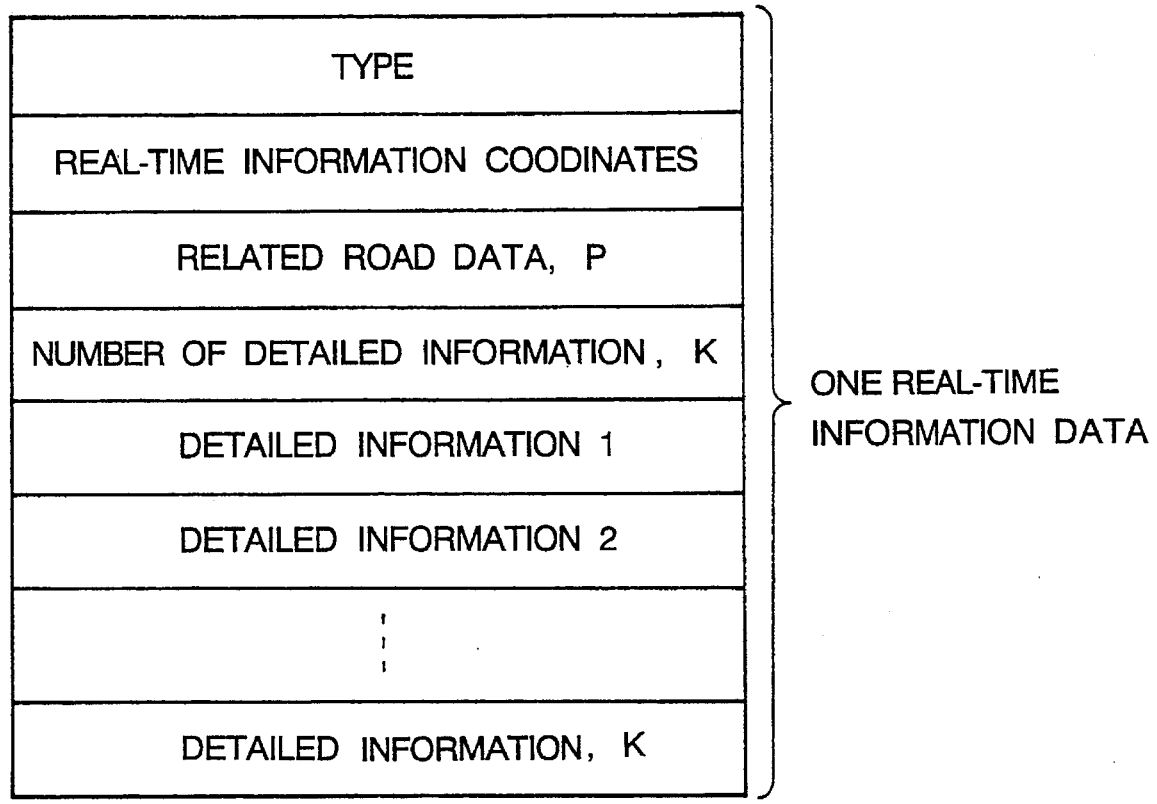
FIG. 40 is an explanatory view showing a construction example of real-time information.
Figure 41:
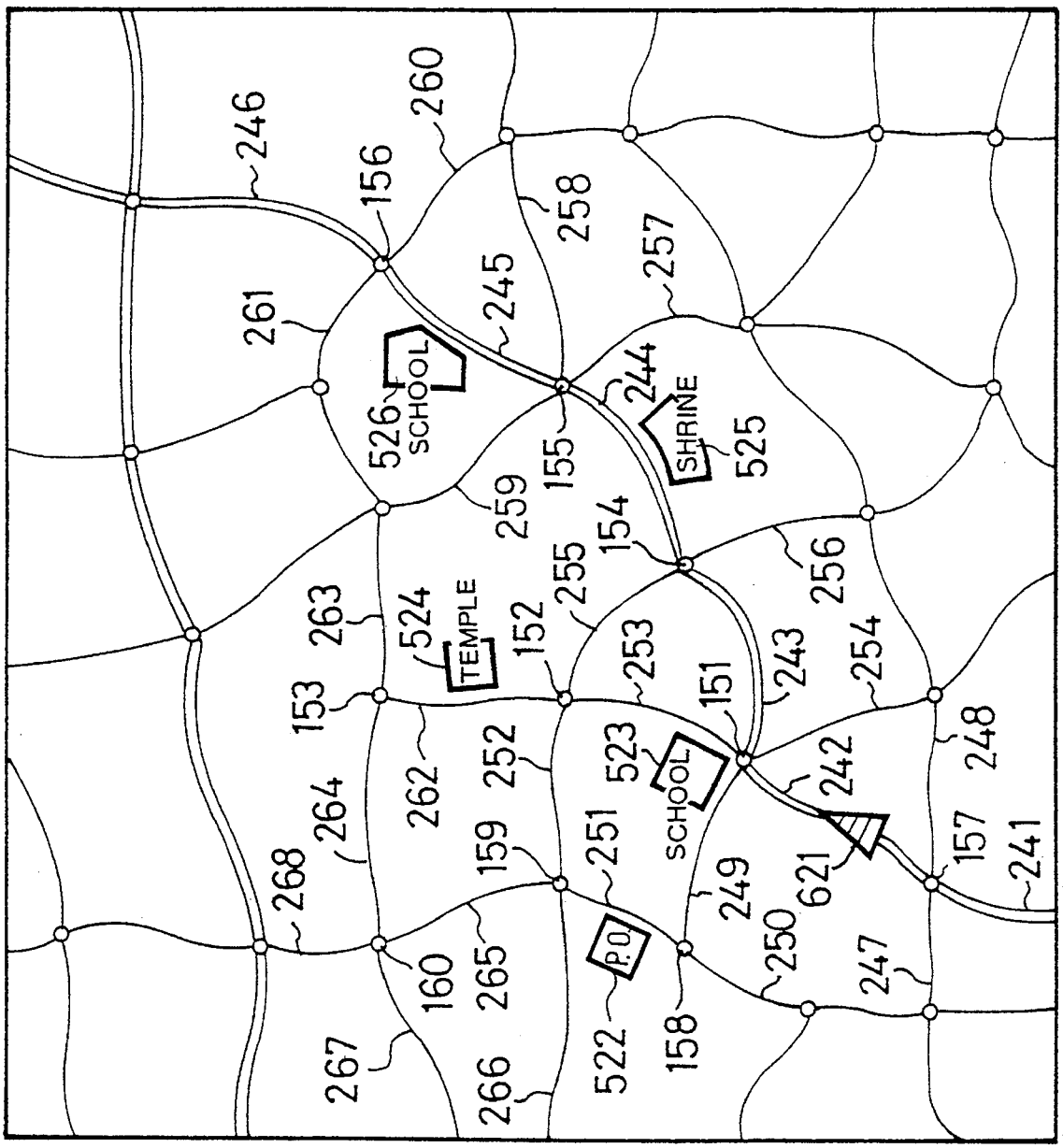
FIG. 41 is an explanatory view showing an example of an actual map.
Figure 42:
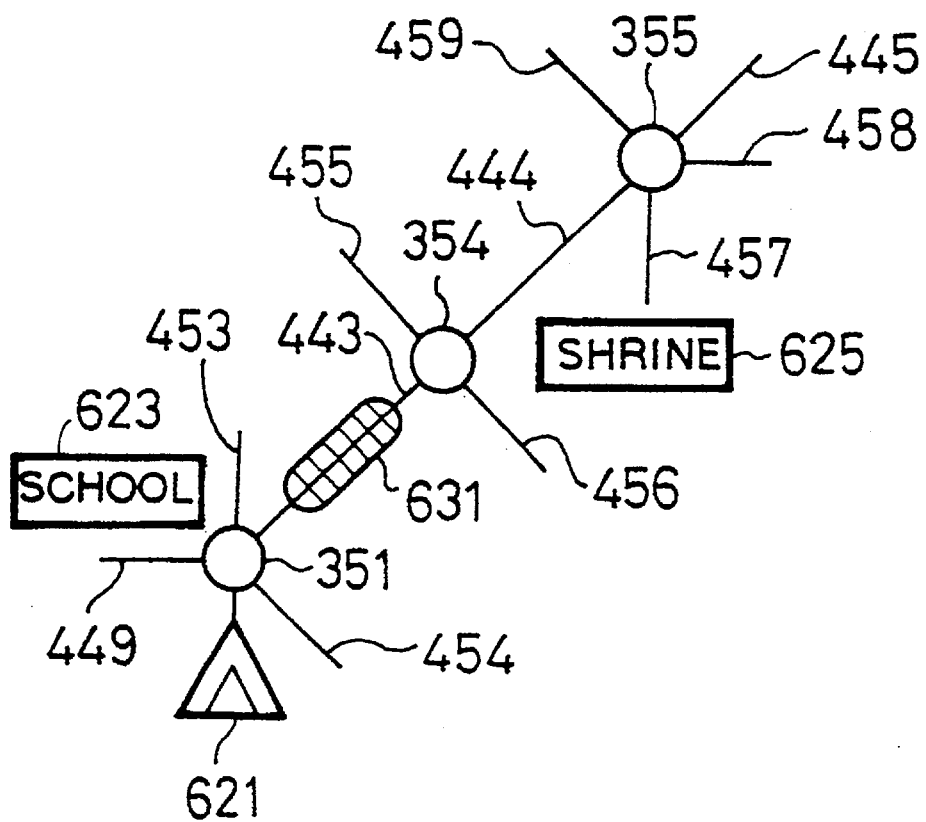
FIG. 42 is an explanatory view showing an example of a deformed map for display.

FIG. 40 shows an example of format of real-time information provided from the exterior, FIG. 41 shows an example of an actual map, and FIG. 42 shows an example of a deformed map displayed by the display system of this embodiment. In FIG. 41, the numerals 151 to 160 represent characteristic points provided characteristic points not indicated by reference numerals in the figure are also existent, the numerals 241 to 268 represent roads, provided roads not indicated by reference numerals in the figure are also existent, the numerals 522 to 526 represent facilities, and numeral 621 represents the present position of the vehicle. In FIG. 42, the numerals 351, 354 and 355 represent symbols indicative of characteristic points, the numerals 449 to 459 represent roads, the numerals 623 and 625 represent facilities, the numeral 621 represents a symbol indicative of the present position of the vehicle, and numeral 631 represents a symbol indicative of a section of traffic congestion.

Figure 43:
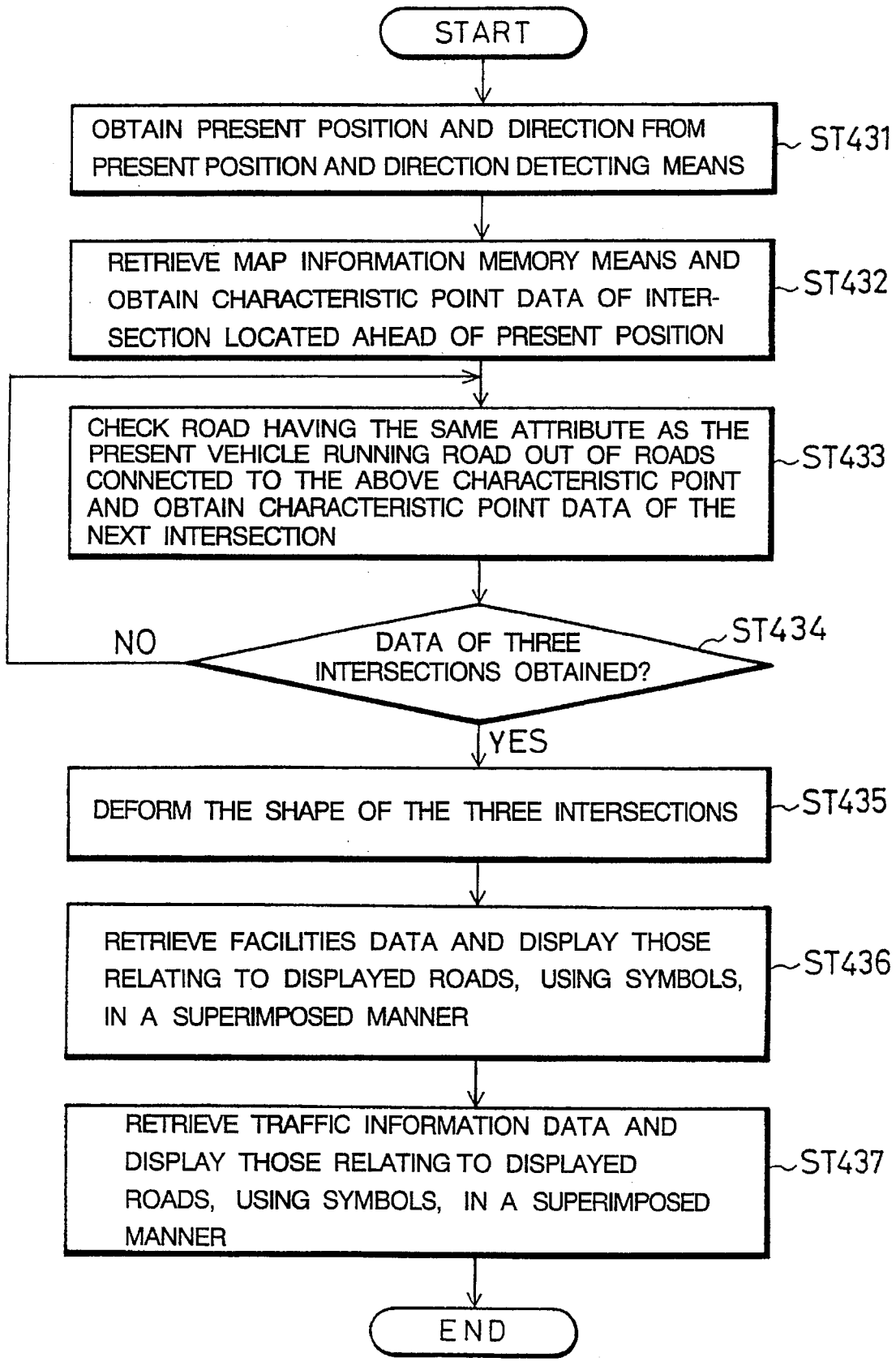
FIG. 43 is a flowchart showing the operation of the traffic information display system of the fifteenth embodiment.

The operation of this embodiment will now be described with reference to the flowchart of FIG. 43. First, the control means 3K fetches road data of required roads from the map information memory means 2 and displays those roads and characteristic points on the display means 5 through the deformed map preparing means 4.

For example, the required roads are selected to be roads which are connected to three characteristic points (also referred to as "intersections" hereinafter) present in a vehicular advancing direction as seen from a vehicular present position. The control means 3K first determines a present position and an advancing direction of the vehicle on the basis of the output of the present position and direction detecting means 1 (step ST431). Next, the control means 3K fetches road data of the road on which the vehicle is present, and obtains characteristic point data of an intersection (start or end characteristic point of the road) positioned next on the road in the advancing direction (step ST432). Subsequently, the control means 3K fetches road data of roads connected to that intersection, then selects a road having the same attribute as that of the road on which the vehicle is present, and obtains characteristic point data of a tip intersection (start or end characteristic point) of the selected road (step ST433). In this case, the road 242 is selected and the intersection 151 is obtained.

The same processing as above is performed with respect to three intersections (step ST434). In this case, there finally are obtained intersections 351, 354 and 355. The control means 3K transforms the characteristic point coordinates of the intersections 351, 354 and 355 into display coordinates and provides the display coordinates, as well as a command to connect those intersections using straight lines, to the deformed map preparing means 4. Further, the control means 3K normalizes the roads connected to the intersections 351, 354 and 355 (the normalization is performed, for example, by the method used in the seventh embodiment) and provides a command for display of the thus-normalized roads. In accordance with the information thus provided, the deformed map preparing means 4 displays a deformed map on the display means 5 (step ST435).

The control means 3K fetches facilities data of facilities adjoining to the displayed roads, from the map information memory means 2. The control means 3K then transforms the coordinates of the facilities into display coordinates, and provides the display coordinates, as well as a command for display of the facilities, to the deformed map preparing means 4, which in turn displays symbols indicative of the facilities on the display means 5 on the basis of the information thus provided (step ST436).

Further, the control means 3K receives real-time information through the real-time information receiving means 8. If a traffic congestion information is included in the real-time information, the control means provides to the deformed map preparing means 4 a command for affixing a symbol indicative of traffic congestion to the road corresponding to the information. In accordance with this command, the deformed map preparing means 4 displays the congestion symbol in the corresponding position on the display screen (step ST437). In this way the map shown in FIG. 42 is displayed on the display means 5. Although three intersections are displayed in this embodiment, four or more intersections may be displayed.

Embodiment 16

Figure 44:
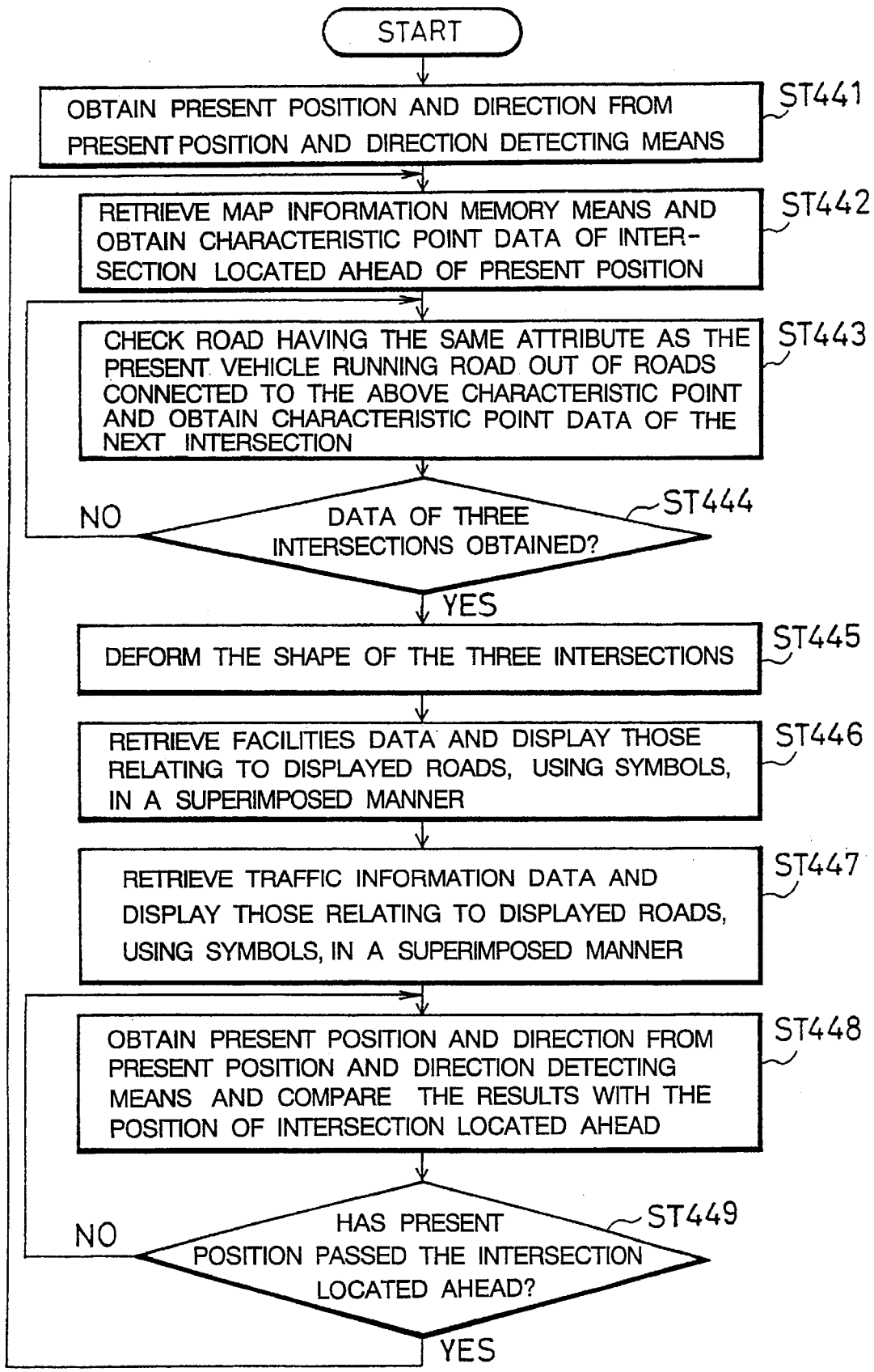
FIG. 44 is a flowchart showing the operation of a traffic information display system according to a sixteenth embodiment of the present invention.

FIG. 44 is a flowchart showing the operation of a traffic information display system according to a sixteenth embodiment of the present invention. The construction of this embodiment is the same as in FIG. 39 except that the control means 3K is substituted by a control means having a screen updating means for updating the display screen automatically. The control means used in this embodiment will hereinafter be referred to as control means 3L.

Figure 45:
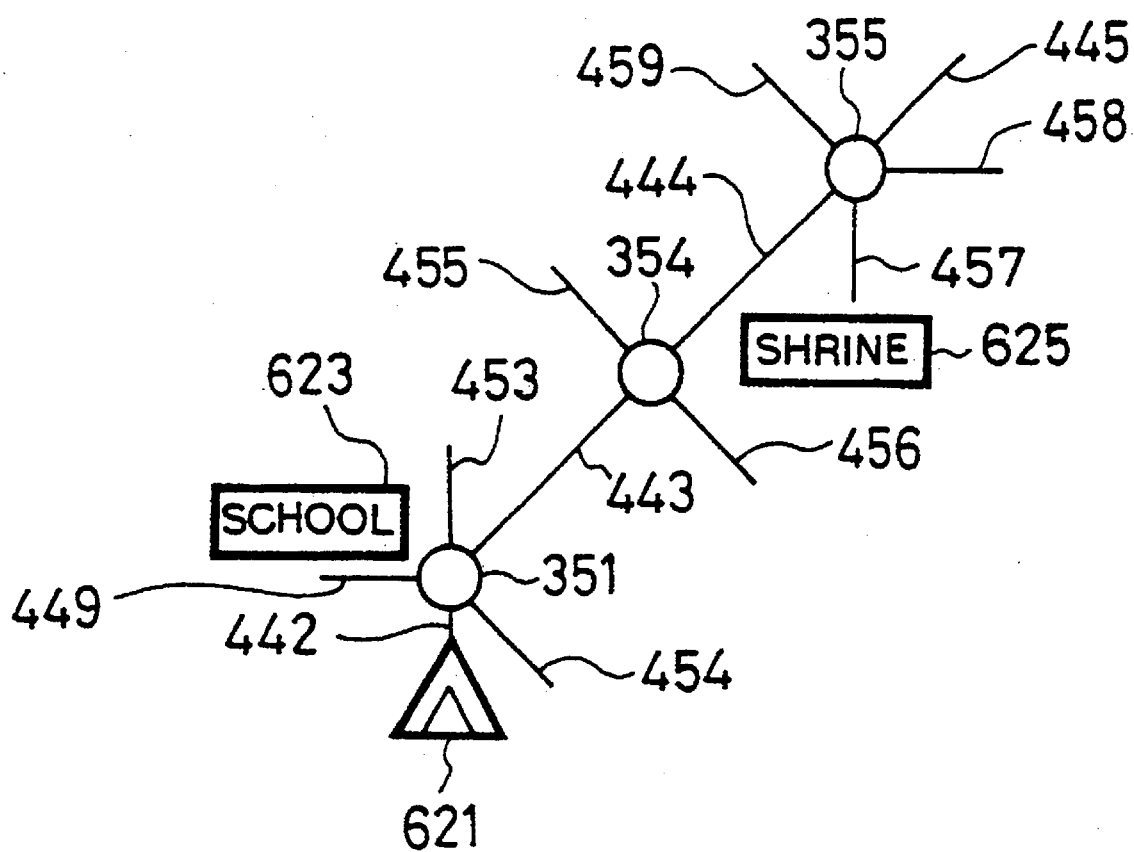
FIG. 45 is an explanatory view showing an example of a deformed map before updating.
Figure 46:
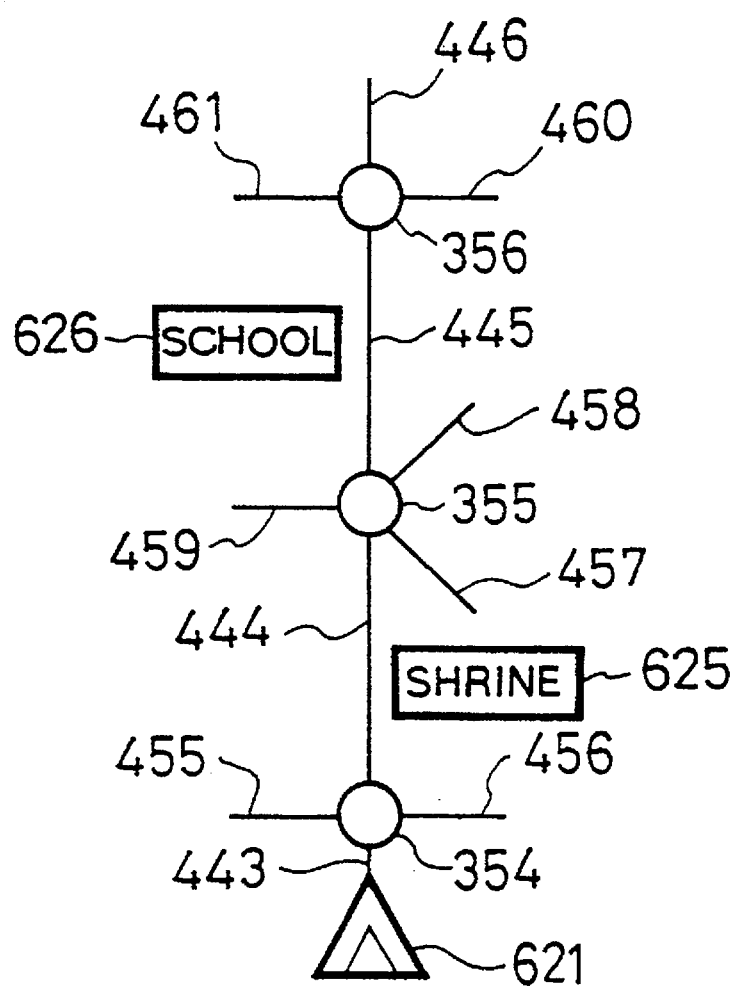
FIG. 46 is an explanatory view showing an example of a deformed map after updating.

The operation of this embodiment will now be described. The control means 3L operates in the same manner as the control means shown in FIG. 39 (steps ST441 to ST447) and displays a deformed map on the display means 5 through the deformed map preparing means 4. In this way there is displayed, for example, a map as is shown in FIG. 45. The control means 3L grasps the present position of the vehicle at all times using the present position and moving direction detecting means 1, and compares the vehicular present position with the position of intersection 151 (see FIG. 41) present ahead of the vehicle (step ST448). On detecting that the vehicle passed the intersection 151 (step ST449), the control means executes the processings of steps ST442 to ST447 with respect to another road 243 and displays a new map on the display means 5 through the deformed map preparing means 4. In this way such a new map as shown in FIG. 46 is displayed on the display means.

Embodiment 17

Figure 47:
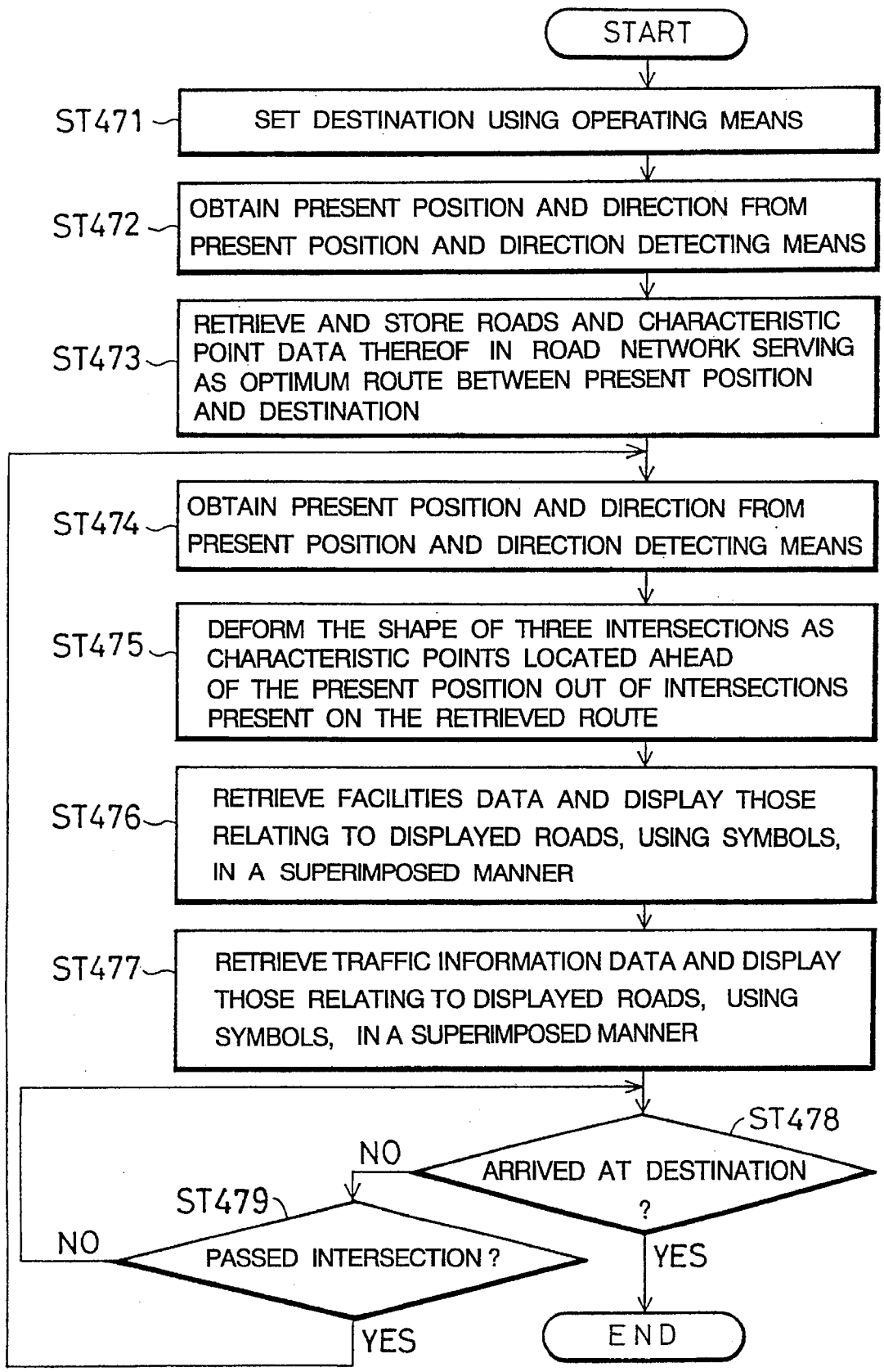
FIG. 47 is a flowchart showing the operation of a traffic information display system according to a seventeenth embodiment of the present invention.
Figure 48:
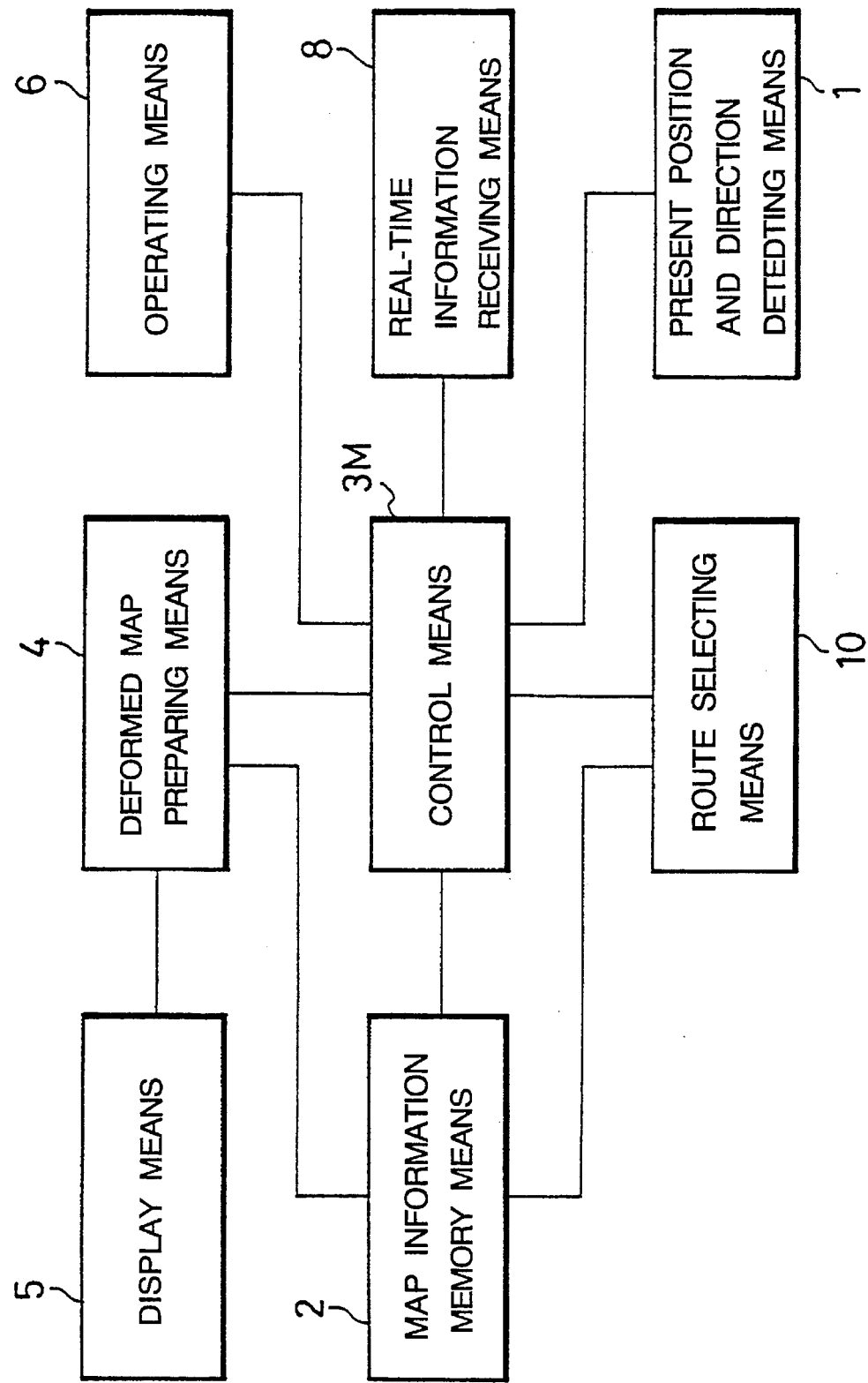
FIG. 48 is a block diagram of a traffic information display system according to an eighteenth embodiment of the present invention.

FIG. 47 is a flowchart showing the operation of a traffic information display system according to a seventeenth embodiment of the present invention, and FIG. 48 is a block diagram of the same system. In FIG. 48, the numeral 10 denotes a route selecting means for calculating and selecting an optimum route between the present position of the vehicle and a destination inputted to the operation means 6, and the numeral 3M denotes a control means for making a control to display the route selected by the route selecting means 10.

The operation of this embodiment will now be described. The following description is, for example, of the case where the driver has designated the intersection 160 as a destination (step ST471). The control means 3M determines a present position and an advancing direction of the vehicle on the basis of the output of the present position and moving direction detecting means 1 (step ST472). The route selecting means 10 retrieves the map information memory means 2 to obtain constituent roads of the optimum route (e.g. a route of the shortest distance) between the destination and the present position. Also, the route selecting means 10 fetches start and end characteristic points of the roads from the map information memory means 2 and stores them in RAM or the like (step ST473). In this case, the route from the present position up to the destination is obtained as intersections 151, 158, 159, 166 and roads 249, 251, 265, so characteristic points are fetched on the basis of the results of the selection. Although in this embodiment the route selecting means 10 selected a route from the present position to the destination, the driver may designate such route using the operation means 6.

The control means 3M transforms the coordinates of three intersections present ahead of the vehicular present position into display coordinates and provides the display coordinates, as well as a command to connect those intersections using straight lines, to the deformed map preparing means 4. Further, the control means normalizes the roads which are connected to the intersections and provides a command to display the thus-normalized straight lines to the deformed map preparing means 4. In accordance with the information thus provided, the deformed map preparing means 4 prepares a deformed map on the display means 5 (step ST475). Further, the control means 3M fetches data of facilities adjoining to the displayed roads from the map information memory means 2, then transforms the coordinates of the facilities into display coordinates, and provides the display coordinates, as well as a command to display the facilities, to the deformed map preparing means 4, which in turn displays symbols indicative of the facilities on the display means 5 on the basis of the information thus provided (step ST476).

Figure 49:
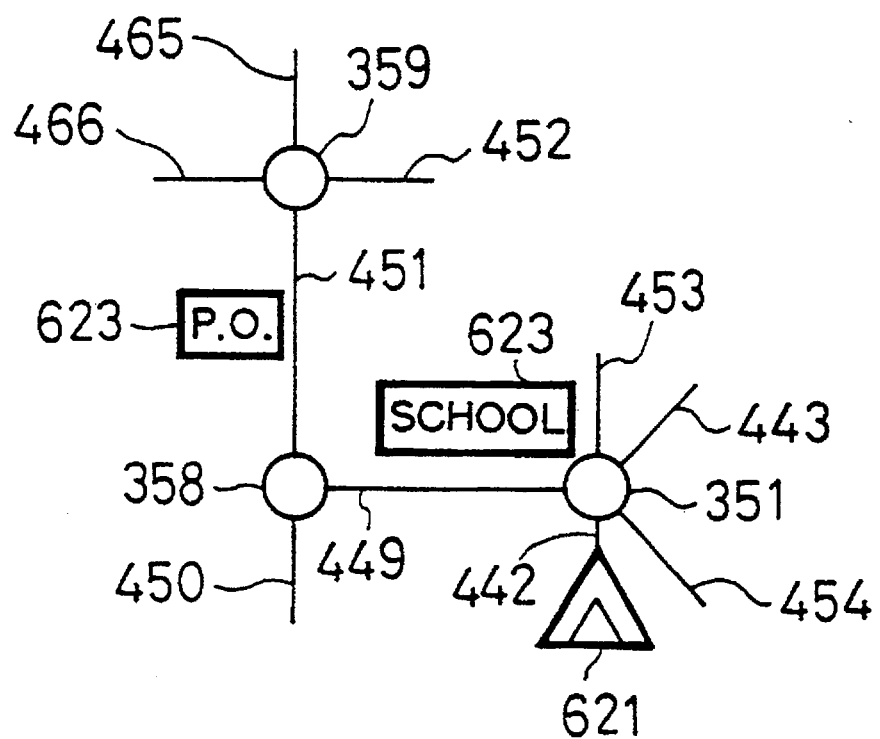
FIG. 49 is an explanatory view showing an example of a deformed map for display.

The control means 3M receives real-time information through the real-time information receiving means 8. If a traffic congestion information is contained in the real-time information, the control means provides to the deformed map preparing means 4 a command to affix a symbol indicative of traffic congestion to the road corresponding to the information. In accordance with this command the deformed map preparing means 4 displays a symbol indicative of traffic congestion in the corresponding position on the display screen (step ST477). In this way, a map as is shown in FIG. 49 is displayed on the display means 5, provided the symbol indicative of traffic congestion is not shown. The processings of steps ST474 to ST477 are executed until the vehicle reaches the destination (step ST478). When the vehicle has passed a certain intersection, the control means 3M obtains the coordinates of three intersections on the basis of a new present position of the vehicle, and the display map is updated on the basis of those coordinates (step ST479).

Although three intersections are displayed in this embodiment, four or more intersections may be displayed.

Embodiment 18

Figure 50:
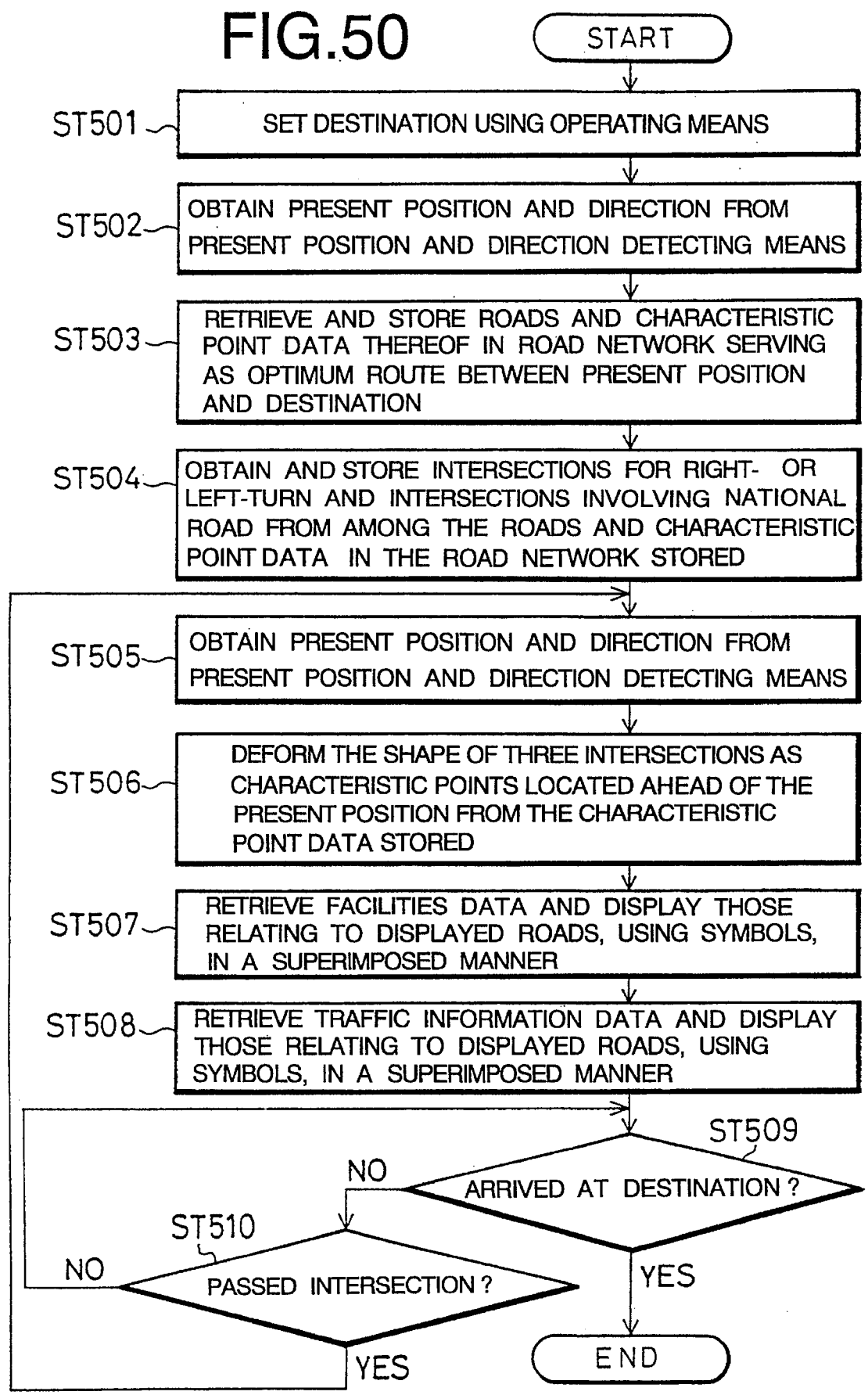
FIG. 50 is a flowchart showing the operation of the traffic information display system of the eighteenth embodiment.

FIG. 50 is a flowchart showing the operation of a traffic information display system according to an eighteenth embodiment of the present invention. The construction of this embodiment is the same as in FIG. 48 except that the control means 3M is substituted by a control means including means for selecting, as display roads, characteristic intersections present on the route which has been selected by the route selecting means 10, such as right- or left-turn intersections and intersections including a national road. The control means used in this embodiment will hereinafter be referred to as control means 3X.

The operation of this embodiment will now be described. The following description is, for example, of the case where an optional point on the road 267 has been set as a destination by the driver using the operating means 6 (step ST501). The route selecting means 10 determines a present position and an advancing direction of the vehicle on the basis of the output of the present position and direction detecting means 1 (step ST502). The route selecting means 10 then selects roads which constitute a route of the shortest distance between the vehicular present position and the destination, fetches start and end characteristic points of the roads from the map information memory means 2 and stores them in a RAM or the like (step ST503). The method of calculating the route of the shortest distance is found in the results of various researches based on the network theory and an explanation thereof is here omitted. It is now assumed that the intersections 151, 158, 159, 166, 160 and the roads 242, 249, 251, 265, 267 have been selected as constituent intersections and roads of the shortest distance route. On the basis of the map data of the intersections and roads relating to the stored, shortest distance route, the control means 3X calculates a relative angle of two route roads which are connected together through each intersection and extracts intersections where such relative angles are outside a specified range respectively, and also checks the type of roads connected to each intersection and extracts intersections connecting national roads other than route roads respectively, then stores these intersections as characteristic intersections in a RAM or the like (step ST504). In this way, intersections 151, 158 and 160 are stored as characteristic intersections.

On the basis of the output of the present position and direction detecting means 1, the control means 3X determines the latest vehicular present position and advancing direction (step ST505), then transforms the coordinates of three characteristic intersections present ahead of the vehicular present position into display coordinates, and provides the display coordinates, as well as a command to connect the characteristic intersections using straight lines, to the deformed map preparing means 4. Further, the control means 3X normalizes the roads which are connected to the characteristic intersections and provides a command to display the thus-normalized straight lines to the deformed map preparing means 4, which in turn prepares a deformed map on the display means 5 in accordance with the information provided (step ST506).

The control means 3X fetches data of facilities adjoining to the displayed roads from the map information memory means 2. The control means 3X then transforms the coordinates of the facilities into display coordinates, and provides the display coordinates, as well as a command to display the facilities, to the deformed map preparing means 4, which in turn displays symbols indicative of the facilities on the display means 5 on the basis of the information provided (step ST507).

Further, the control means 3X receives real-time information through the real-time information receiving means 8, and if a traffic congestion information is contained in the real-time information, the control means provides to the deformed map preparing means 4 a command to affix a symbol indicative of traffic congestion to the road corresponding to that information. In accordance with this command, the deformed map preparing means 4 displays the congestion symbol in the corresponding position on the display screen (step ST508).

Figure 51:
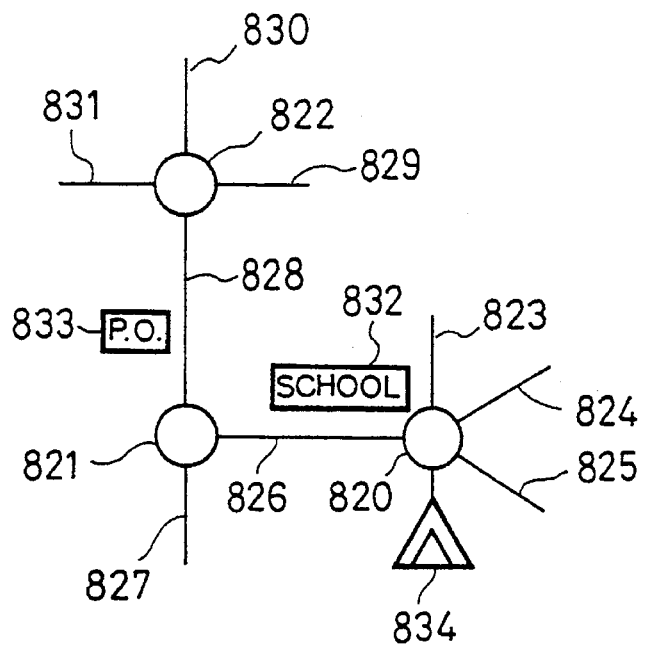
FIG. 51 is an explanatory view showing an example of a deformed map for display.

In this way, such a map as shown FIG. 51 is displayed on the display means 5, provided the congestion symbol is not shown. In FIG. 51, the intersections 151, 158 and 160 are represented by symbols 820, 821 and 822, respectively. The processings of steps ST505 to ST508 are executed until the vehicle reaches the destination (step ST509). When the vehicle has passed a certain intersection, the control means 3X obtains the coordinates of three characteristic intersections on the basis of a new present position of the vehicle, and the display map is updated on the basis of those coordinates (step ST510).

Although three intersections are displayed in this embodiment, four or more intersections may be displayed.

Embodiment 19

Figure 52:
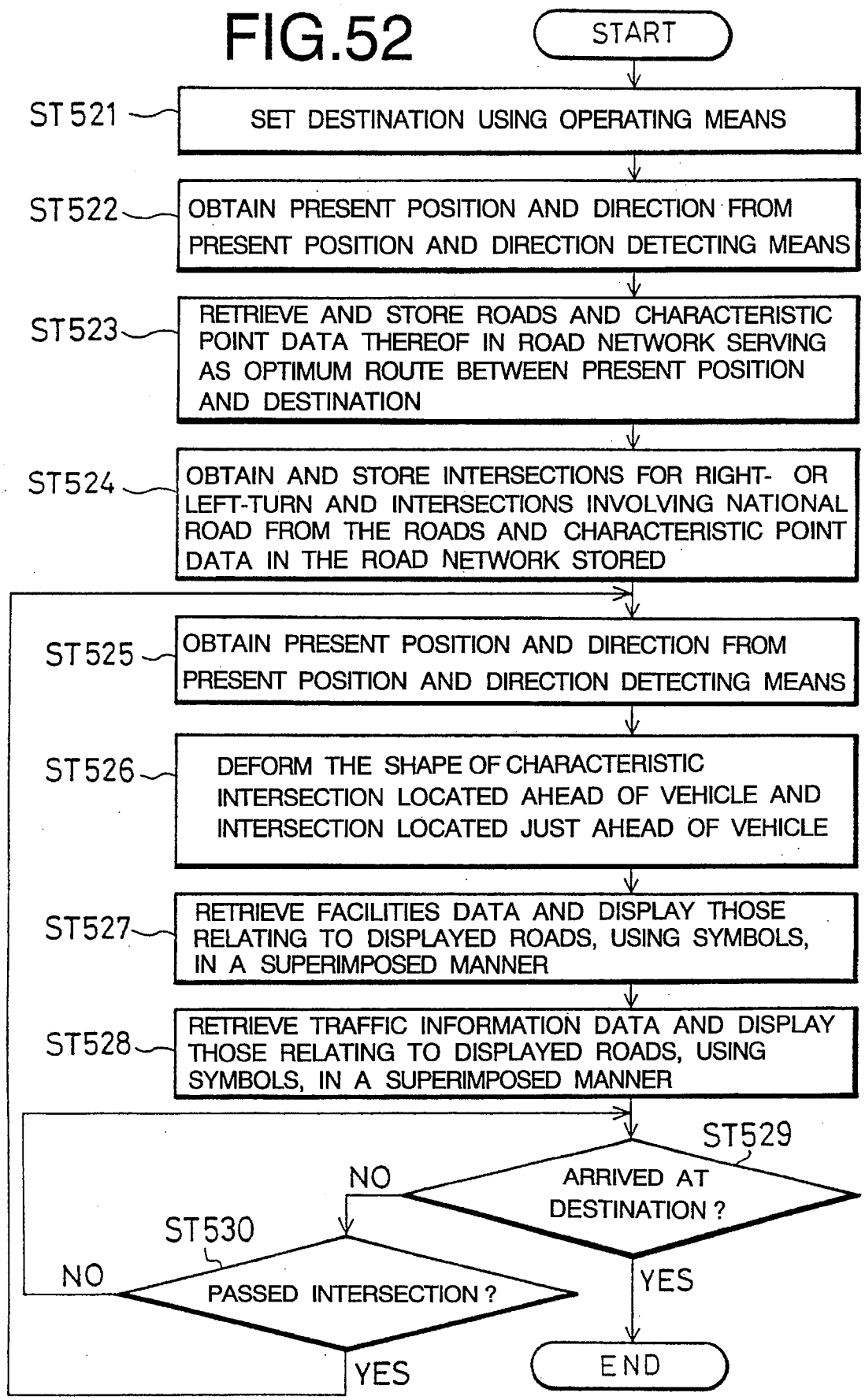
FIG. 52 is a flowchart showing the operation of a traffic information display system according to a nineteenth embodiment of the present invention.

FIG. 52 is a flowchart showing the operation of a traffic information display system according to a nineteenth embodiment of the present invention. The construction of this embodiment is the same as in FIG. 48 except that the control means 3M is substituted by a control means including means which adopts both an intersection located just ahead of the present position on the route selected by the route selecting means 10 and a characteristic intersection located ahead of the present position, as characteristic intersections on the route selected and displayed from among the intersections located on the route, such as a right- or left-turn intersection or an intersection including a national road. The control means used in this embodiment will hereinafter be referred to as control means 3Y.

The operation of this embodiment will now be described. The following description is of the case where an optional point on the road 260 has been set as a destination by the driver using the operating means 6 (step ST521). The route selecting means 10 determines a present position and an advancing direction of the vehicle on the basis of the output of the present position and moving direction detecting means 1 (step ST522). As a result, it is assumed that the vehicular present position is on the road 243 and that the vehicle is advancing in the direction of the intersection 154. Then, the route selecting means 10 selects roads which constitute a route of the shortest distance between the vehicular present position and the destination, fetches start and end characteristic points of the roads from the map information memory means 2 and stores them in a RAM or the like (step ST523). The method of calculating the route of the shortest distance is found in the results of various researches based on the network theory and an explanation thereof is here omitted. It is now assumed that the intersections 154, 155, 156 and the roads 243, 244, 245, 260 have been selected as constituent intersections and roads of the shortest distance route by the route selecting means 10. On the basis of the map data of the intersections and roads relating to the stored, shortest distance route, the control means 3Y calculates a relative angle of two route roads which are connected together through each intersection and extracts an intersection where such relative angle is outside a specified range, and also checks the type of roads connected to each intersection and extracts an intersection having a national road other than route roads, then stores the extracted intersection as characteristic intersection in a RAM or the like (step ST524). As a result, the intersection 156 is extracted.

The control means 3Y determines the latest vehicular present position and advancing direction on the basis of the output of the present position and direction detecting means 1 (step ST525), then transforms the coordinates of an intersection (the intersection 154 in this embodiment) located just ahead of the vehicular present position and a characteristic intersection (the intersection 156 in this embodiment) located ahead of the present position, into display coordinates, and provides the display coordinates, as well as a command to connect the two intersections using a straight line, to the deformed map preparing means 4. Further, the control means 3Y normalizes the roads which are connected to each intersection and provides a command to display the thus-normalized straight line to the deformed map preparing means 4, which in turn prepares a deformed map on the display means 5 in accordance with the information thus provided (step ST526).

The control means 3Y fetches data of facilities adjoining to the displayed roads from the map information memory means 2, then transforms the coordinates of the facilities into display coordinates, and provides the display coordinates, as well as a command to display the facilities, to the deformed map preparing means 4, which in turn displays symbols indicative of the facilities on the display means 5 on the basis of the information provided (step ST527).

Further, the control means 3Y receives real-time information through the real-time information receiving means 8, and if a traffic congestion information is contained in the real-time information, the control means provides to the deformed map preparing means 4 a command to affix a symbol indicative of traffic congestion to the road corresponding to that information. In accordance with this command, the deformed map preparing means 4 displays the congestion symbol in the corresponding position on the display screen (step ST528).

Figure 53:
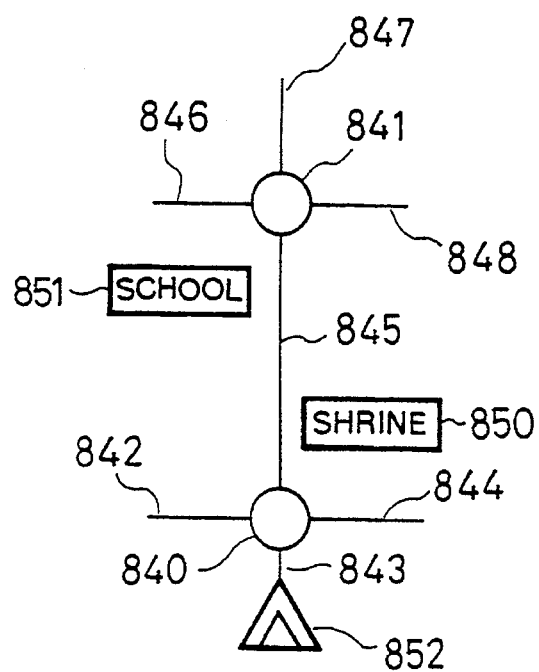
FIG. 53 is an explanatory view showing an example of a deformed map for display.

In this way, such a map as shown in FIG. 53 is displayed on the display means 5, provided the congestion symbol is not shown. In FIG. 53, the intersections 154 and 156 are represented by symbols 840 and 841, respectively. The processings of steps ST525 to ST528 are executed until the vehicle reaches the destination (step ST529). When the vehicle has passed a certain intersection, the control means 3Y obtains, on the basis of a new present position of the vehicle, the coordinates of a characteristic intersection located ahead of the present position and of an intersection located just ahead of the present position, and the display map is updated on the basis of the coordinates obtained (step ST530).

By making such a display it is made possible for the driver to always check the intersection where the vehicle is to be turned right or left while confirming the present position on the basis of information on the intersection located just ahead.

Embodiment 20

FIG. 54 is a flowchart showing the operation of a traffic information display system according to a twentieth embodiment of the present invention. The construction of this embodiment is the same as in FIG. 48 except that the control means 3M is substituted by a control means including means which selects, from among the intersections on the route selected by the route selecting means 10, characteristic intersections located on the route such as an intersection where the vehicle is to turn right or left or an intersection including a national road, as well as intersections where traffic signals are present, and adopts characteristic intersections located ahead of the present position and intersections with traffic signals located on this side of such characteristic intersections, as intersections to be displayed. The control means used in this embodiment will hereinafter be referred to as control means 3U.

The operation of this embodiment will now be described. The following description is of the case where an optional point on the road 260 has been set as a destination by the driver using the operating means 6 (step ST541). The route selecting means 10 determines a present position and an advancing direction of the vehicle on the basis of the output of the present position and direction detecting means 1 (step ST542). As a result, it is assumed that the vehicular present position is on the road 243 and that the vehicle is advancing in the direction of the intersection 154. Then, the route selecting means 10 selects roads which constitute a route of the shortest distance between the vehicular present position and the destination, fetches start and end characteristic points of the roads from the map information memory means 2 and stores them in a RAM or the like (step ST543). The method of calculating the route of the shortest distance is found in the results of various researches based on the network theory and an explanation thereof is here omitted. It is now assumed that the intersections 154, 155, 156 and the roads 243, 244, 245, 246 have been selected as constituent intersections and roads of the shortest distance route by the route selecting means 10. On the basis of the map data of the intersections and roads relating to the stored, shortest distance route, the control means 3U calculates a relative angle of two route roads which are connected together through each intersection and extracts an intersection where such relative angle is outside a specified range, and also checks the type of roads connected to each intersection and extracts an intersection having a national road other than route roads, then stores the extracted intersection as characteristic intersection in an RAM or the like (step ST544). As a result, the intersection 156 is extracted. Further, the control means 3U checks the type of characteristic points in the characteristic point data contained in the map information of the intersections and roads relating to the shortest distance route stored, then extracts intersections having signals and stores them in an RAM or the like (step ST545). As a result, it is assumed that the intersections 155 and 156 have been extracted as signal intersections.

The control means 3U determines the latest vehicular present position and signal direction on the basis of the output of the present position and direction detecting means 1 (step ST546), then transforms the coordinates of a characteristic intersection (the intersection 156 in this embodiment) located ahead of the vehicle and of a signal intersection (the intersection 155 in this embodiment) into display coordinates, and provides the display coordinates, as well as a command to connect the two intersections using a straight line, to the deformed map preparing means 4. Further, the control means 3U normalizes the roads which are connected to each intersection and provides a command to display the thus-normalized straight line to the deformed map preparing means 4, which in turn prepares a deformed map on the display means 5 in accordance with the information provided (step ST547).

The control means 3U fetches data of facilities adjoining to the displayed roads from the map information memory means 2, then transforms the coordinates of the facilities into display coordinates, and provides the display coordinates, as well as a command to display the facilities, to the deformed map preparing means 4, which in turn displays symbols indicative of the facilities on the display means 5 on the basis of the information provided (step ST548).

Further, the control means 3U receives real-time information through the real-time information receiving means 8, and if a traffic congestion information is contained in the real-time information, the control means provides to the deformed map preparing means 4 a command to affix a symbol indicative of traffic congestion to the road corresponding to that information. In accordance with this command, the deformed map preparing means 4 displays the congestion symbol in the corresponding position on the display screen (step ST548).

Figure 55:
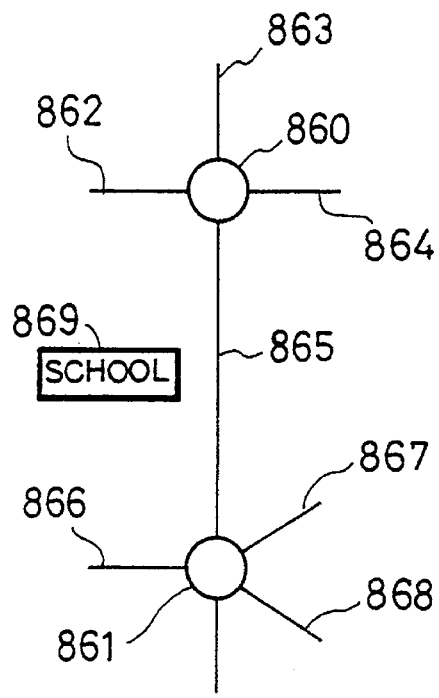
FIG. 55 is an explanatory view showing an example of a deformed map for display.

In this way, such as map as shown in FIG. 55 is displayed on the display means 5, provided the congestion symbol is not shown. In FIG. 55, the intersections 155 and 156 are represented by symbols 861 and 860, respectively. The processings of steps ST546 to ST549 are executed until the vehicle reaches the destination (step ST550). When the vehicle has passed a certain intersection, the control means 3U obtains, on the basis of a new present position of the vehicle, the coordinates of a characteristic intersection located ahead of the present position and of a signal intersection located on this side of the said characteristic intersection, and the display map is updated on the basis of the coordinates obtained (step ST551).

Thus, in this embodiment, on the route along which the vehicle is to run, a signal intersection located on this side of an intersection where the vehicle is to turn right or left, is displayed, so that the driver can perform, with composure, preliminary actions such as the change of road for turning right or left.

Figure 56:
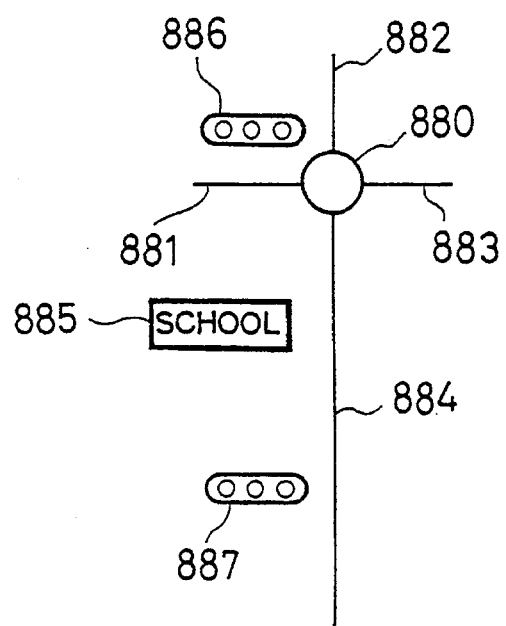
FIG. 56 is an explanatory view showing an example of a deformed map for display.

Although in this embodiment the roads connected to the characteristic intersection and the signal intersection located on this side of the characteristic intersection are shown in a quantized shape, as to the signal intersection, the existence thereof may be indicated, for example, by using a symbol which represents a signal as in FIG. 56, whereby the contents of display can be simplified while attaining the same effect as above. In FIG. 56, the numerals 886 and 887 each indicate a symbol which represents a signal, and the existence of the signal intersection 861 is indicated by using the symbol 887.

Embodiment 21

Figure 57:
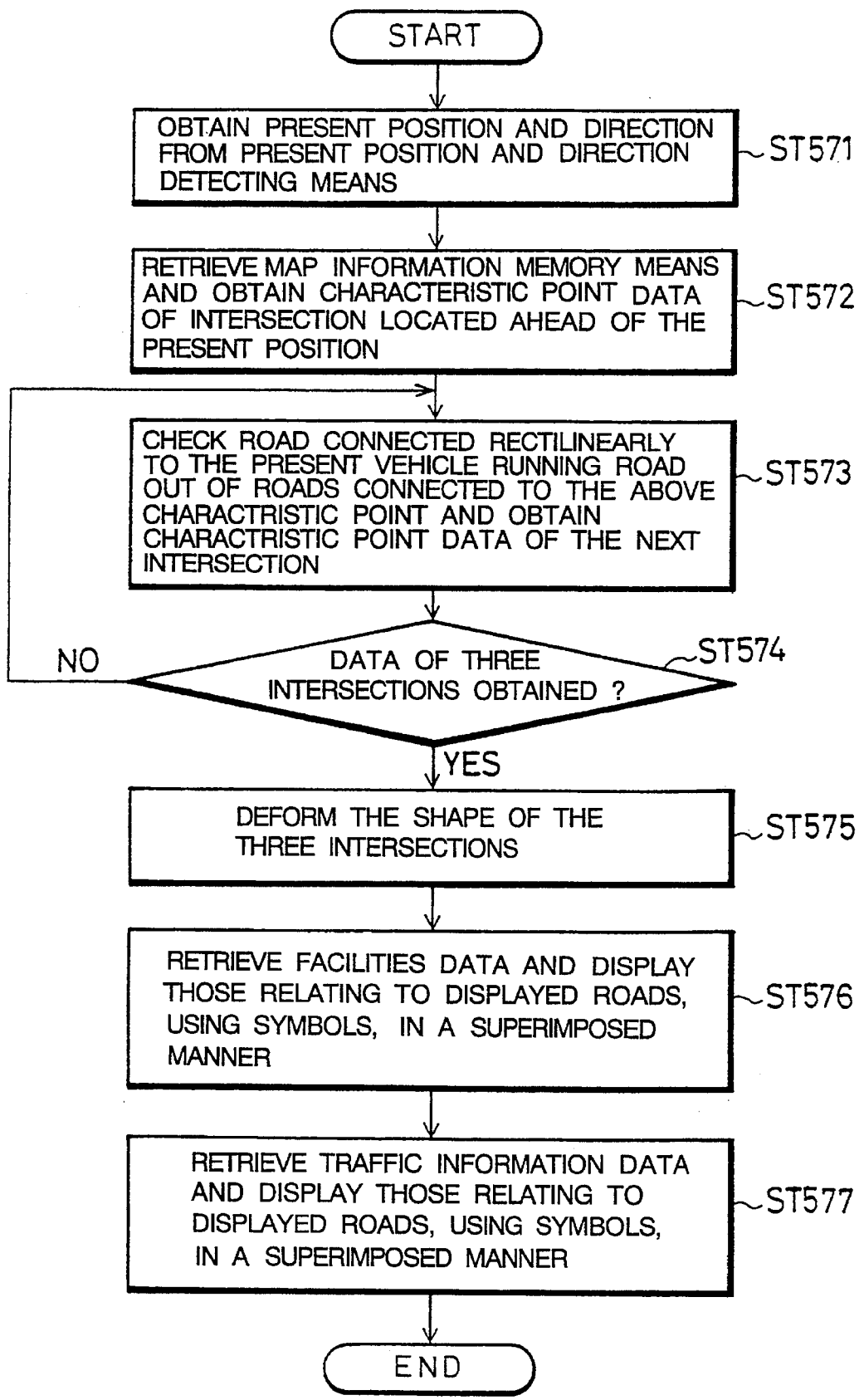
FIG. 57 is a flowchart showing the operation of a traffic information display system according to a twenty-first embodiment of the present invention.

FIG. 57 is a flowchart showing the operation of a traffic information display system according to a twenty-first embodiment of the present invention. The construction of this embodiment is the same as in FIG. 39 except that the control means 3K is substituted by a control means including means for selecting display roads on the basis of a predetermined positional relation to the present road. The control means used in this embodiment will hereinafter be referred to as control means 3N.

The operation of this embodiment will now be described. The control means 3N determines a present position and an advancing direction of a vehicle on the basis of the output of the present position and direction detecting means 1 (step ST571) and then obtains characteristic point data of an intersection (start or end characteristic point) located ahead of the vehicle on the present road, from the map information memory means 2 (step ST572). This intersection is assumed to be the intersection 151 in FIG. 41. Then, the control means 3N fetches road data of the roads 243, 249, 253 and 254 which are connected to the intersection 151, from the map information memory means 2, and calculates the gradient between the road 242 on which the vehicle is present and each of the roads 243, 249, 253, 254 on the basis of the start and end characteristic point coordinates of the roads 243, 249, 253 and 254. Further, the control means selects a road whose gradient is not larger than a predetermined value (step ST573). In this embodiment, the road 253 is selected.

Figure 58:
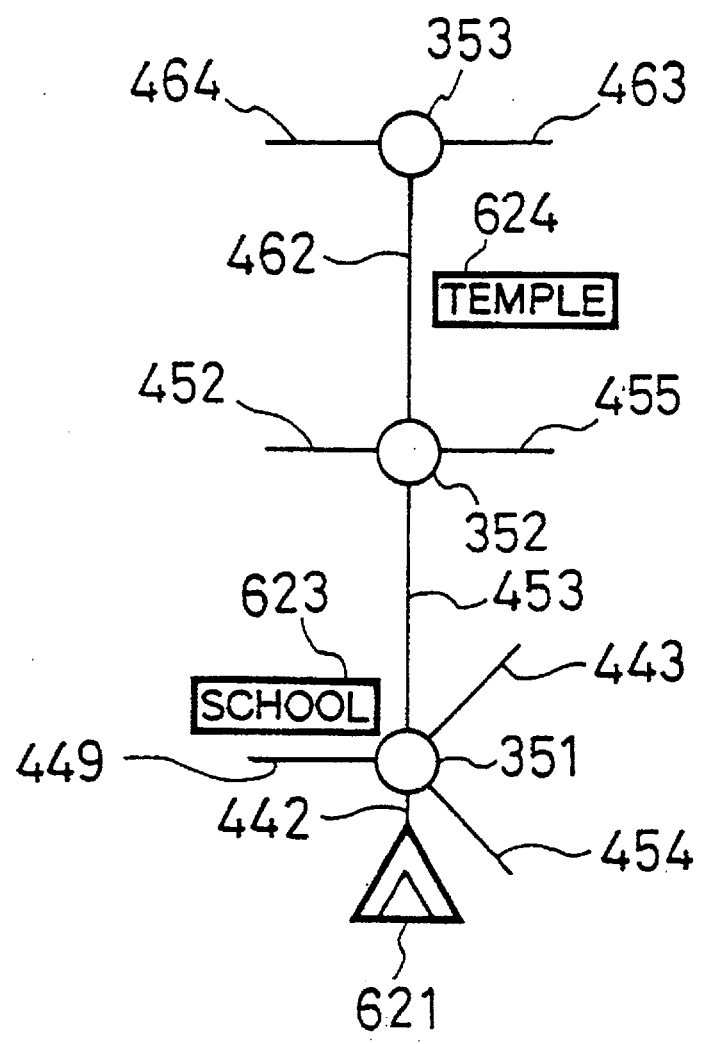
FIG. 58 is an explanatory view showing an example of a deformed map for display.

By repeating the processing of step ST573 the control means 3N selects three intersections located ahead of the road 253 (step ST574). Next, there is selected a road whose gradient is not larger than the predetermined gradient from the road 253, and the intersection 153 is selected with respect to the selected road which is 262. When there is no road having a gradient not larger than the predetermined value, the selection processing is stopped. In this case, the intersections 151, 152 and 153 are selected. Then, like the processings in the fifth to the seventeenth embodiment, the control means 3N provides information for the display of a deformed map to the deformed map preparing means 4 (step ST575), together with a command to display symbols indicative of facilities and traffic congestion. The deformed map preparing means 4 displays these symbols on the display means 5 (steps ST576 and ST577). In this way, such a deformed map as shown in FIG. 58 is displayed on the display means 5, provided the symbol indicative of traffic congestion is not shown.

Embodiment 22

Figure 59:
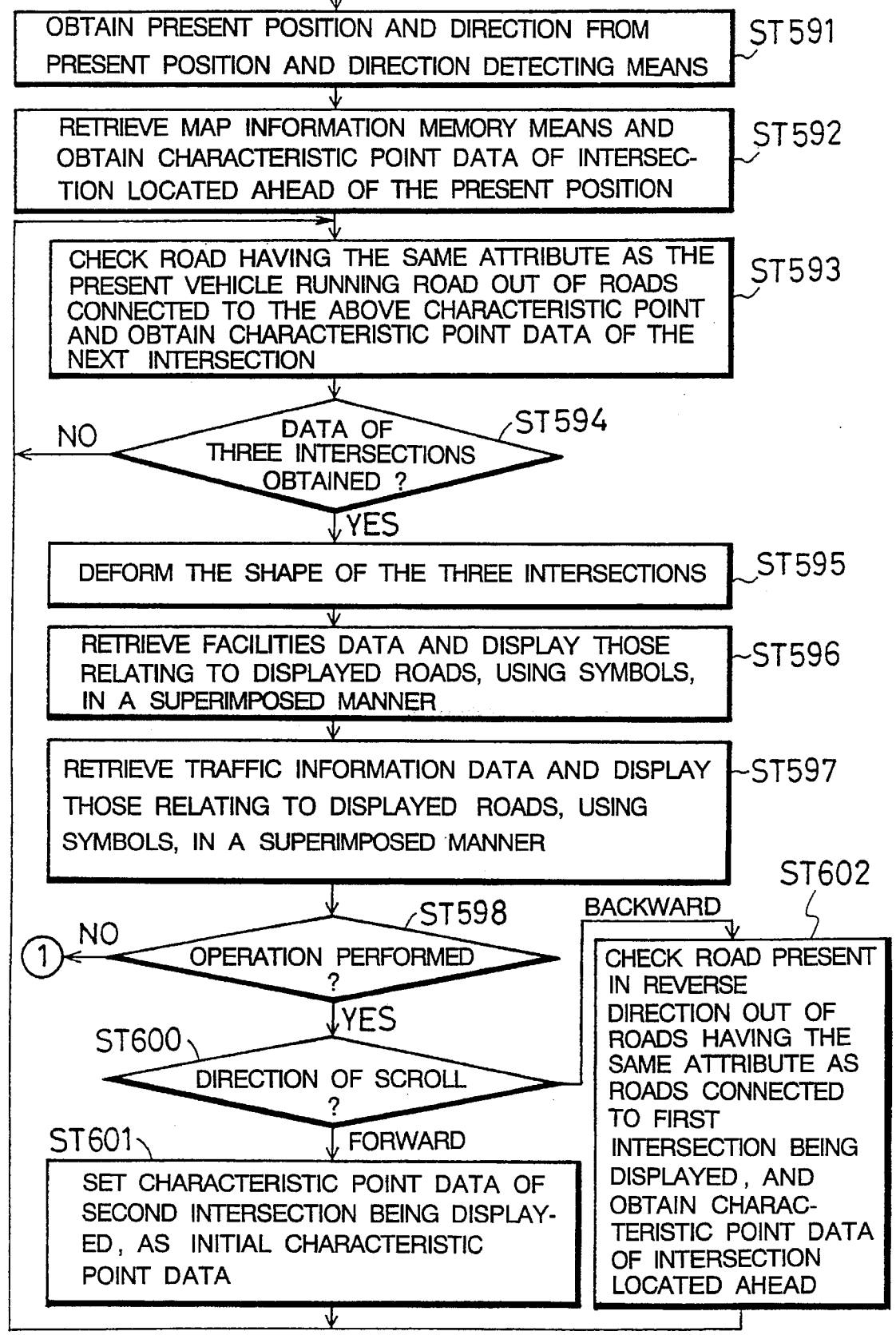
FIG. 59 is a flowchart showing the operation of a traffic information display system according to a twenty-second embodiment of the present invention.

FIG. 59 is a flowchart showing the operation of a traffic information display system according to a twenty-second embodiment of the present invention. The construction of this embodiment is the same as in FIG. 39 except that the control means 3K is substituted by a control means including a screen switching instructing means which instructs switching ("scrolling" hereinafter) of the display map on the screen in accordance with a command input to the operating means 6. The control means used in this embodiment will hereinafter be referred to as control means 30.

Figure 60:
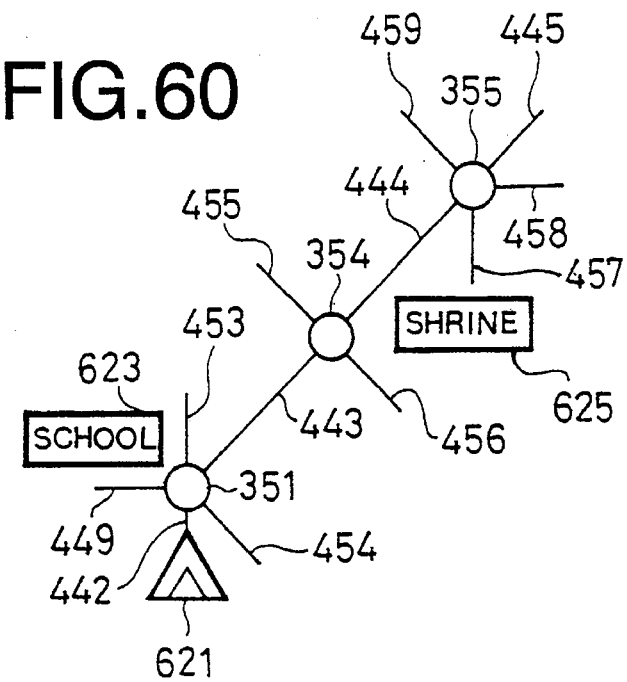
FIG. 60 is an explanatory view showing an example of a deformed map for display.

The operation of this embodiment will now be described. The control means 30 performs the same processings (steps ST591 to ST597) as those executed by the control means 3K in FIG. 39 and displays a deformed map on the display means 5 through the deformed map preparing means 4. In this way there is displayed, for example, such a map as shown in FIG. 60.

Figure 61:
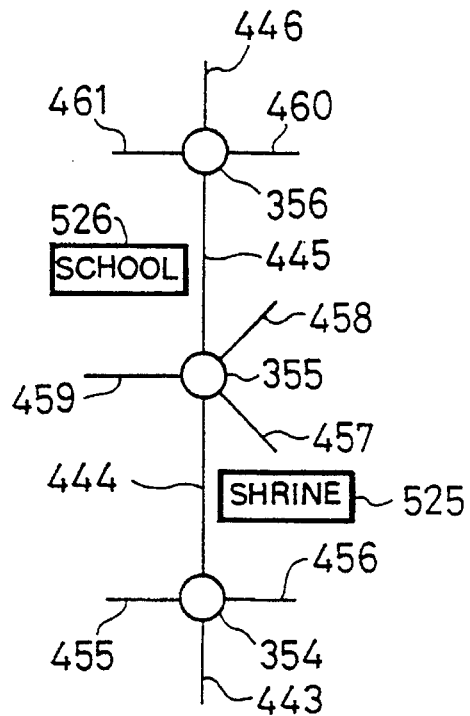
FIGS. 61(A) and 61(B) are explanatory views showing examples of a deformed map after updating of a display screen.
Figure 61:
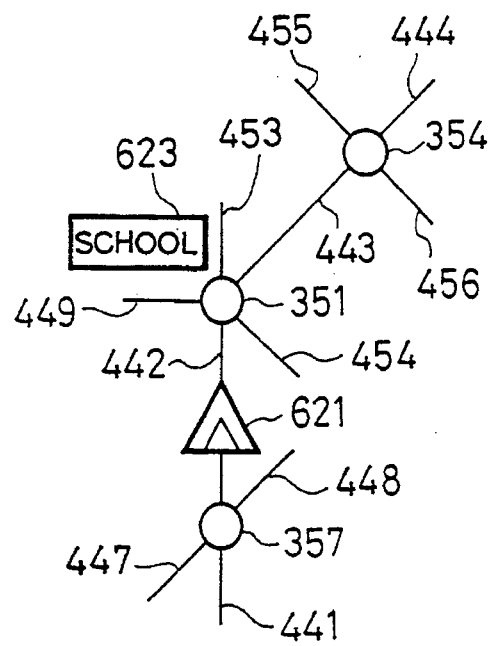

When the driver issues a command to scroll in connection with the front in the vehicular advancing direction, using the operating means 6, (steps ST598 and ST599), the control means 30 fetches characteristic point data of three intersections and road data from the map information memory means 2, with the intersection 154 as a base point which intersection is located at a forward tip of the front road 243 having the same attribute as that of the present road 242 (see FIG. 41, corresponding to road 442 in FIG. 60), that is, with the second intersection 154 out of the displayed intersections as a base point, (steps ST600, ST593 and ST594). Then, the control means 30 displays a deformed map relating to those intersections and roads on the display means 5 through the deformed map preparing means 4 (steps ST595, ST596 and ST597). In this way there is displayed the map shown in FIG. 61 (A).

On the other hand, when the driver issues a command to make scrolling relating to the rear (steps ST598 and ST599), the control means 30 fetches characteristic point data of three intersections and road data from the map information memory means 2 with the intersection located at the rear end of the road 242 on which the vehicle is present as a base point (steps ST601, ST593 and ST594), and displays a deformed map on those intersections and roads on the display means 4 through the deformed map preparing means 4 (steps ST595, ST596 and ST597). In this way there is displayed the map shown in FIG. 61(B).

Embodiment 23

Figure 62:
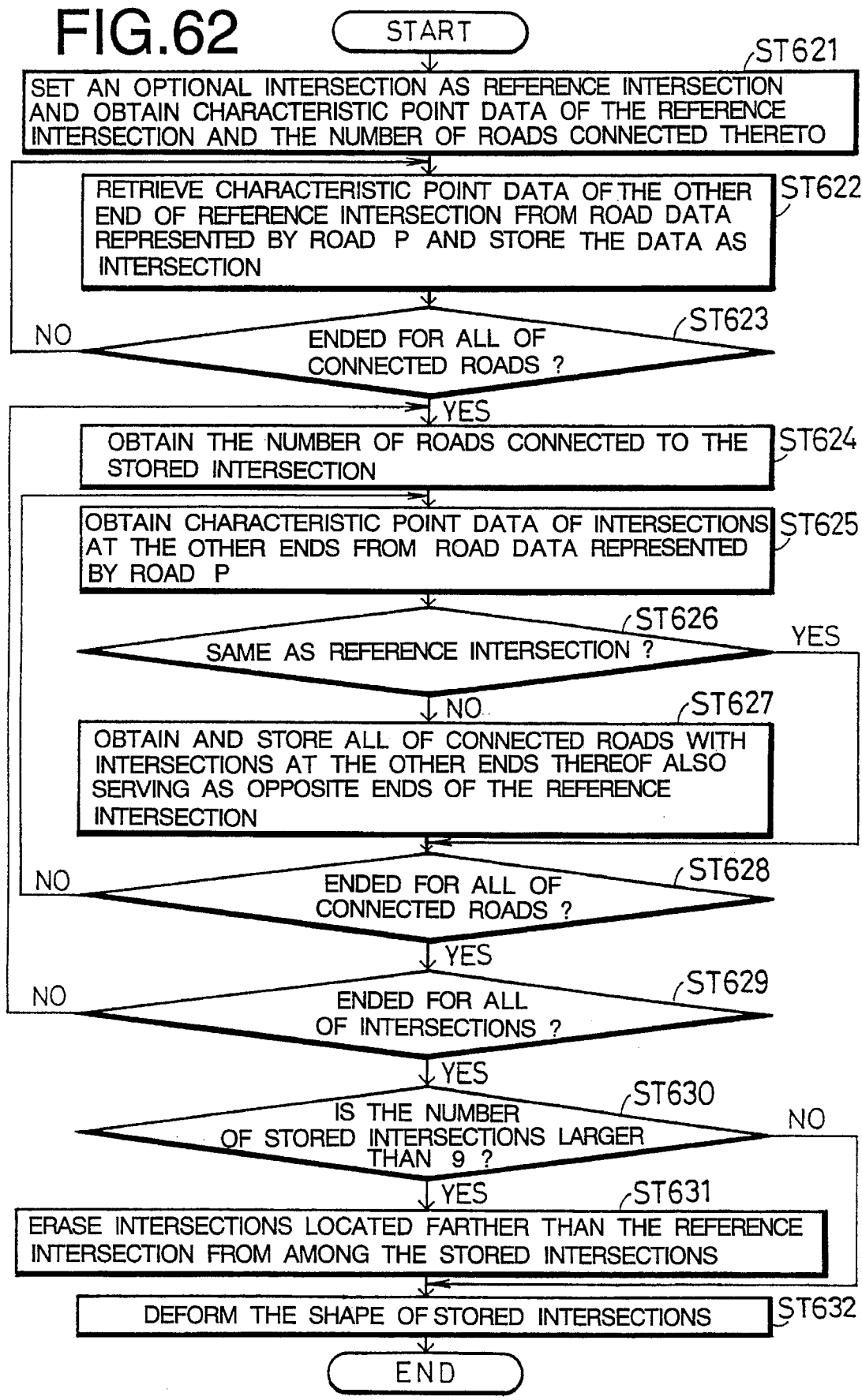
FIG. 62 is a flowchart showing the operation of a traffic information display system according to a twenty-third embodiment of the present invention.

FIG. 62 is a flowchart showing the operation of a traffic information display system according to a twenty-third embodiment of the present invention. The construction of this embodiment is the same as in FIG. 5 except that the control means 3A is substituted by a control means having a function of selecting an intersection in accordance with a predetermined standard. The control means used in this embodiment will hereinafter be referred to as control means 3P.

Generally, the time which the driver can spare for seeing the display screen of the traffic information display system during driving is limited. Therefore, it is required to offer information to the driver in a shorter time. One method for meeting this demand may be controlling the amount of information to be provided to the driver. For example, in the field of cognitive psychology, as shown in "Human Factor", published by Dobun Shoin (1989), p. 73, it is known that the number of items of information which a man can recollect soon after given are five to nine. Therefore, if the number of intersections displayed on the screen is limited to nine at most, it will be possible for the driver to read information without any extra burden on the driver.

Figure 63:
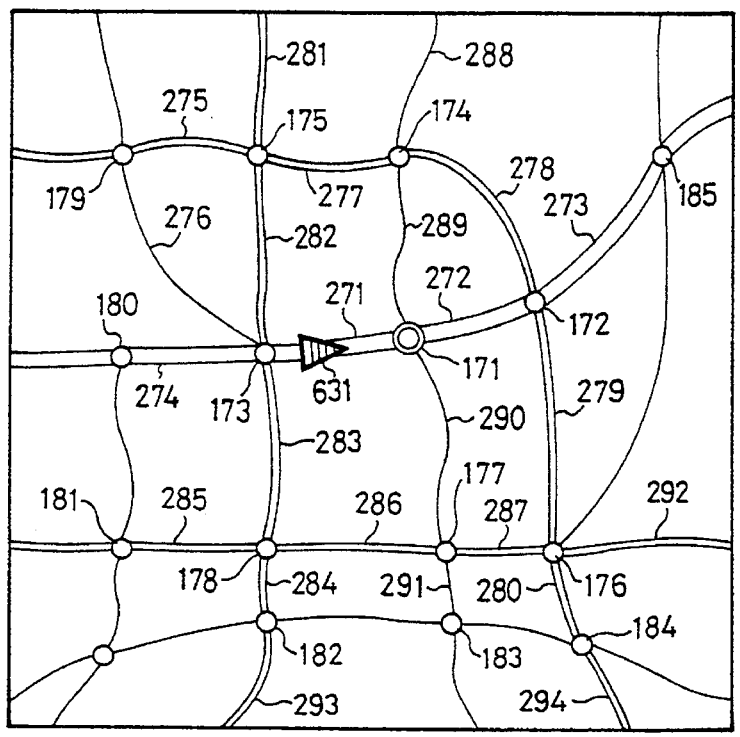
FIG. 63 is an explanatory view showing an example of an actual map.

The operation of this embodiment will now be described. It is assumed that an actual map is as shown in FIG. 63. First, the control means 3P determines a present position and an advancing direction of the vehicle on the basis of the output of the present position and direction detecting means 1, and fetches characteristic point data relating to the intersection located at the forward tip of the present road from the map information memory means 2. This intersection is set as a reference intersection. The reference intersection may be designated by the driver using the operating means 6. This intersection is assumed to be an intersection 171 in FIG. 63. Next, the control means 3P fetches road data of roads 271, 272, 289 and 290 which are connected to the intersection 171, then determines intersections 172, 173, 174 and 177 located at the other ends of those roads 271, 272, 289 and 290, and stores them as primary intersections in RAM or the like (steps ST622 and ST623). Then, the control means fetches road data of roads 271, 274, 276, 282 and 283 which are connected to one primary intersection 173 and obtains characteristic point data of intersections 171, 180, 179,175 and 178 located at the other ends of those roads (steps ST624 and ST625).

Then, the control means 3P excludes the reference intersection 171 from the intersections 171, 180, 179, 175 and 178, then out of the intersections 180, 179, 175 and 178, sets as secondary intersections the intersections 175 and 178 connected to roads which are connected to the intersections 180, 179, 175 and 178 and whose other ends are primary intersections (174 and 177 in this embodiment), and stores those secondary intersections in RAM or the like (steps ST626, ST627 and ST628). All of secondary intersections are extracted by performing this processing with respect to all the other primary intersections 172, 174 and 177 (step ST629). In this embodiment, the secondary intersections are 175, 178 and 176.

Figure 64:
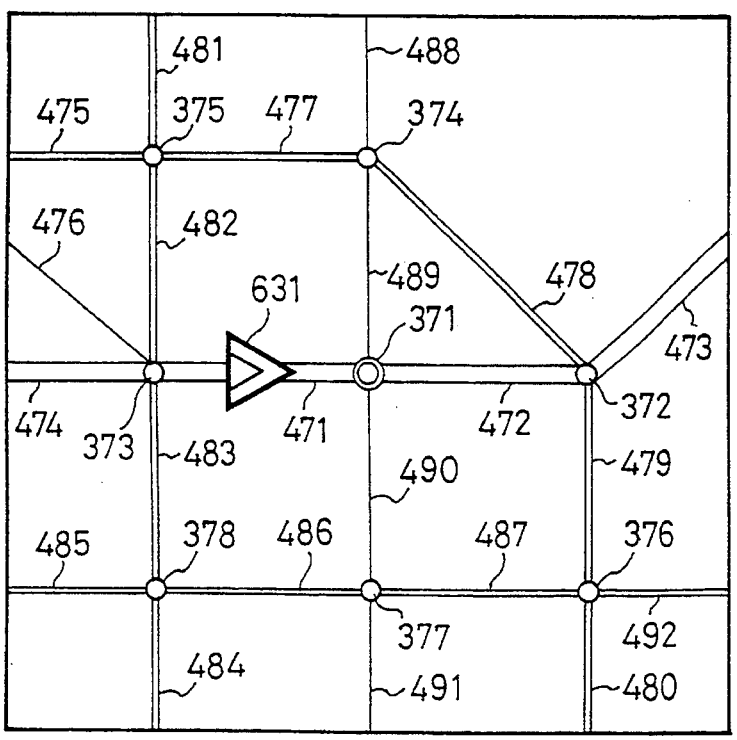
FIG. 64 is an explanatory view showing an example of a deformed map for display.

In the case where the total of the reference intersection and primary and secondary intersections exceed nine, the control means 3P calculates the distance between the reference intersection and each of the other intersections and extracts eight intersections (exclusive of the reference intersection) corresponding to short distances (step ST631). The control means 3P then transforms the coordinates of the reference intersection and other eight or less intersections into display coordinates and provides the display coordinates, as well as a command to connect the display coordinates and the intersections using straight lines, to the deformed map preparing means 4. The control means 3P also provides a command to display roads which are connected to the intersections to be displayed, to the deformed map preparing means 4, which in turn displays a deformed map on the display means 5 in accordance with the information provided. In this way, a map as is shown in FIG. 64 is displayed. The map of FIG. 64 is also based on a command to display the vehicular present position using a symbol, a command to display road widths according to road types and a command to display the reference intersection 171 using a specific symbol, which commands are provided from the control means 3P.

Embodiment 24

Figure 65:
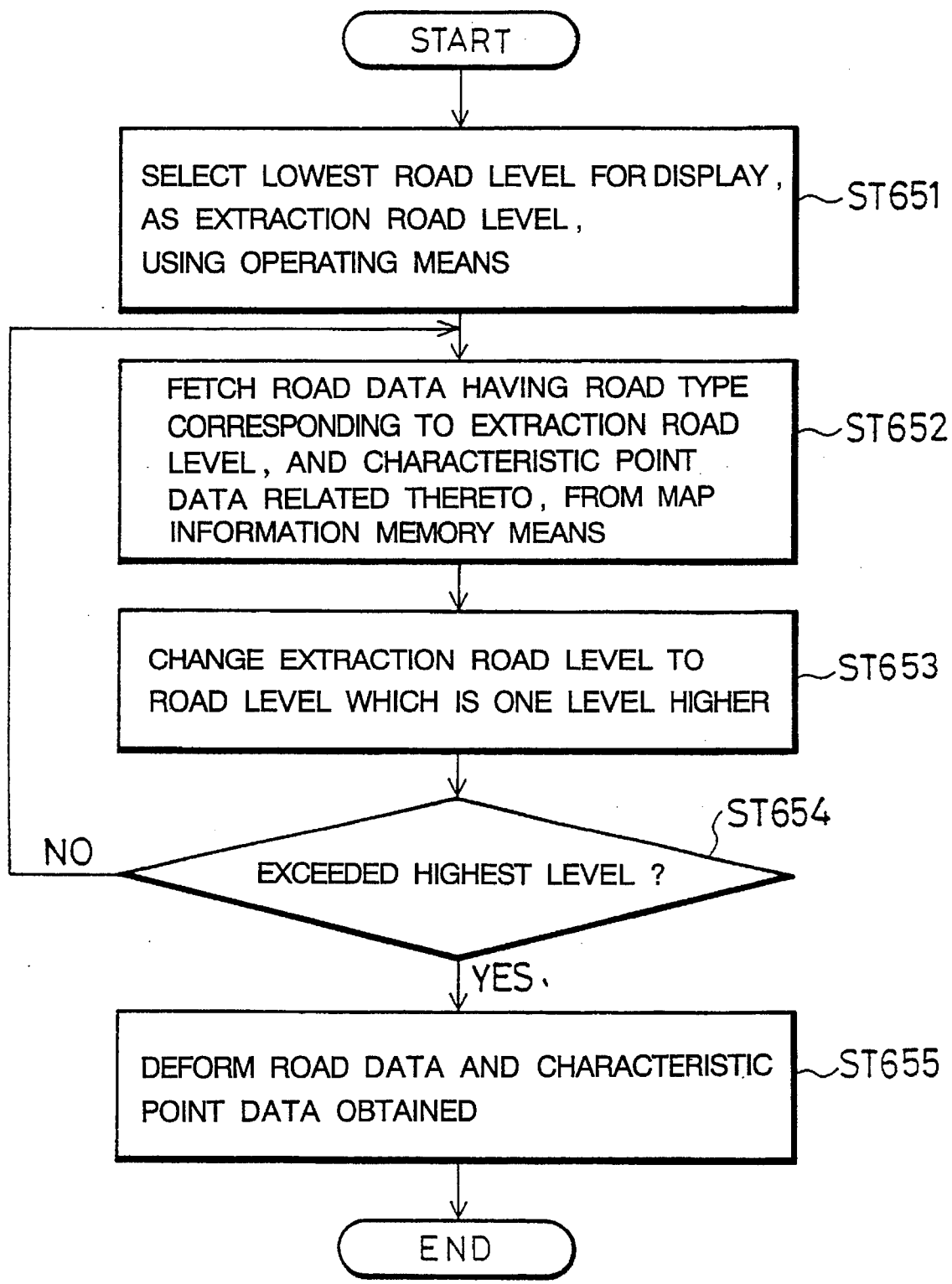
FIG. 65 is a flowchart showing the operation of a traffic information display system according to a twenty-fourth embodiment of the present invention.

FIG. 65 is a flowchart showing the operation of a traffic information display system according to a twenty-fourth embodiment of the present invention. The construction of this embodiment is the same as in FIG. 5 except that the control means 3A is substituted by a control means including means for selecting display roads according to a road level input to the operating means 6. The control means used in this embodiment will hereinafter be referred to as control means 3Q.

The operation of this embodiment will now be described. First, the lowest level of roads to be displayed is determined. For example, the driver inputs the lowest level using the operating means 6 (step ST651). For example, the driver selects a prefectural road as the lowest level from among road levels such as national, prefectural, city, town and village road levels. The control means 3Q extracts roads of the same level as the lowest level in a predetermined range (for example, within a predetermined distance from the vehicular present position) and according to road types in the road data stored in the map information memory means 2, and obtains characteristic point data of intersections with respect to those roads (step ST652). For example, in the map of FIG. 63, there are extracted roads 275, 277–280, 285–287, 292 and intersections 179, 175, 174, 172, 176, 181, 178, 177.

Figure 66:
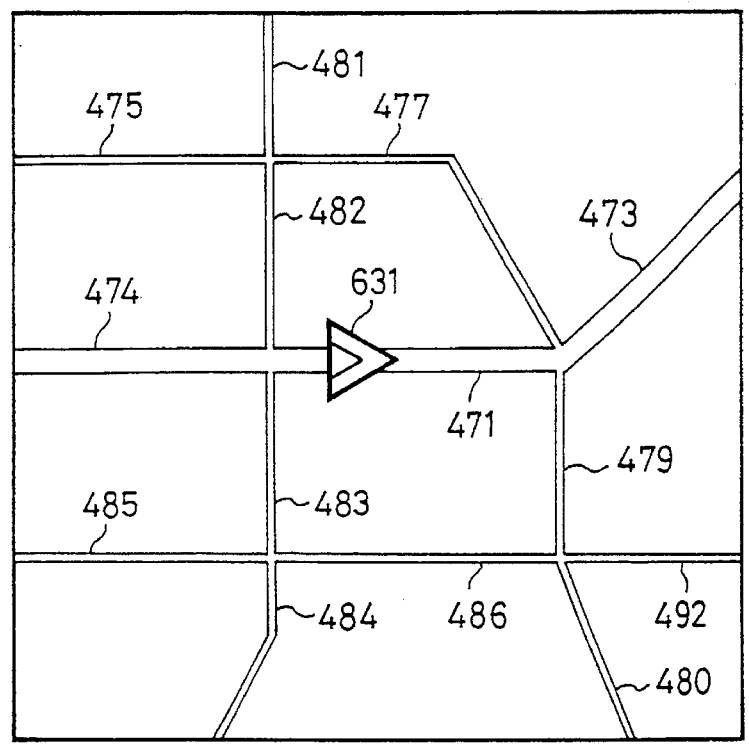
FIG. 66 is an explanatory view showing an example of a deformed map for display.

Next, if there are roads whose level is one level higher, those roads and intersections thereof are extracted (step ST653). In this case, national roads are extracted. More specifically, the roads 271–274 and intersections 180, 173, 171 are extracted. If there is no road of a higher level, the extracting processing is ended (step ST654). The control means 3Q transforms the coordinates of the extracted intersections into display coordinates and provides the display coordinates, as well as a command to connect the intersections using straight lines and a command to display the other roads connected to the intersections, to the deformed map preparing means 4, which in turn displays a deformed map on the display means 5 in accordance with the information provided (step ST655). The system may be constructed so that the control means 3Q provides a command to display road widths according to road levels and a command to display the vehicular present position using a symbol. In this way there is displayed a map as is shown in FIG. 66.

Embodiment 25

Figure 67:
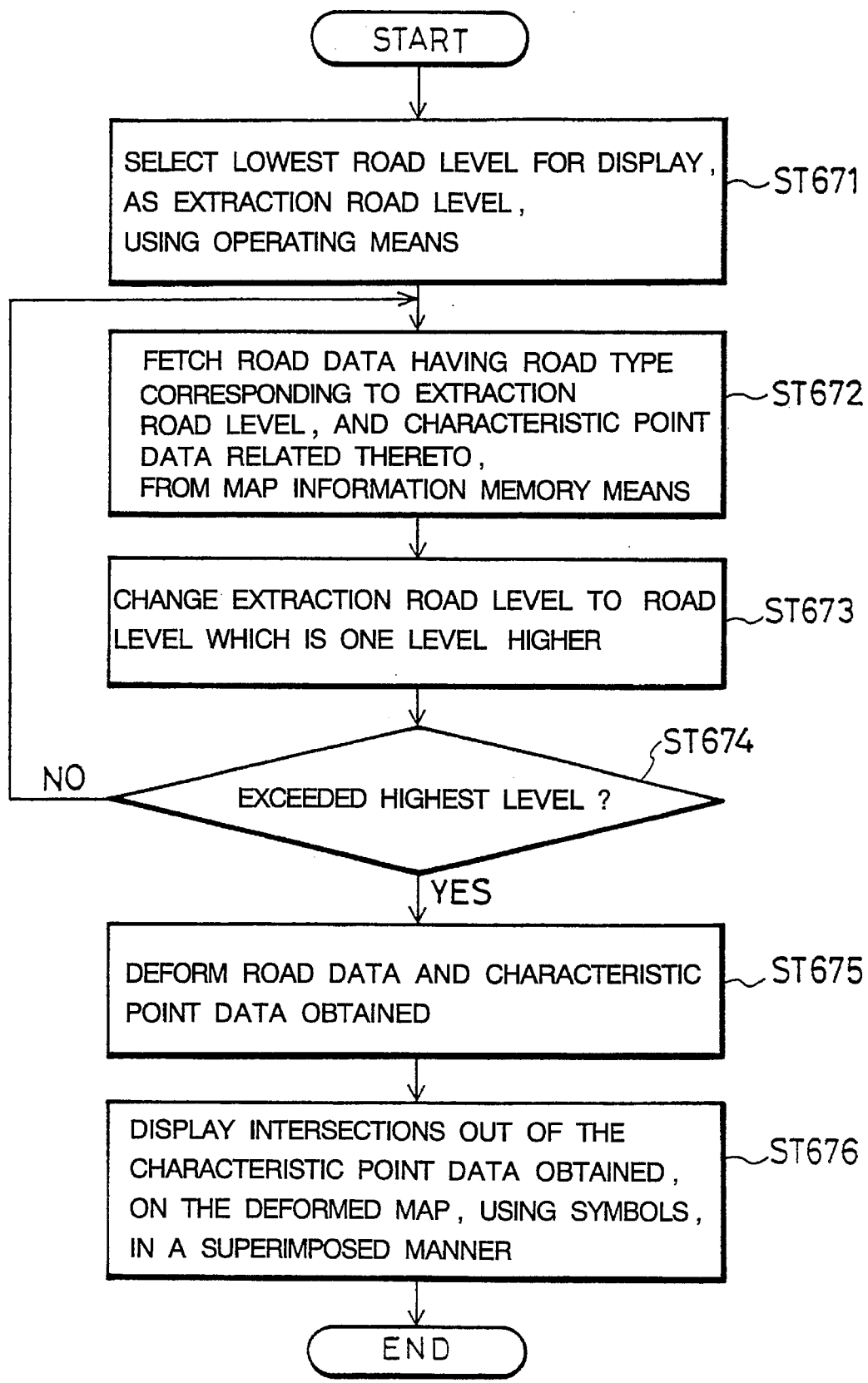
FIG. 67 is a flowchart showing the operation of a traffic information display system according to a twenty-fifth embodiment of the present invention.

FIG. 67 is a flowchart showing the operation of a traffic information display system according to a twenty-fifth embodiment of the present invention. The construction of this embodiment is the same as in FIG. 5 except that the control means 3A is replaced with a control means including means for selecting display roads according to a road level input to the operating means 6 and also including an intersection indicating means for providing a command to display intersections using specific symbols. The control means used in this embodiment will hereinafter be referred to as control means 3R.

Figure 68:
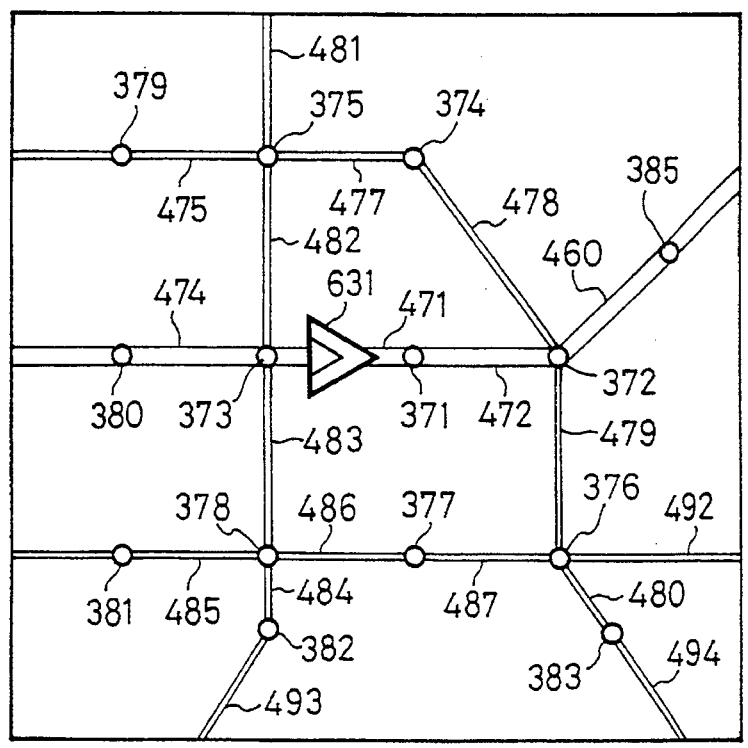
FIG. 68 is an explanatory view showing an example of a deformed map for display.

The operation of this embodiment will now be described. The control means operates in the same manner as the control means 3Q used in the twenty-fourth embodiment (steps ST671 to ST675) and displays a deformed map on the display means 5 through the deformed map preparing means 4. In this way there is displayed the map shown in FIG. 66. Further, the intersection indicating means provides to the deformed map preparing means 4 a command to display intersections to which undisplayed roads are connected, using specific symbols. In accordance with this command the deformed map preparing means 4 adds specific symbols 371–385 to the map being displayed. As a result, the map shown in FIG. 68 is displayed on the display means 5.

Embodiment 26

FIG. 69 is a flowchart showing the operation of a traffic information display system according to a twenty-sixth embodiment of the present invention. The construction of this embodiment is the same as in FIG. 5 except that the control means 3A is replaced with a control means including means for selecting display roads according to a road level input to the operating means 6, an intersection indicating means which issues a command to display intersections using specific symbols and further including a low-level road indicating means which issues a command to display roads of a low level connected to intersections. The control means used in this embodiment will hereinafter be referred to as control means 3S.

The operation of this embodiment will now be described. The control means 3S operates in the same manner as the control means 3Q used in the twenty-fourth embodiment (steps ST691 to ST695) and displays a deformed map on the display means 5 through the deformed map preparing means 4. In this way there is displayed the map shown in FIG. 66.

Figure 70:
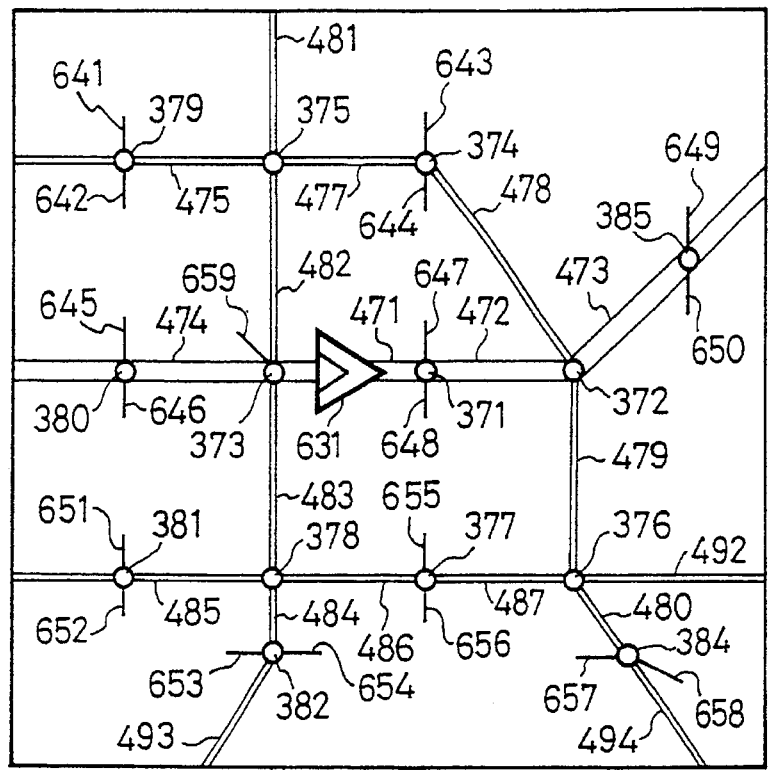
FIG. 70 is an explanatory view showing an example of a deformed map for display.

The intersection indicating means provides to the deformed map preparing means 4 a command to display intersections to which undisplayed roads are connected, using specific symbols. In accordance with this command the deformed map preparing means 4 adds specific symbols 371–385 to the map being displayed (steps ST696 and ST697). Further, on the basis of characteristic point data of the intersections which are displayed, the low-level road indicating means obtains road data of the roads connected to the intersections. In the case where the road type in the road data indicates low-level roads not to be displayed, the low-level road indicating means provides to the deformed map preparing means 4 a command to display short straight lines indicative of such roads. In accordance with this command the deformed map preparing means 4 displays short straight lines on the display means 5 (step ST699). When this processing has been done with respect to all the characteristic points (step ST700), there is displayed a map as is shown in FIG. 70. In the same figure, the numerals 641 to 658 represent short straight lines indicative of the low-level roads connected to the intersections. The processing of step ST696 is specially provided for skipping a connection road retrieval processing because this processing is not needed with respect to mere curved points.

Embodiment 27

Figure 71:
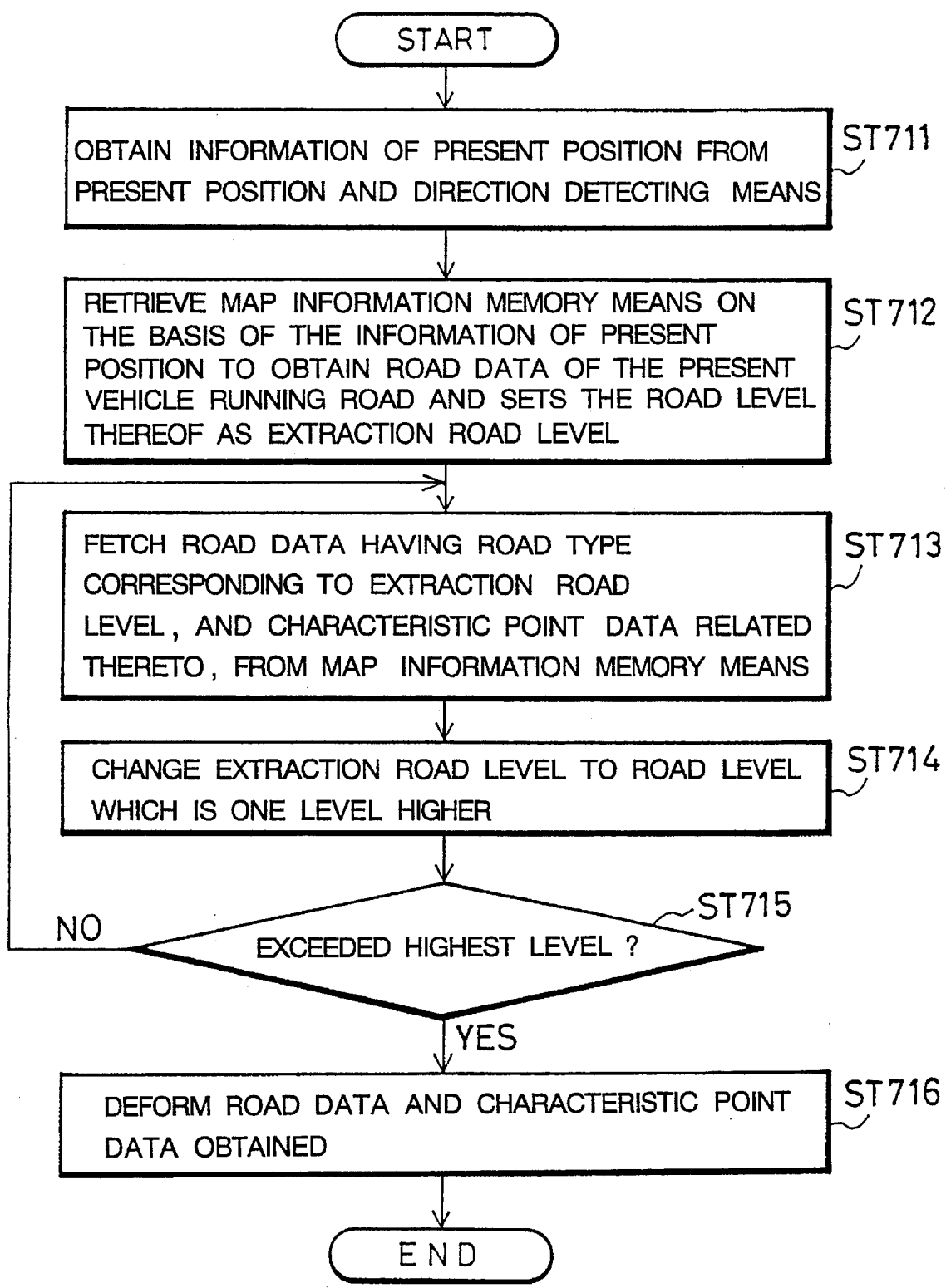
FIG. 71 is a flowchart showing the operation of a traffic information display system according to a twenty-seventh embodiment of the present invention.

FIG. 71 is a flowchart showing the operation of a traffic information display means according to a twenty-seventh embodiment of the present invention. The construction of this embodiment is the same as in FIG. 5 except that the control means 3A is replaced with a control means including means which determines display roads on the basis of a road level of the present road. The control means used in this embodiment will hereinafter be referred to as control means 3T.

The operation of this embodiment will now be described. The control means 3T determines a present position of the vehicle on the basis of the output of the present position and direction detecting means 1 and fetches road data of the present road from the map information memory means 2 (steps ST711 and ST712). Then, in a predetermined range, the control means 3T extracts roads of the same level as the road level indicated by the road type contained in the road data fetched in step ST712, and obtains characteristic point data of intersections associated with those roads (step ST713). In this case, in the map of FIG. 63, the roads 274, 271, 272, 273 and the intersections 180, 173, 171, 172, 185 are extracted.

Next, if there are roads having a road level which is one level higher, those roads and associated intersections are extracted (step ST714). If not, the extraction processing is ended (step ST715). In this embodiment, since the road type of the road data taken out initially indicates the highest level of national roads, there are extracted only the roads 274, 271, 272 and 273.

Figure 72:
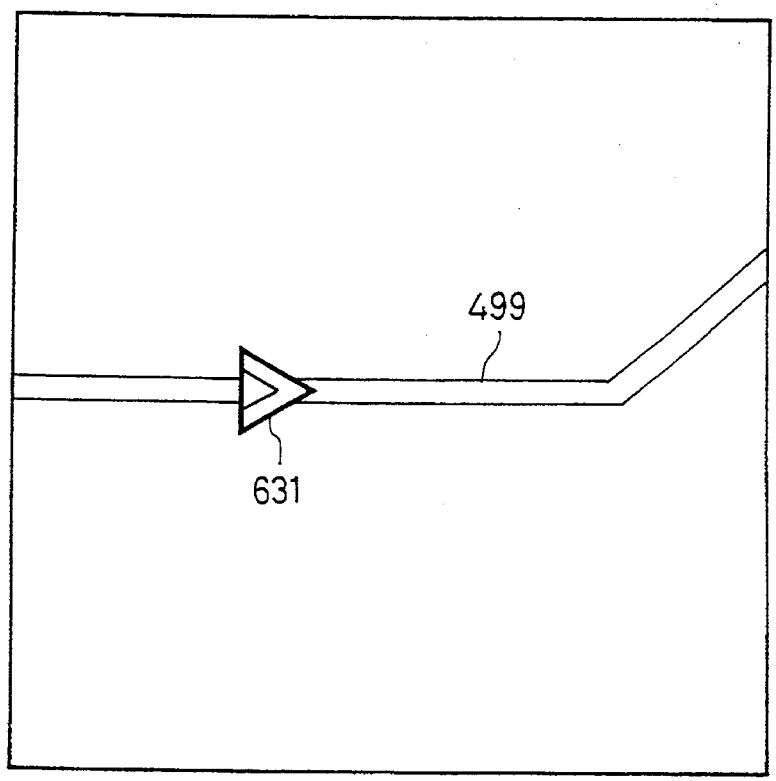
FIG. 72 is an explanatory view showing an example of a deformed map for display.

The control means 3T transforms the coordinates of the extracted intersections 180, 173, 171, 172 and 185 into display coordinates and provides the display coordinates, as well as a command to connect the intersections using straight lines of a predetermined width, to the deformed map preparing means 4, which in turn displays a deformed map on the display means 5 on the basis of the information provided. In this way there is displayed the map shown in FIG. 72. In this case, the control means also provides a command to display the vehicular present position to the deformed map preparing means 4.

Embodiment 28

Figure 73:
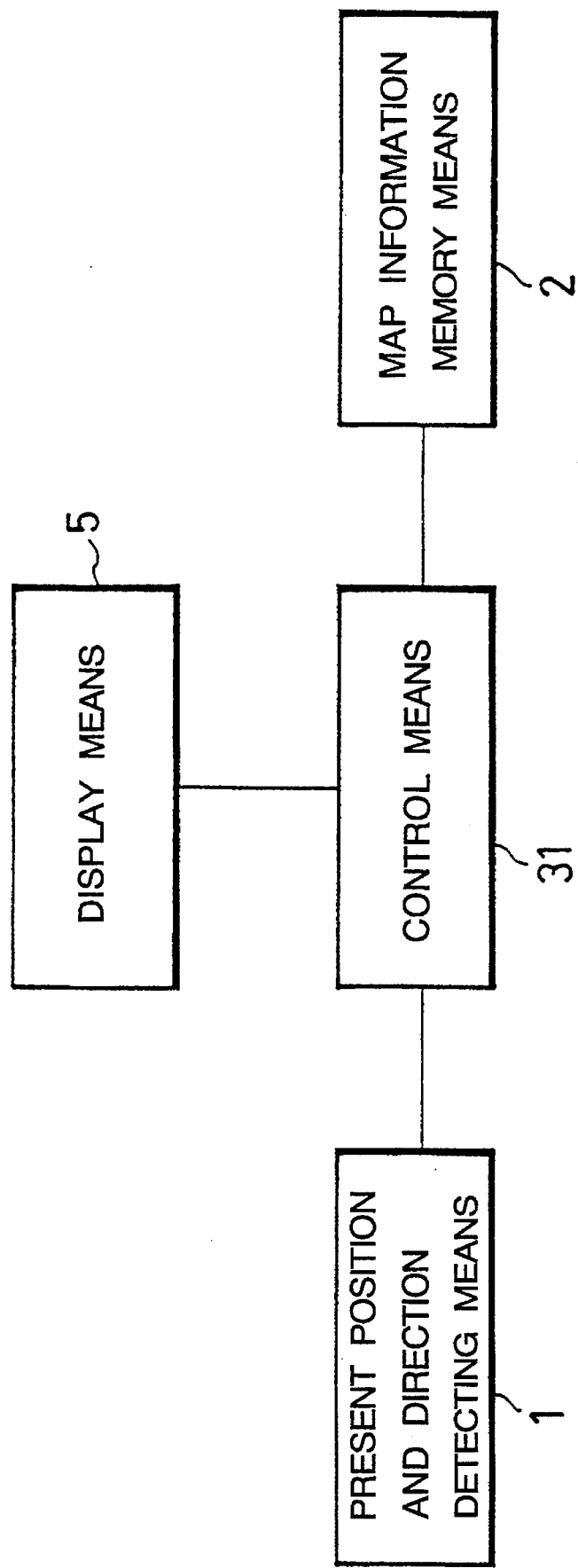
FIG. 73 is a block diagram of a traffic information display system according to a twenty-eighth embodiment of the present invention.

FIG. 73 is a block diagram of a traffic information display system according to a twenty-eighth embodiment of the present invention. In the same figure, the numeral 31 denotes a control means which reads out map data such as road data from the map information memory means 2 and displays roads and corresponding destinations on the display means 5. Other constructional elements are the same as those indicated by the same reference numerals in FIG. 5, provided the storage contents of the map information memory means 2 are different from that shown in FIG. 5.

Figure 74:
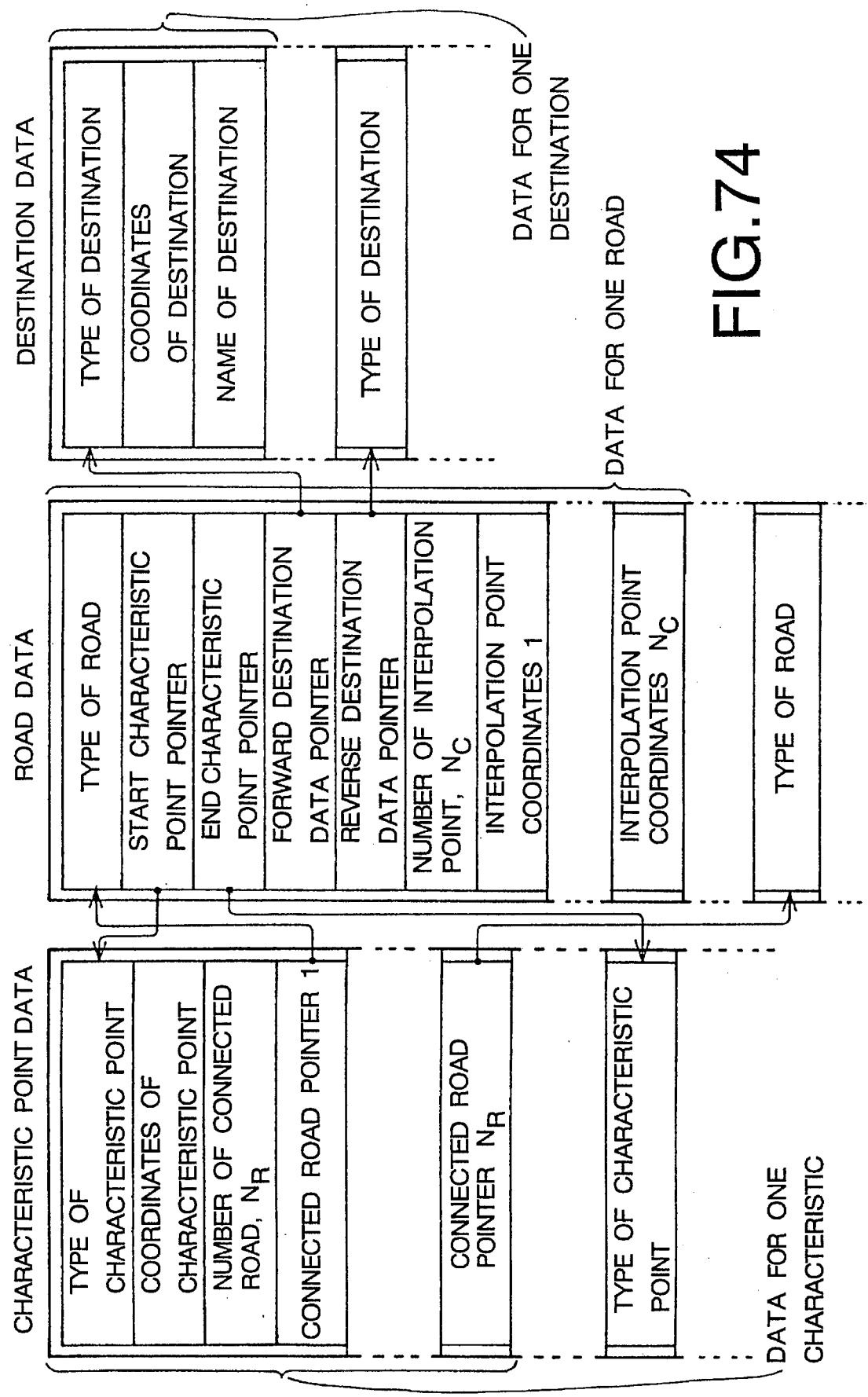
FIG. 74 is an explanatory view showing an example of map data.

FIG. 74 illustrates map data stored in the map information memory means 2 in this embodiment. The map data comprise a large number of characteristic point data, road data and destination data. Two destination data are in a corresponding relation to one road data. The "destination" indicates the place where the corresponding road is to reach, and the destination data include the type of destination, destination coordinates indicating the position of destination in terms of longitude and latitude for example, and the name of destination. The type of destination indicates the name of place as well as the kind and importance of facilities and roads. In the case where the type of destination indicates a road, the name of destination is represented by a route number of the road. It is assumed that the direction from a start characteristic point to an end characteristic point is a forward direction and the direction reverse thereto is a reverse direction, and that a destination pointer in the forward direction is a forward destination data pointer, and a destination pointer in the reverse direction is a reverse destination data pointer.

The operation will now be described with reference to the flowchart of FIG. 75. The control means 31 determines a vehicular present position on the basis of the output of the present position and direction detecting means 1 and also determines a present road (step ST751). The control means 31 then fetches road data of the road from the map information memory means 2 and compares the advancing direction of the vehicle with the direction of the road (step ST752). If the vehicular advancing direction is the same as the forward direction of the road, the control means 31 retrieves the end characteristic point on the basis of the end characteristic point pointer contained in the road data (step ST753). If the advancing direction is not the same as the forward direction of the road, the control means retrieves the start characteristic point on the basis of the start characteristic point pointer contained in the road data (step ST754). Then, from the data of a characteristic point (start or end characteristic point), the control means 31 retrieves roads which are connected to the characteristic point (step ST755). Then, with respect to the other roads than the present road (step ST756) the control means judges whether the characteristic point is a start characteristic point of any of them (step ST757). If there is a road whose start characteristic point is the characteristic point in question, the control means 31 fetches data of the forward destination of that road (step ST758). If not, the control means fetches data of the reverse destination of each road (step ST759). The control means 31 then displays the name of the destination in the destination data thus fetched onto the display means 5 (step ST760).

Figure 75:
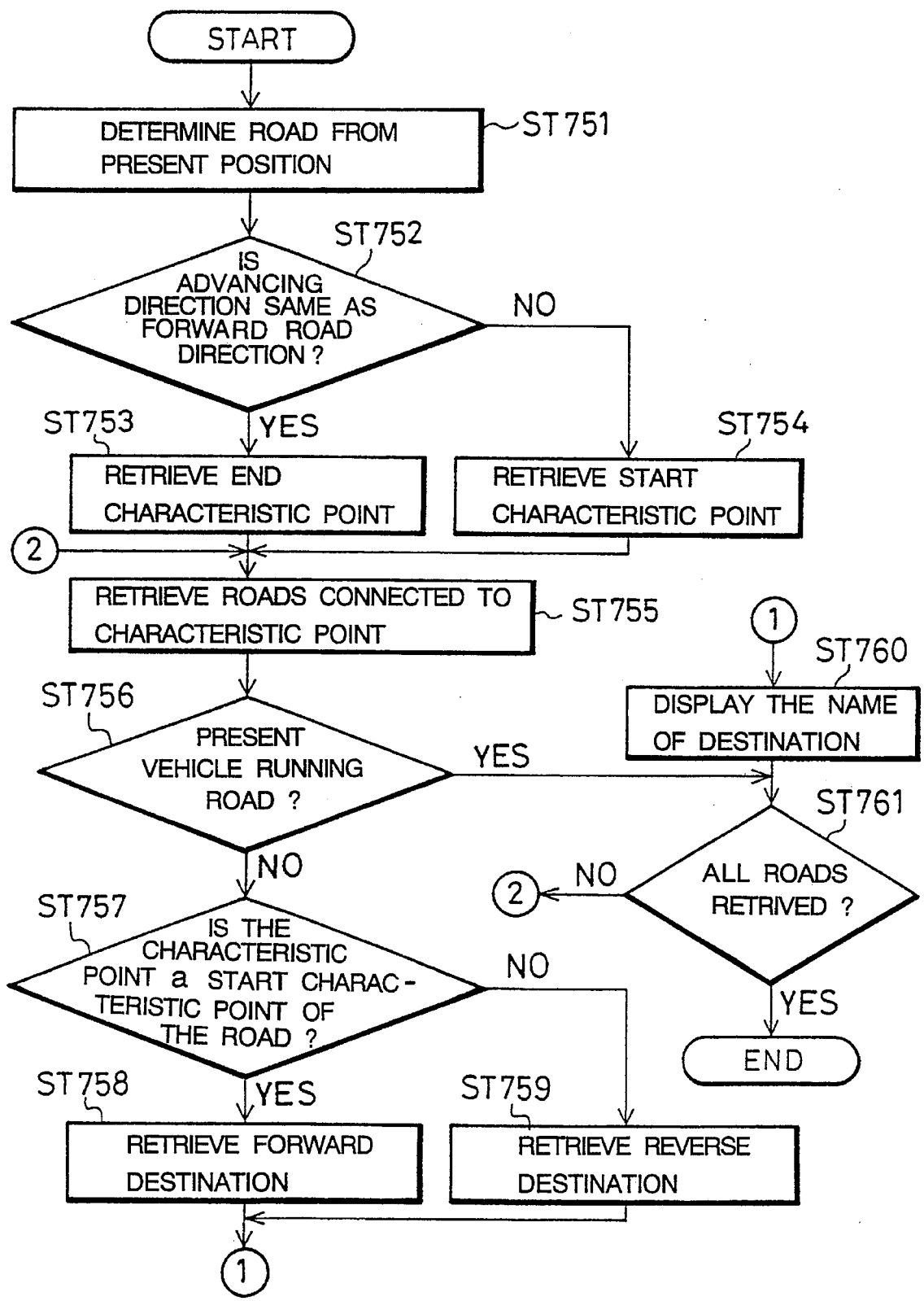
FIG. 75 is a flowchart showing the operation of the traffic information display system of the twenty-eighth embodiment.
Figure 76:
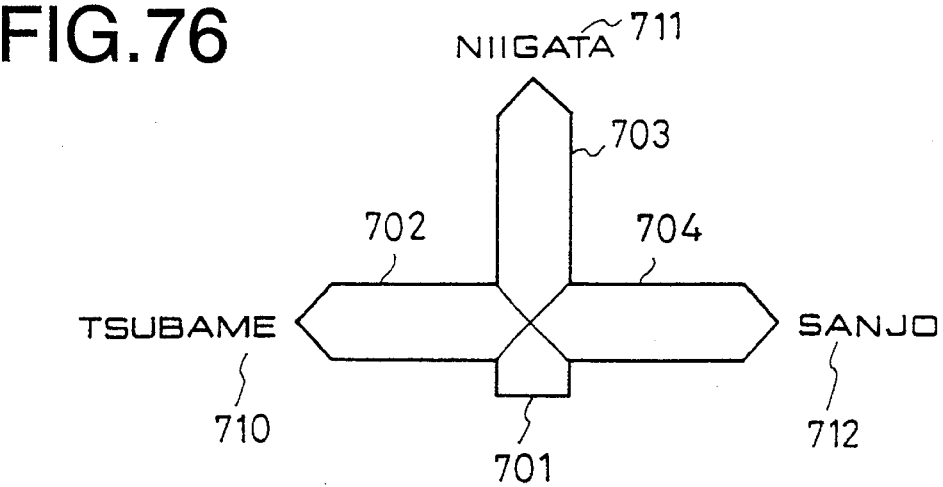
FIG. 76 is an explanatory view showing an example of a deformed map for display.

When the processings of steps ST756 to ST760 have been done with respect to all of the roads connected to the characteristic point (step ST761), there is displayed, for example, a map as is shown in FIG. 76. Though not shown in the flowchart of FIG. 75, the control means 31 displays on the display means 5 a road 701 on which the vehicle is present and roads 702 to 704 which are connected to the characteristic point. In FIG. 76, the numerals 710 to 712 represent the names of destinations displayed. In this way, the destination corresponding to each road can be displayed quickly on the display means 5. In displaying each destination, the size, color and form of display characters may be changed according to the degree of importance of the destination.

Embodiment 29

FIG. 77 is a flowchart showing a portion of the operation of a traffic information display system according to a twenty-ninth embodiment of the present invention. The construction of this embodiment is the same as in FIG. 73 except that the control means 31 is replaced with a control means including means for displaying a route number on the display means 5 in the case where the type of destination indicates a road.

The operation of this embodiment will now be described. The operation of this embodiment is the same as that based on the flowchart of FIG. 75, but in place of the processings of steps ST758, ST759 and ST760 there are executed the processings shown in the flowchart of FIG. 77. First, in step ST771, the control means fetches data of a forward or reverse destination from the map information memory means 2, then fetches the type of destination contained in the destination data (step ST772), checks (step ST773), then on detecting that the type of destination indicates a road, the control means fetches a route number corresponding to the destination name and displays it on the display means 5 (steps ST774 and ST775).

Figure 78:
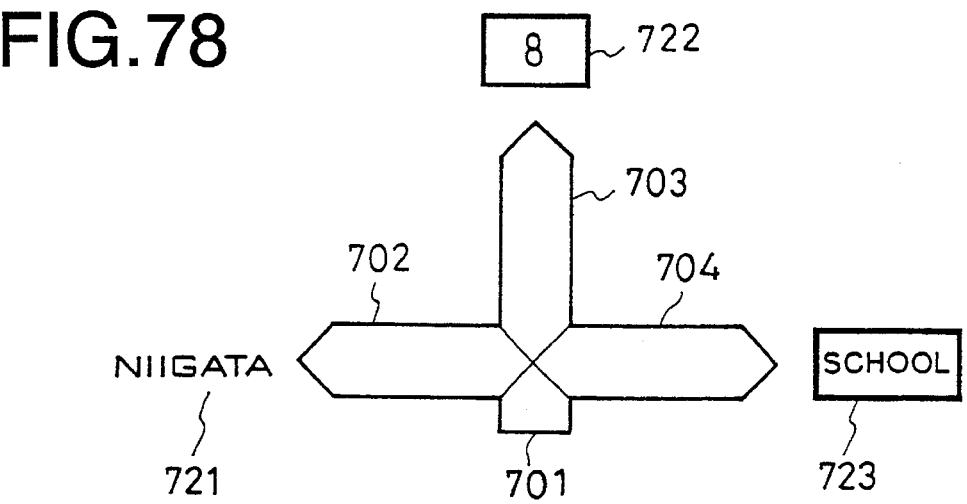
FIG. 78 is an explanatory view showing an example of a map for display.

If the type of destination indicates the name of a place, not showing a road, the control means displays the place-name on the display means 5 (step ST777). Unless a place-name is shown, a symbol corresponding to what is indicated by the type of destination is displayed on the display means 5. In this way there is displayed such a map as shown in FIG. 78 for example. In the same figure, the numerals 721, 722 and 723 represent the name of destination, a route number and facilities, respectively.

Embodiment 30

Although in each of the above embodiments one destination is made corresponding to one direction of one road, a plurality of destinations are actually existent for one direction of one road. Even when many destinations are made corresponding to one direction of one road, the number of destinations capable of being displayed is limited by the resolution of the display means 5. Therefore, it is required to select destinations to be displayed in accordance with such standards as the degree of importance and distance from among plural destinations.

Figure 79:
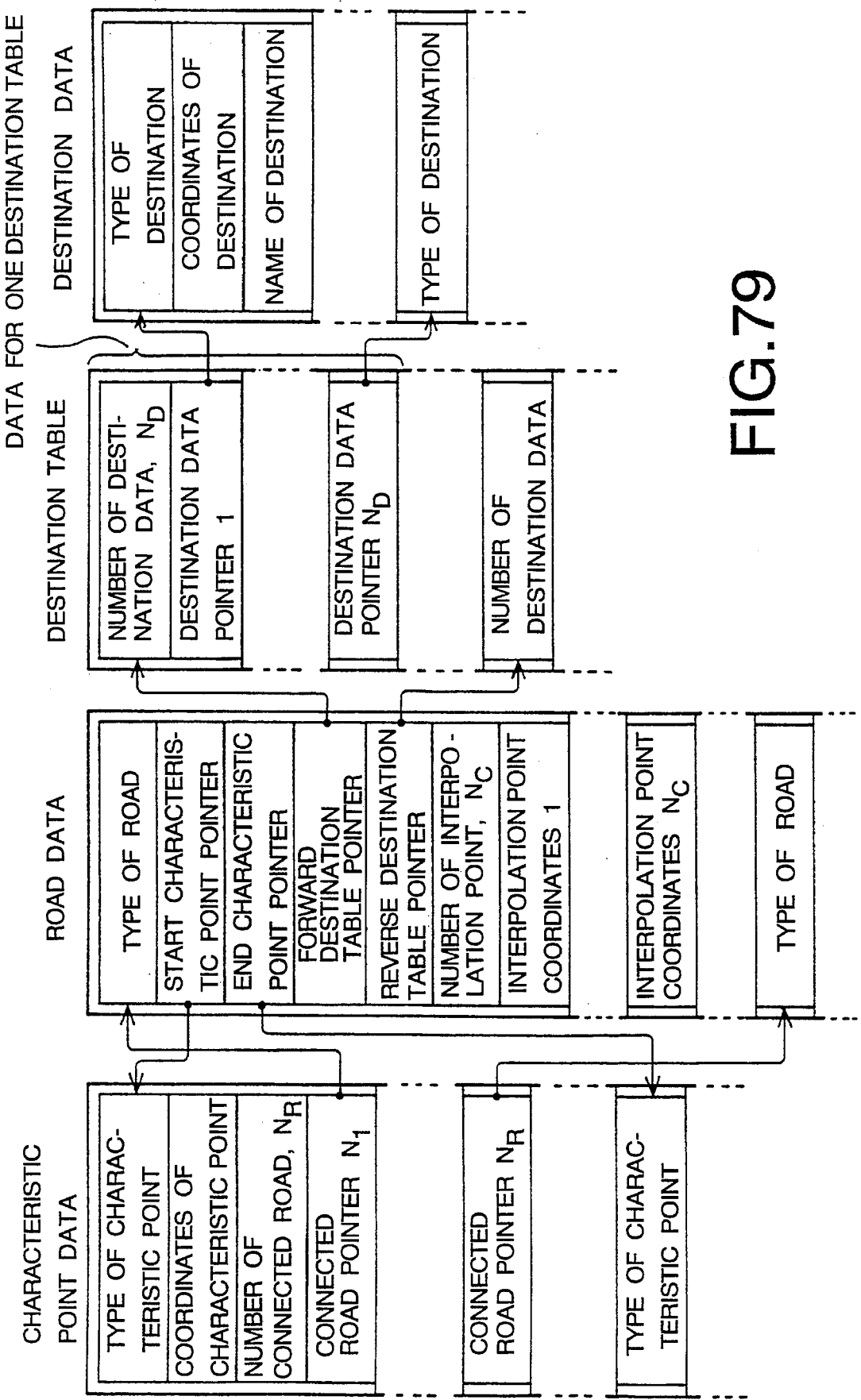
FIG. 79 is an explanatory view showing an example of map data.

FIG. 79 shows the construction of map data used in this embodiment. In the same figure, within a destination table there are set the number of destination data and a plurality of destination data pointers according to forward and reverse destination table pointers contained in each road data. In the road data are set forward and reverse destination table pointers pointing to the destination table.

Figure 80:
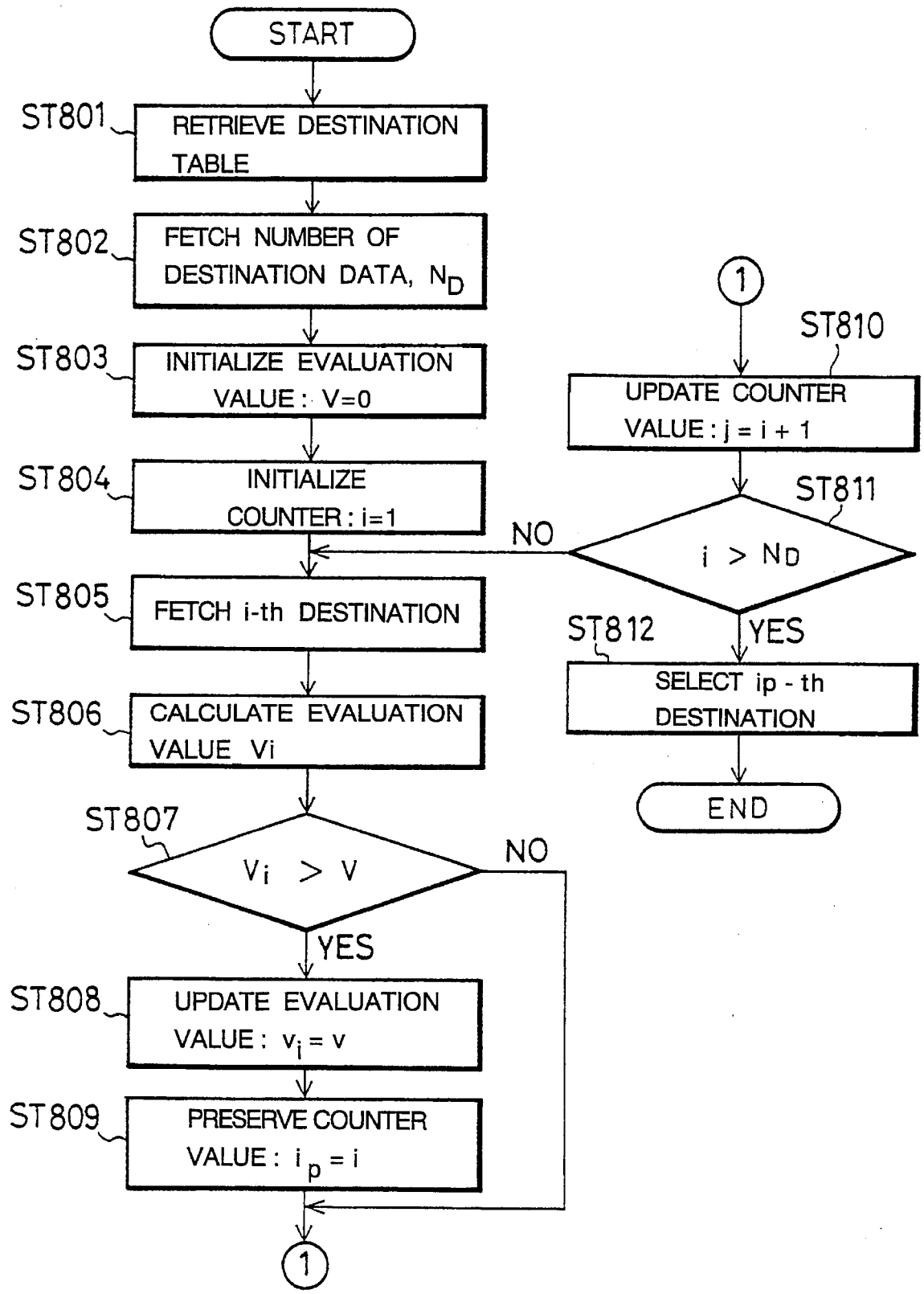
FIG. 80 is a flowchart showing a portion of the operation of a traffic information display system according to a thirtieth embodiment of the present invention.

FIG. 80 is a flowchart showing a portion of the operation of a traffic information display system according to this embodiment. The construction of this embodiment is the same as in FIG. 73 except that the control means 31 is replaced with a control means including a destination selecting means which selects a destination to be displayed according to a predetermined evaluation value from among plural destinations. The control means used in this embodiment will hereinafter be referred to as control means 31B. In this embodiment, the map data shown in FIG. 79 are stored in the map information memory means 2.

The operation of this embodiment is the same as that shown in the flowchart of FIG. 75, but in place of the processings of steps ST758 and ST759 there are executed the processings shown in the flowchart of FIG. 80. As shown in the same figure, the control means 31B retrieves the destination table on the basis of the forward or reverse destination table pointer (step ST801), then fetches the number of destination data, $N_D$, from the area of the destination table indicated by the table pointer (step ST802), and initializes both evaluation value V and counter value i (steps ST803 and ST804). The control means 31B fetches the destination data indicated by an i-th destination data pointer in the destination table (step ST805) and calculates an evaluation value Vi of the destination (step ST806). For calculating the evaluation value there may be adopted, for example, a method wherein a value proportional to the degree of importance indicated by the type of destination in the destination data is used as the evaluation value, or a method wherein the reciprocal of the distance from the vehicular present position up to the destination is used as the evaluation value.

When the evaluation value Vi of the destination is larger than the evaluation value V the evaluation value V is made equal to the evaluation value Vi and the counter value i obtained at this time is preserved as a preservation value $i_p$ (steps ST807, ST808 and ST809). Then, the counter value i is updated (step ST810) and the processings of steps ST805 to ST809 are performed with respect to the next destination data. When the processings have been completed with respect to the destination data corresponding to the number of destination data $N_D$ (step ST811), since the number of destination having the maximum evaluation value Vi is set in the preservation value $i_p$ the destination indicated by the $i_p$-th destination data pointer in the destination table is selected as the destination to be displayed (step ST812).

The destination thus selected is displayed on the display means 5 as in the twenty-eighth embodiment. In this way, an optimum destination is selected and displayed from among plural destinations corresponding to the road displayed. There may be displayed not one but plural destinations.

Embodiment 31

Usually, in the case where a vehicle is running toward a certain destination, it is presumed that when the vehicle is still positioned far away from the destination, it will advance toward a destination (e.g. a big city) representative of a wide area including the final destination, and that when the vehicle has approached the final destination to some extent, it will advance toward the final destination or a destination representative of a narrow area including the final destination. Therefore, by displaying both destinations of high importance such as big cities or the like located far from the vehicle and destinations (general destinations of low importance) located near the vehicle on the way to the final destination, it is considered possible to offer a useful information to the driver throughout the entire route up to the final destination.

Figure 2:
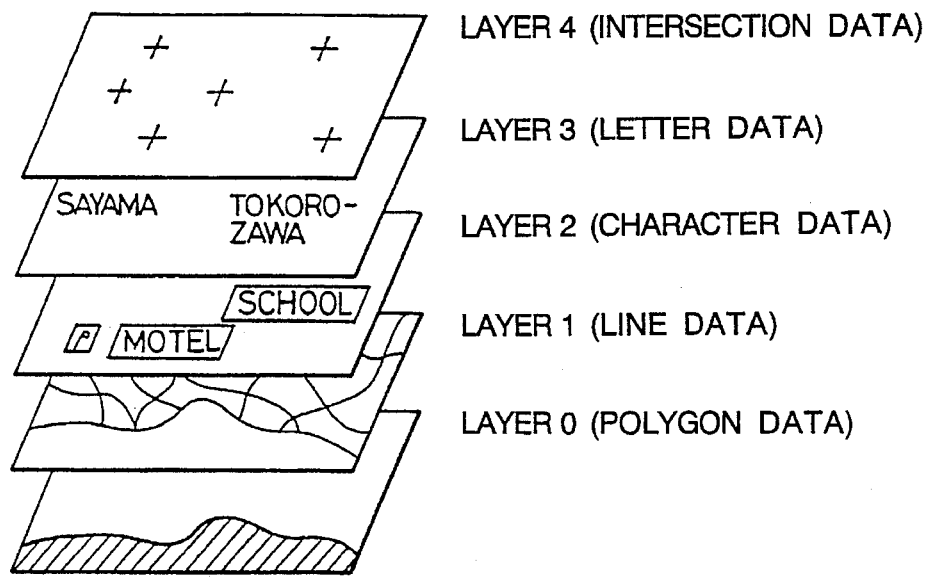
FIGS. 2A and 2B are explanatory views showing conventional map data.
Figure 3:
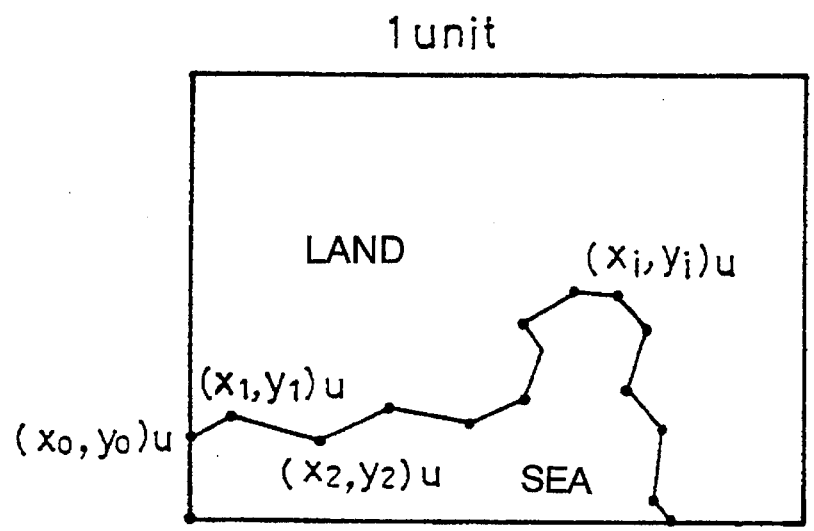
FIG. 3 is an explanatory view showing how to prepare polygon data.
Figure 4:
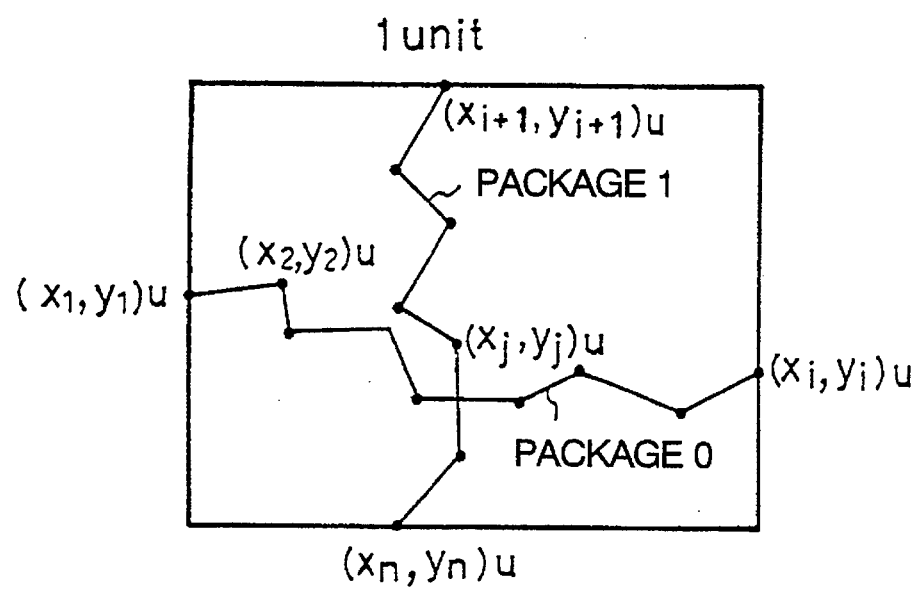
FIG. 4 is an explanatory view showing how to prepare line data.
Figure 81:
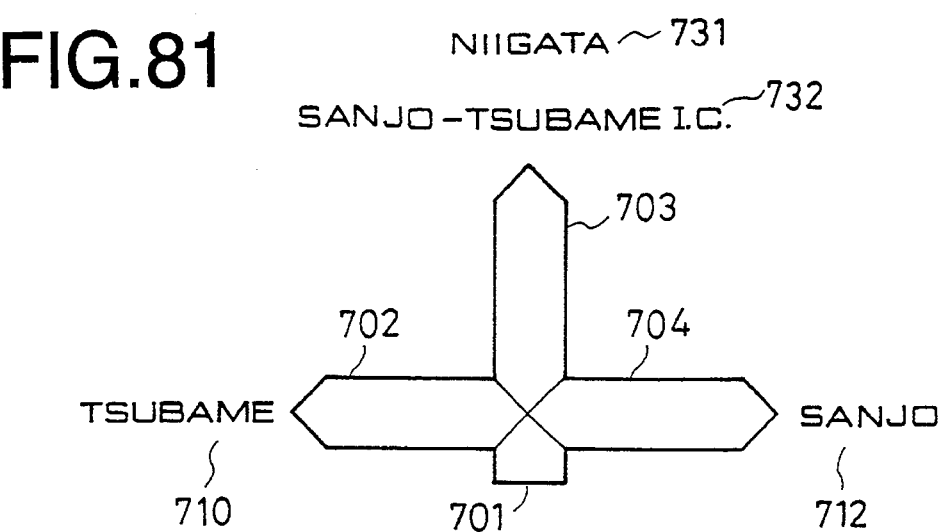
FIG. 81 is an explanatory view showing an example of a map for display.

FIG. 81 shows an example of a map displayed on the basis of such way of thinking, and FIG. 2 is a flowchart showing a portion of the operation of a traffic information display system according to a thirty-first embodiment of the present invention. The construction of this embodiment is the same as in FIG. 73 except that the control means 31 is replaced with a control means including a destination selecting means for selecting a destination according to the degree of importance. The control means used in this embodiment will hereinafter be referred to as control means 31C. In the map information memory means 2 there are stored map data containing such destination table as shown in FIG. 79.

Figure 82:
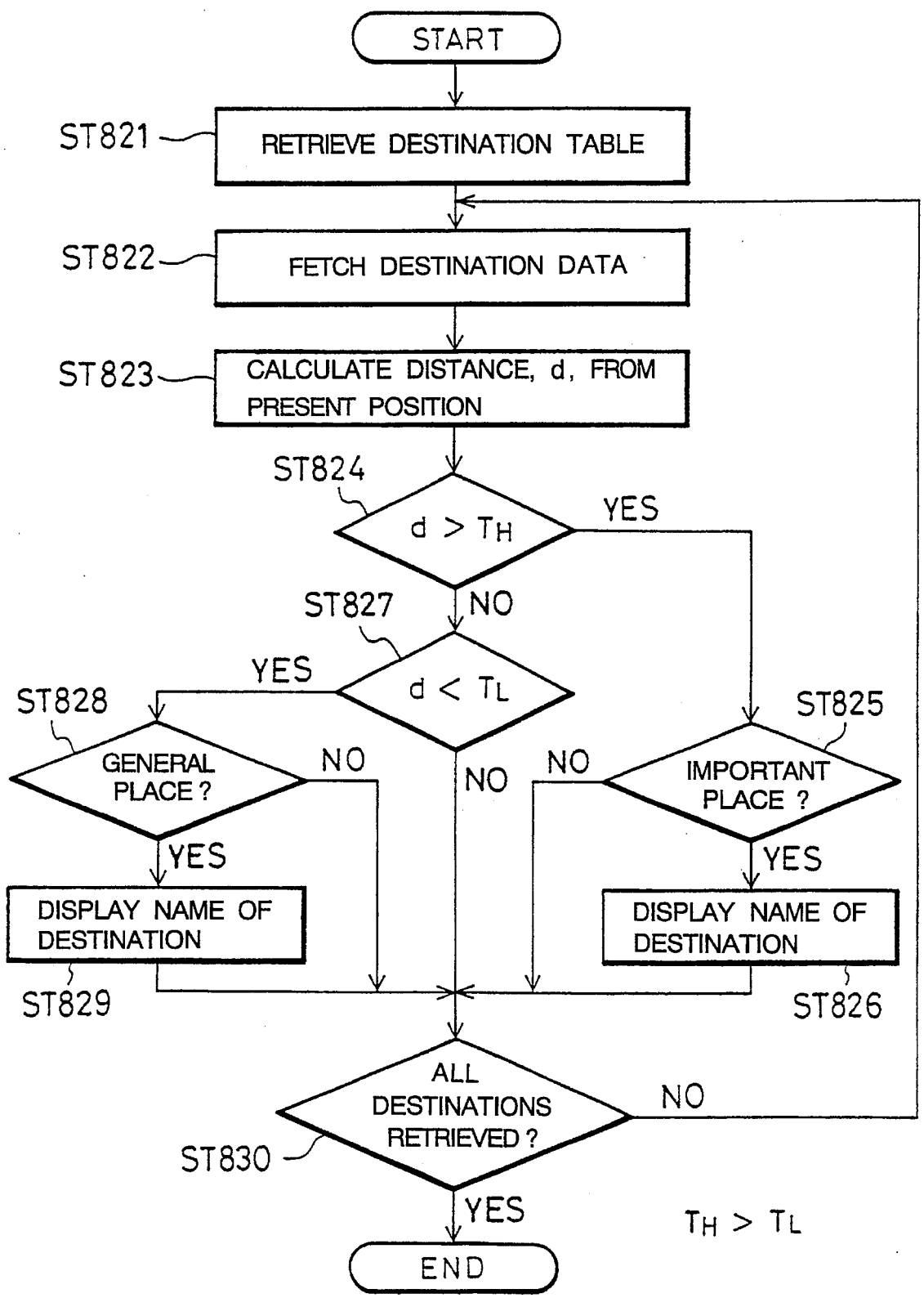
FIG. 82 is a flowchart showing a portion of the operation of a traffic information display system according to a thirty-first embodiment of the present invention.

The operation of this embodiment is the same as that shown in the flowchart of FIG. 75, but in place of the processings of steps ST758, ST759 and ST760 there are executed the processings shown in the flowchart of FIG. 82. As shown in the same figure, the control means 31C retrieves the destination table on the basis of the forward or reverse destination table pointer (step ST821) and then fetches one destination data from the area of the destination table indicated by the table pointer (step ST822). The destination selecting means of the control means 31 calculates the distance between the destination and the present position of the vehicle (step ST923). In the case where the calculated distance is larger than a predetermined value $T_H$ (step ST824), the destination selecting means checks the degree of importance indicated by the type of destination in the destination data (step ST825). When the degree of importance is judged to be high, the control means 31C displays the name of the destination on the display means 5 (step ST826).

When the calculated distance is smaller than a predetermined value $T_L$ (step ST827), the destination selecting means checks the degree of importance indicated by the type of destination in the destination data (step ST828). If the degree of importance is judged to be not high, the control means 31 displays the name of the destination of the display means 5 (step ST829). The above processings are executed by the number of destination data $N_D$ (step ST830) and finally there is displayed, for example, such a map as shown in FIG. 81. In the same figure, the numeral 731 represents a destination of high importance located far from the vehicle, while the numeral 732 represents a destination of low importance located near the vehicle.

Embodiment 32

In the case where a final destination is located still far away from the vehicle, it is presumed that the driver will regard a representative destination present on the route to the final destination, i.e., an on-the-way place, as the present target. Therefore, by providing as the present target an on-the-way place closest to the vehicle out of several on-the-way places present on the route, it is made possible to offer a useful information to the driver.

Figures 83, 88:
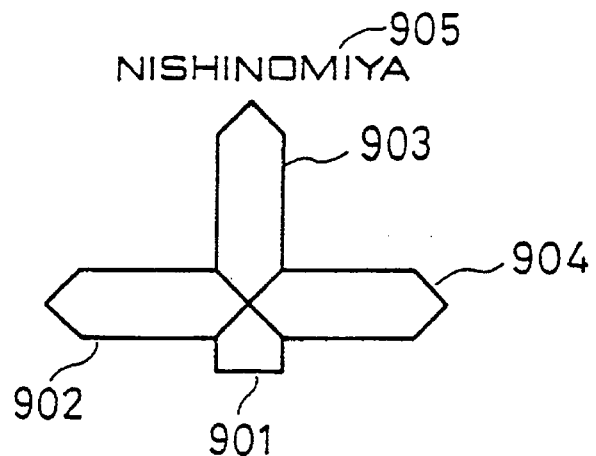
FIG. 83 is an explanatory view showing an example of a map for display.
FIG. 88 is an explanatory view showing an example of a selection menu.
Figure 84:
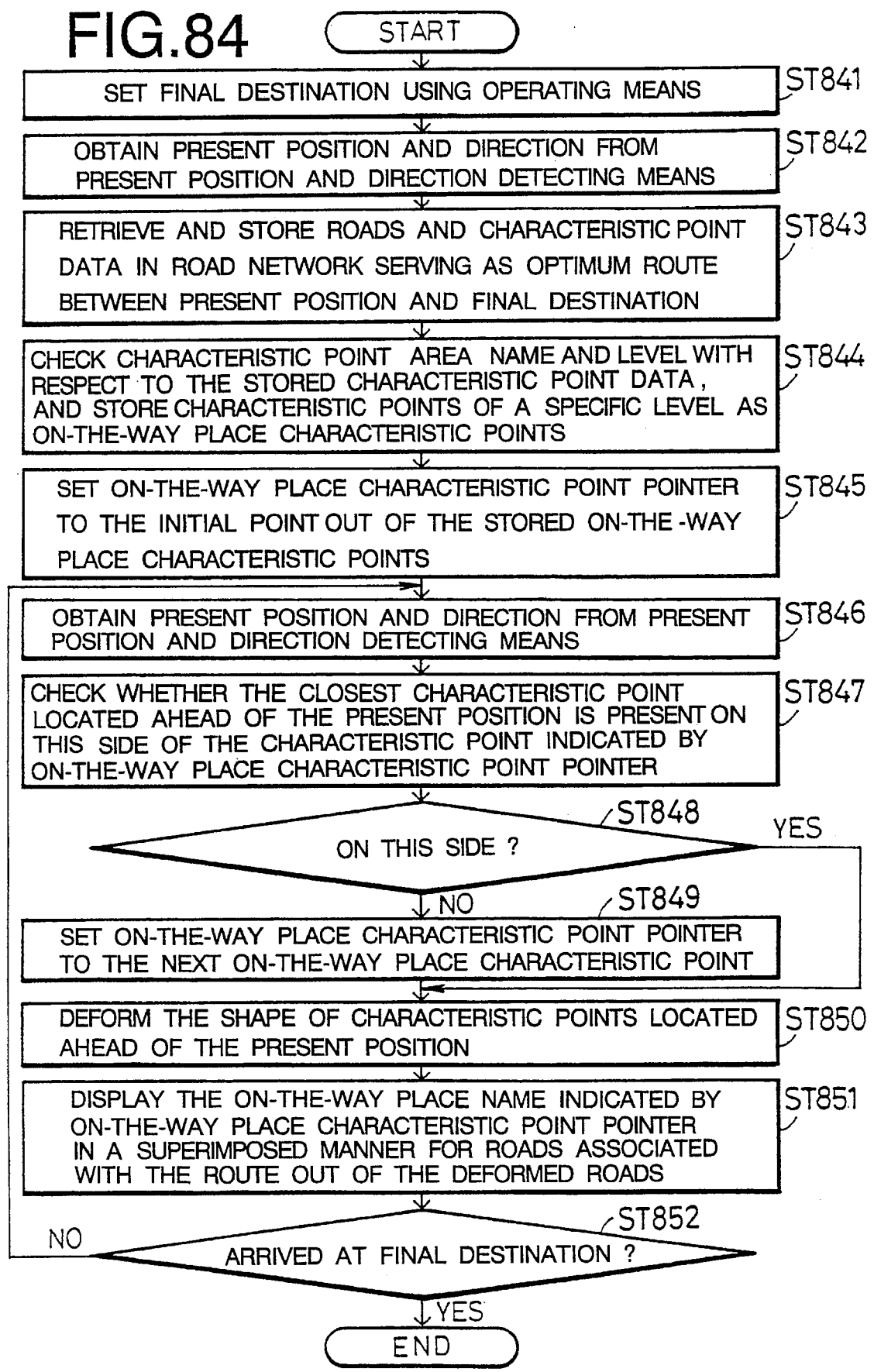
FIG. 84 is a flowchart of a traffic information display system according to a thirty-second embodiment of the present invention.
Figure 85:
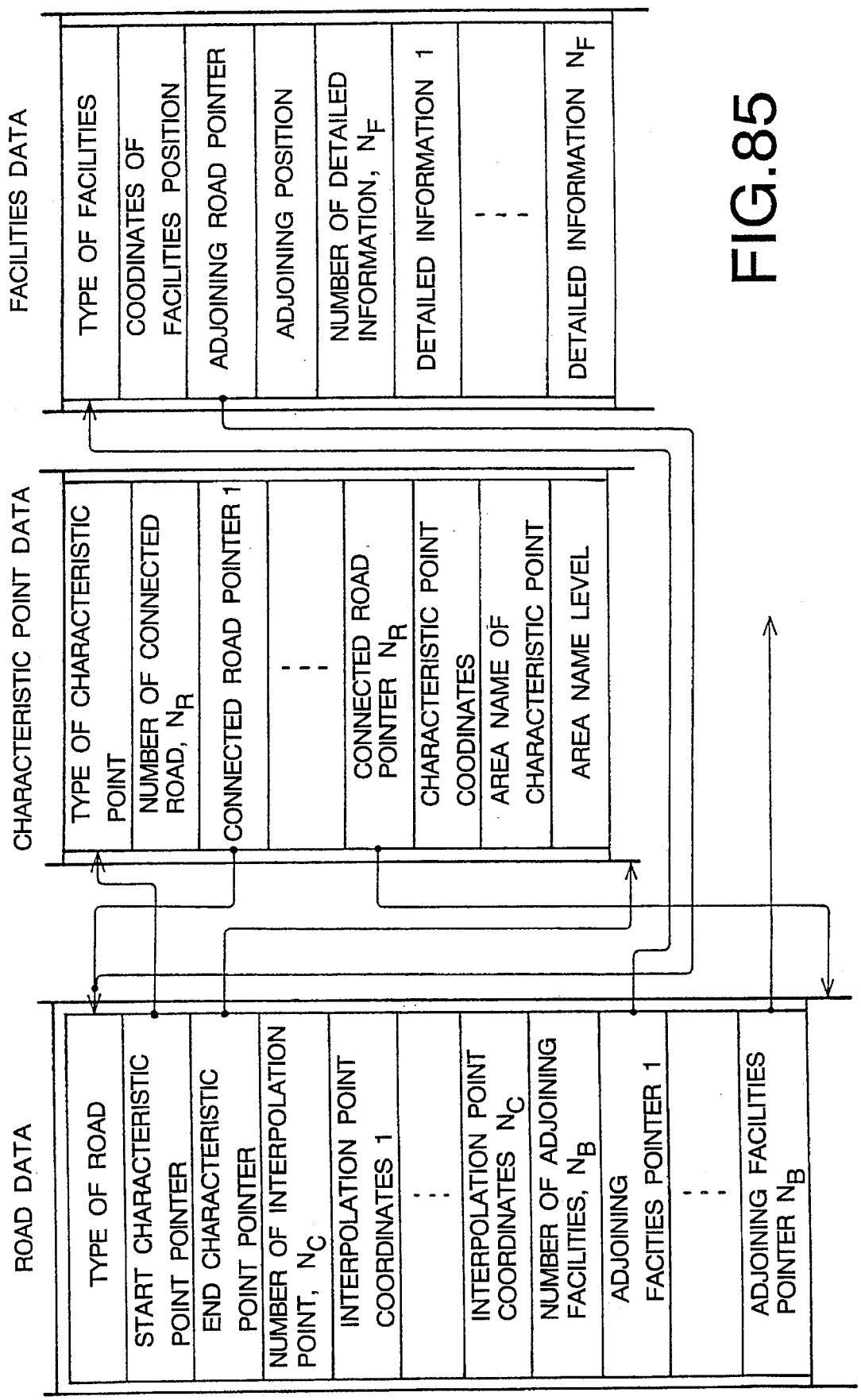
FIG. 85 is an explanatory view showing an example of map data.

FIG. 83 shows an example of a map displayed on the basis of such way of thinking, and FIG. 84 is a flowchart showing the operation of a traffic information display system according to a thirty-second embodiment of the present invention. The construction of this embodiment is the same as in FIG. 48 except that the control means 3M is replaced with a control means which adds the names of important places, etc. present on the route to constituent roads of the route. The control means used in this embodiment will hereinafter be referred to as control means 3V. In the map information memory means 2 there are stored map data containing such characteristic point data as shown in FIG. 85. In the characteristic point data, the characteristic point area name is an area name representative of a wide range including the characteristic point, and the area name level is a data indicating which of an important place-name, a main place-name and a general place-name the characteristic point area name is.

The operation of this embodiment will now be described. Using the operating means 6, the driver sets a destination by designating intersections, etc. (step ST841). The control means 3V determines a present position and an advancing direction of the vehicle on the basis of the output of the present position and direction detecting means 1 (step ST842). The route selecting means 10 retrieves the map information memory means 2 to obtain roads which constitute an optimum route (e.g. a shortest distance route) between the destination and the present position, then fetches start and end characteristic points of each road from the map information memory means 2 and stores them in a RAM or the like (step ST843). Next, the control means 3V checks the characteristic point area name and area name level with respect to the thus-stored characteristic point data, then discriminates characteristic point area names corresponding to, for example, important place-names on the basis of the area name level, extracts them as on-the-way characteristic points and stores them in a RAM or the like in the order based on the route (step ST844). Further, the control means sets an on-the-way place characteristic point pointer to the initial on-the-way place characteristic point in the thus-stored on-the-way place characteristic point group (step ST845).

The control means 3V determines a present position and an advancing direction of the vehicle on the basis of the output of the present position and direction detecting means 1 (step ST846), then retrieves the characteristic point data group on the route to obtain a characteristic point located ahead of the present position and closest to the vehicle. The control means 3V then checks whether this characteristic point is positioned ahead of the characteristic point indicated by the on-the-way characteristic point pointer, namely, on the vehicle side or not (step ST847). If it is not positioned on the vehicle side, the control means sets the on-the-way place characteristic point pointer to the next on-the-way place characteristic point (step ST849).

Next, the control means 3V displays in a deformed form the shape of the characteristic point, together with approach roads to the characteristic point, on the basis of characteristic point data and road data ahead of the present position (step ST850), and displays an on-the-way area name of the characteristic point data indicated by the on-the-way place characteristic point pointer superimposedly on the symbol of a road corresponding to a route road other than the approach roads out of the roads thus displayed in a deformed form (step ST851). In this way, such a map as shown in FIG. 83 is displayed on the display means 5. The processings of steps ST846 to ST851 are executed until the vehicle reaches the destination (step ST852). In FIG. 83, the numerals 901 to 904 indicate symbols which represent roads, of which the numeral 903 represents an outgoing route road from the displayed intersection. Numeral 905 represents the name of the first on-the-way place on the route.

Embodiment 33

Figure 86:
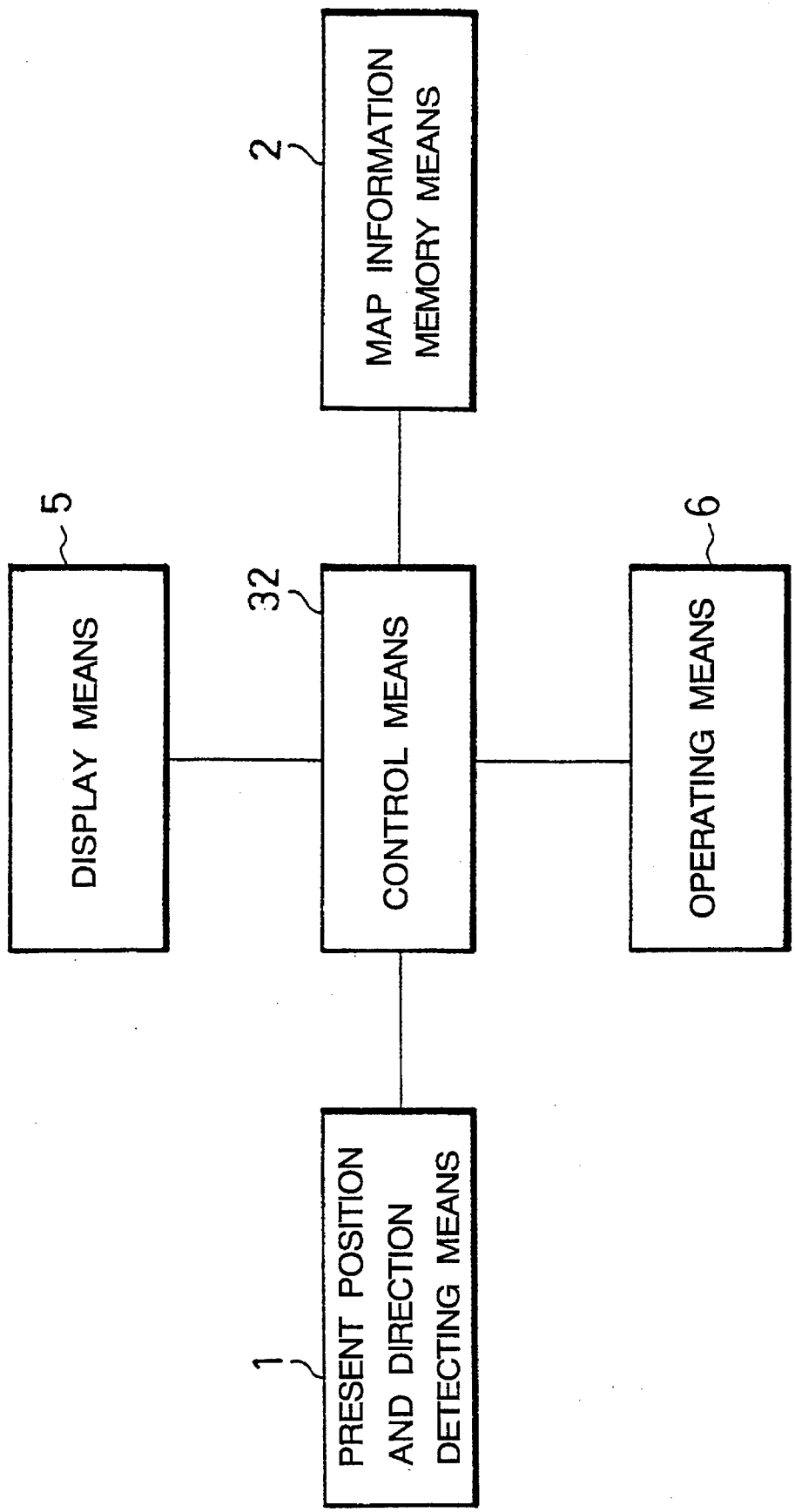
FIG. 86 is a block diagram of a traffic information display system according to a thirty-third embodiment of the present invention.
Figure 87:
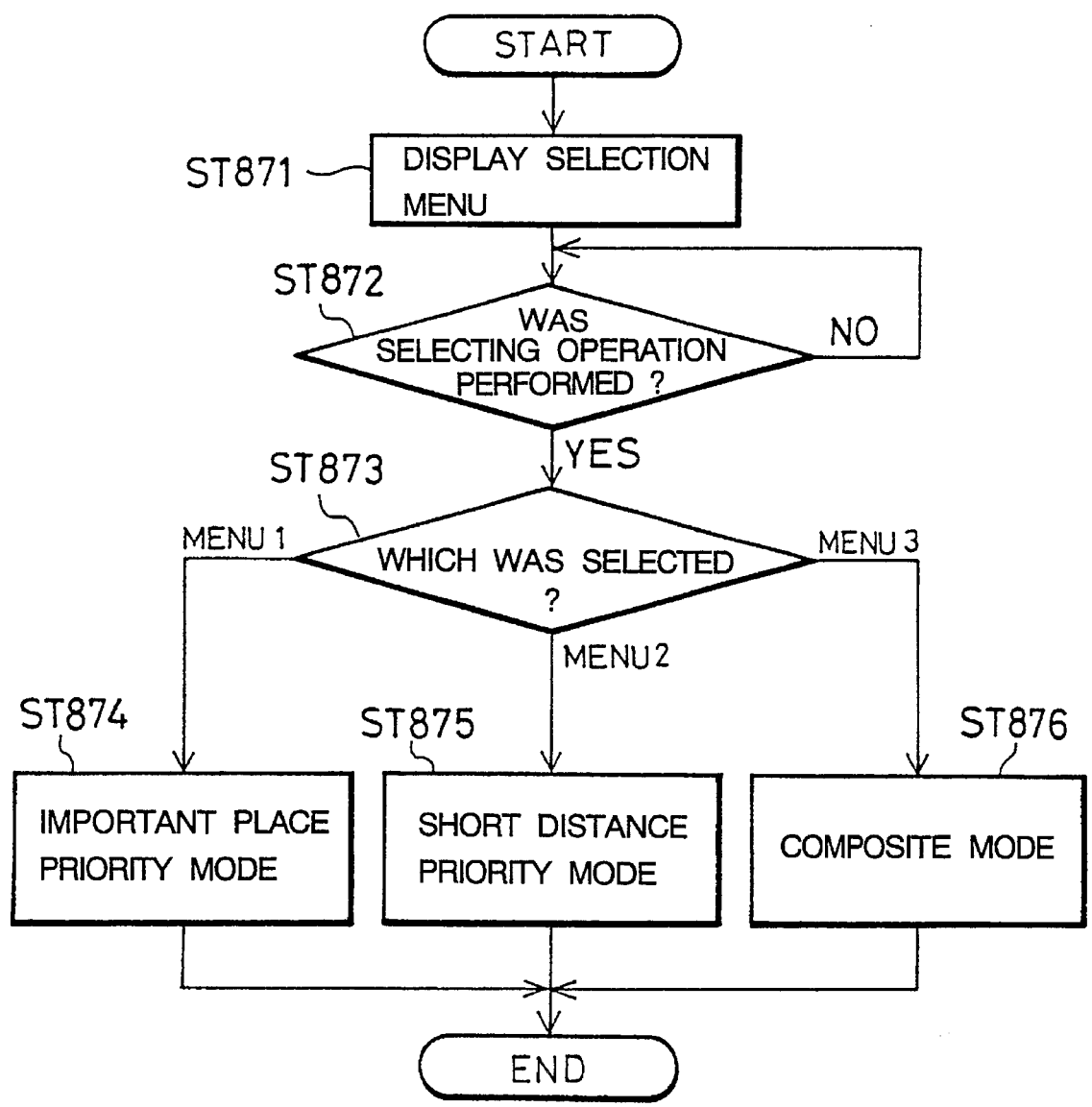
FIG. 87 is a flowchart showing a portion of the operation of the traffic information display system according to the thirty-third embodiment.

FIG. 86 is a block diagram of a traffic information display system according to a thirty-third embodiment of the present invention. In the same figure, the numeral 32 denotes a control means which reads out map data from the map information memory means 2 and displays roads and destinations selected on the basis of a standard input to an operating means 6. Other constructional elements are the same as those indicated by the same reference numerals in FIG. 73. In the map information memory means 2 are stored map data including the destination data shown in FIG. 79. FIG. 87 is a flowchart showing a portion of the operation of the traffic information display system according to this embodiment.

Although in the thirtieth embodiment the destination selecting means included in the control means 31B selects a destination to be displayed in accordance with a predetermined standard, the selection of a destination in this embodiment is performed in accordance with a standard which is input by the driver.

The control means 32 displays such a selection menu as shown in FIG. 88 so that the driver can input the selection standard (step ST871). In accordance with the selection menu the driver selects an important place priority mode, a short distance priority mode, or a composite mode (steps ST872 to ST876). Thereafter, the control means 32 performs the processings described in the thirtieth embodiment, namely, the processings shown in the flowchart of FIG. 80 and determines a destination to be displayed, provided the evaluation value used differs depending on the mode selected. More specifically, when the important place priority mode is selected, the degree of importance indicated by the type of destination in the destination data is used as the evaluation data; when the short distance priority mode is selected, the reciprocal of the distance from the present position of the vehicle up to the destination is used as the evaluation value; and when the composite mode is selected, the sum of a value obtained by weighting the degree of importance and a value obtained by weighting the reciprocal of the distance to the destination is used as the evaluation value.

The destination thus selected is displayed on the display means 5 together with roads. Although in this embodiment the driver selects what is to be used as the evaluation value, the driver may input the evaluation value itself.

Embodiment 34

When a vehicle is running toward a certain destination, if the destination is always displayed on the display means 5, it will be possible for the driver to grasp the route up to the destination more accurately.

Figure 89:
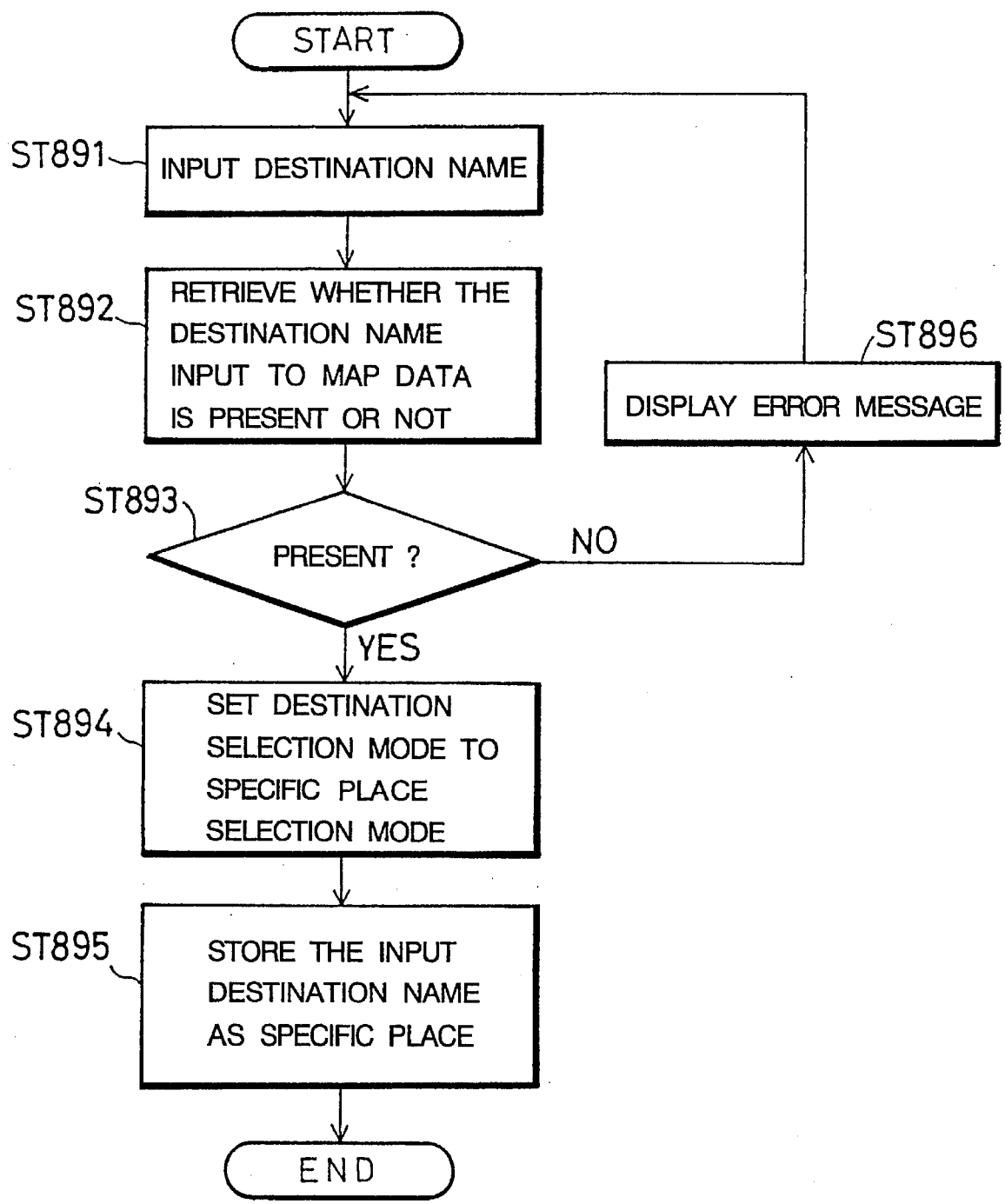
FIG. 89 is a flowchart showing a portion of the operation of a traffic information display system according to a thirty-fourth embodiment of the present invention.
Figure 90:
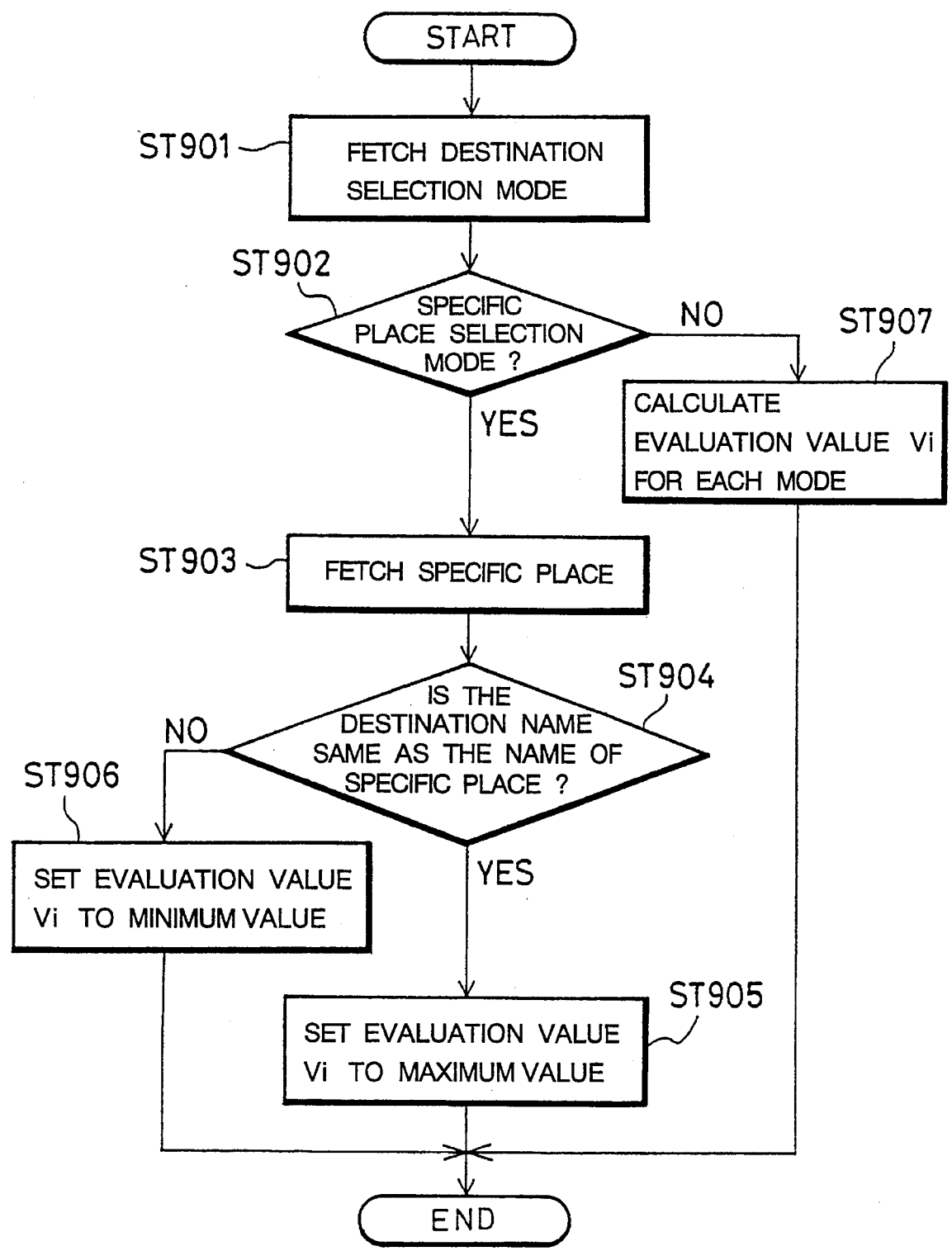
FIG. 90 is a flowchart showing another portion of the operation of the traffic information display system according to the thirty-fourth embodiment.

FIGS. 89 and 90 are flowcharts showing a portion of the operation of a traffic information display system according to a thirty-fourth embodiment of the present invention based on such way of thinking. The construction of this embodiment is the same as in FIG. 86 except that the control means 32 is replaced with a control means including a specific destination registering means for the registration of a specific destination and a specific destination designating means for selecting a specific destination and displaying it on the display means 5. The control means used in this embodiment will hereinafter be referred to as control means 32D. In this embodiment, the map data shown in FIG. 79 are stored in the map information memory means 2.

The operation of this embodiment will now be described. The specific destination registering means obtains a destination name which the driver has inputted using the operating means 6 (step ST891), then retrieves whether the destination name is found in the map data (steps ST892 and ST893), and if the answer is negative, the registration means displays an error message on the display means 5 and urges the driver to input again (step ST896). If the answer is affirmative, the registration means sets a specific place selecting mode as the destination selecting mode (step ST894) and stores the input destination name as a specific place in a RAM or the like (step ST895).

Thereafter, the control means 32D performs processings similar to the processings described in the thirtieth embodiment, namely, the processings shown in the flowchart of FIG. 80, and determines a destination to be displayed. In this case, the processings shown in the flowchart of FIG. 90 are executed in place of step ST806 in the flowchart of FIG. 80. That is, on detecting that the destination selecting mode is set to the specific place selecting mode (steps ST901 and ST902), the specific destination designating means fetches the specific place stored. When the place-name of the destination data fetched in step ST805 (FIG. 80) and the specific place are coincident with each other, the evaluation value Vi is set to a maximum value (steps ST904 and ST905). If not, the evaluation value Vi is set to a minimum value (step ST906). In the case where the specific place selecting mode is not selected, the same processing as that of step ST806 (FIG. 80) is performed (step ST907).

If a specific place is stored in advance, it is selected as the destination which the processing of step ST812 in FIG. 80 is performed, provided it is not selected unless a destination of the same name as the specific place is found out in the area of the destination table used in step ST801 in FIG. 80. Then, the control means 32D displays roads on the display means 5 together with the destination selected.

Although in this embodiment the specific place is determined by inputting the name of destination to the operating means 6, it may be determined by displaying destination names contained in the map data onto the display means 5 and then selecting one of them which selection is made by the driver. In this embodiment, moreover, although the evaluation value Vi of the destination name not coincident with the specific place is set to a minimum value, the evaluation value Vi may be calculated by the same processing as that of step ST806 in FIG. 80. Further, the display color, size and character form of the specific place may be rendered different from those of destinations not corresponding to the specific places.

Embodiment 35

Figure 91:
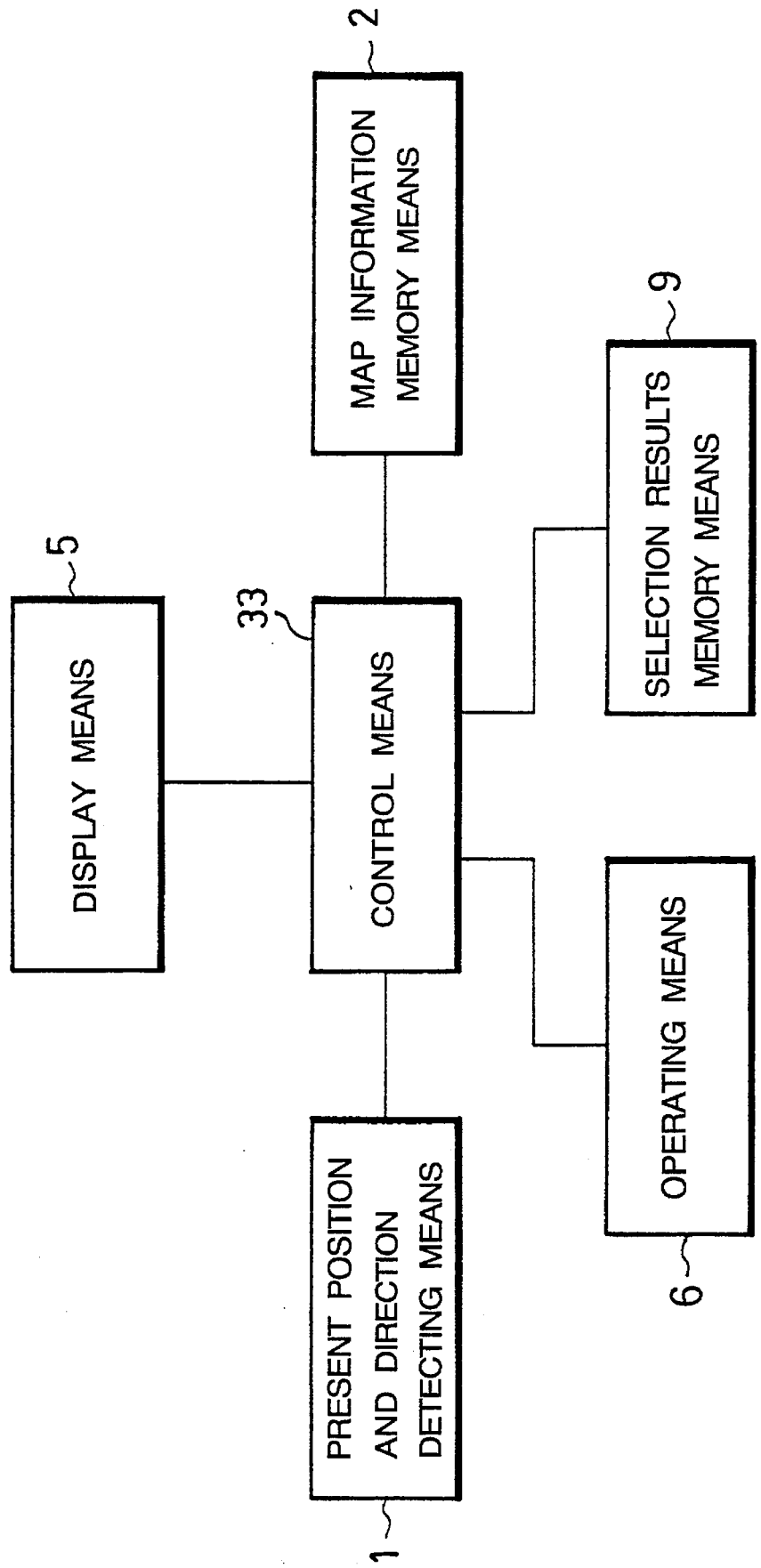
FIG. 91 is a block diagram of a traffic information display system according to a thirty-fifth embodiment of the present invention.

FIG. 91 is a block diagram of a traffic information display system according to a thirty-fifth embodiment of the present invention. In the same figure, the numeral 33 denotes a control means which displays on the display means 5 a destination which has been selected on the basis of the map data stored in the map information memory means 2 and the contents of a selection results memory means 9, as well as roads, the selection results storing means 9 storing selected destinations. Other constructional elements are the same as those indicated by the same reference numerals in FIG. 73 or FIG. 86. In the map information memory means 2 are stored the map data shown in FIG. 79.

In the case of displaying a destination using the map data shown in FIG. 79, it is also conceivable for the driver to select a destination to be displayed as necessary in addition to the processing of selecting such destination in accordance with a certain standard such as that used in the thirtieth embodiment. In this case, the vehicle may run on the same road as that on which it has run previously, and in many cases the previous destination is also the destination of this time.

Figure 92:
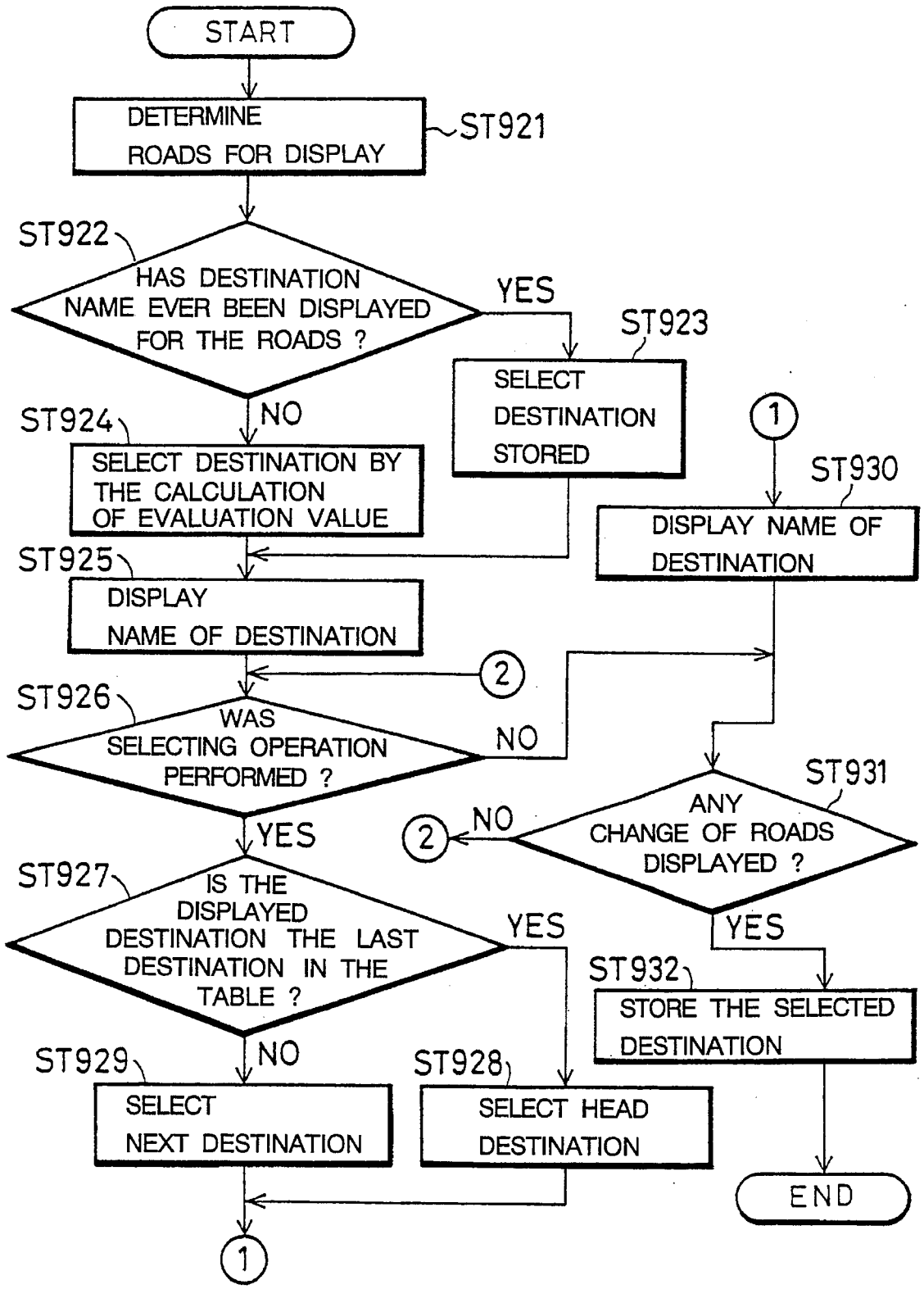
FIG. 92 is a flowchart showing the operation of the traffic information display system of the thirty-fifth embodiment.

The system of this embodiment operates on the basis of such a way of thinking. The operation of this embodiment will now be described with reference to the flowchart of FIG. 92. The control means 33 first determines roads to be displayed (step ST921), for example, by a method wherein the road with the vehicle being present thereon as well as roads connected to characteristic points present ahead of the vehicle on the present road are determined to be display roads or by a method wherein the driver designates display roads using the operating means 6. Next, the control means 33 judges whether the roads thus determined correspond to the destination whose name has previously been displayed (step ST922). If the answer is affirmative, it follows that the destination is stored in the selection results memory means 9, so the control means fetches the stored destination (step ST923), while if the answer is negative, the control means determines a destination to be displayed by the calculation of evaluation value. For example, the evaluation value calculation is performed according to the processings of steps ST803 to ST812 shown in the flowchart of FIG. 80.

The control means 33 displays the thus-determined destination and roads on the display means 5. When the driver does not acknowledge that the displayed destination name is proper, he can change it using the operating means 6. More specifically, on detecting that a destination selecting operation has been done by the driver (step ST926), the control means 33 fetches the destination data pointer next to the destination data pointer corresponding to the displayed destination in the area of the map table which is used at present. The control mean then fetches the destination data indicated by that destination data pointer (steps ST927, ST928 and ST929), and updates the present display destination by the destination name contained in the destination data. That is, a new destination name is displayed on the display means 5.

When the driver does not acknowledge that the newly displayed destination name is proper, he can further change it using the operating means 6. Upon detection of a change of the display roads (step ST931), the control means 33 stores the destination corresponding to the destination name which is displayed at present, in the selection results memory means 9, together with roads corresponding to that destination (step ST932). The change of roads to be displayed occurs, for example, when the vehicle has passed a certain characteristic point or when the driver has designated roads to be newly displayed. In this way the driver can change the destination to be displayed as necessary. In the case of displaying a new road, if an optimum destination corresponding to that road has been selected previously, this destination is first displayed, whereby the number of operations performed by the driver can be decreased.

Embodiment 36

Figure 93:
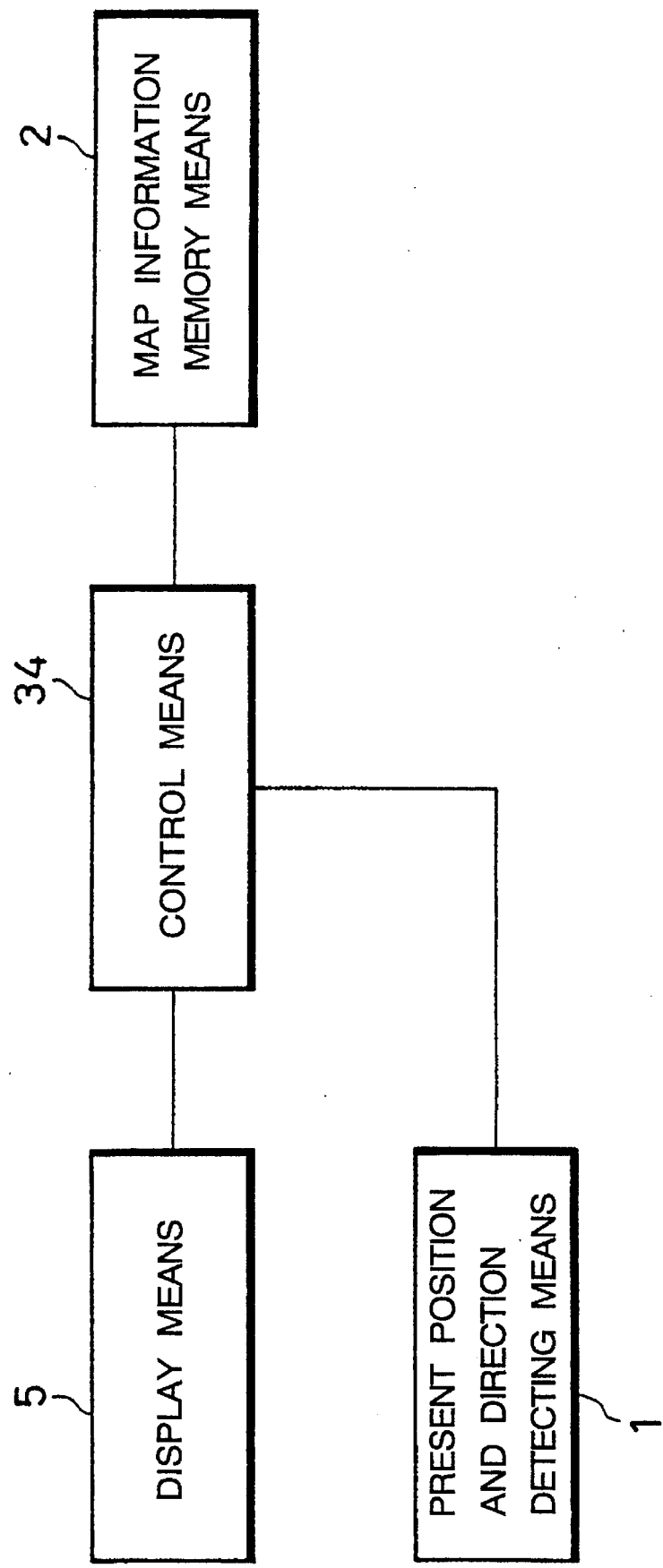
FIG. 93 is a block diagram of a traffic information display system according to a thirty-sixth embodiment of the present invention.
Figure 94:
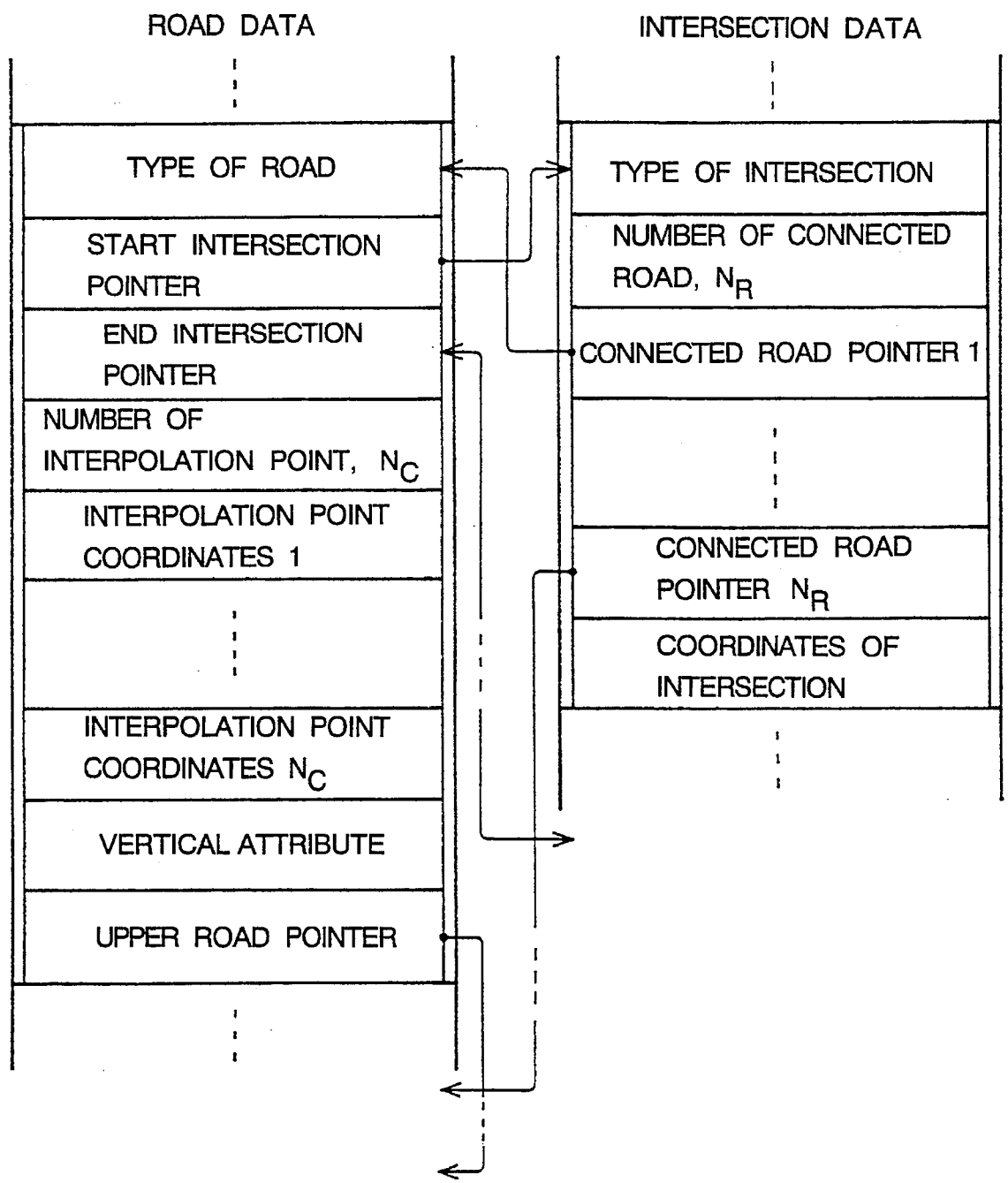
FIG. 94 is an explanatory view showing an example of map data.

FIG. 93 is a block diagram of a traffic information display system according to a thirty-sixth embodiment of the present invention. In the same figure, the numeral 34 denotes a control means which prepares a map on the basis of the map data stored in the map information memory means 2, displays the map on the display means 5 and further displays two roads which are in a relation of grade separation, in a predetermined form. Other constructional elements are the same as those indicated by the same reference numerals in FIG. 5, provided in this embodiment the map data shown in FIG. 94 are stored in the map information memory means 2, which map data include many road data and intersection data. The road data includes a vertical attribute showing whether another road is present above a road and also includes an upper road pointer indicating another road present on the upper side.

Figure 95:
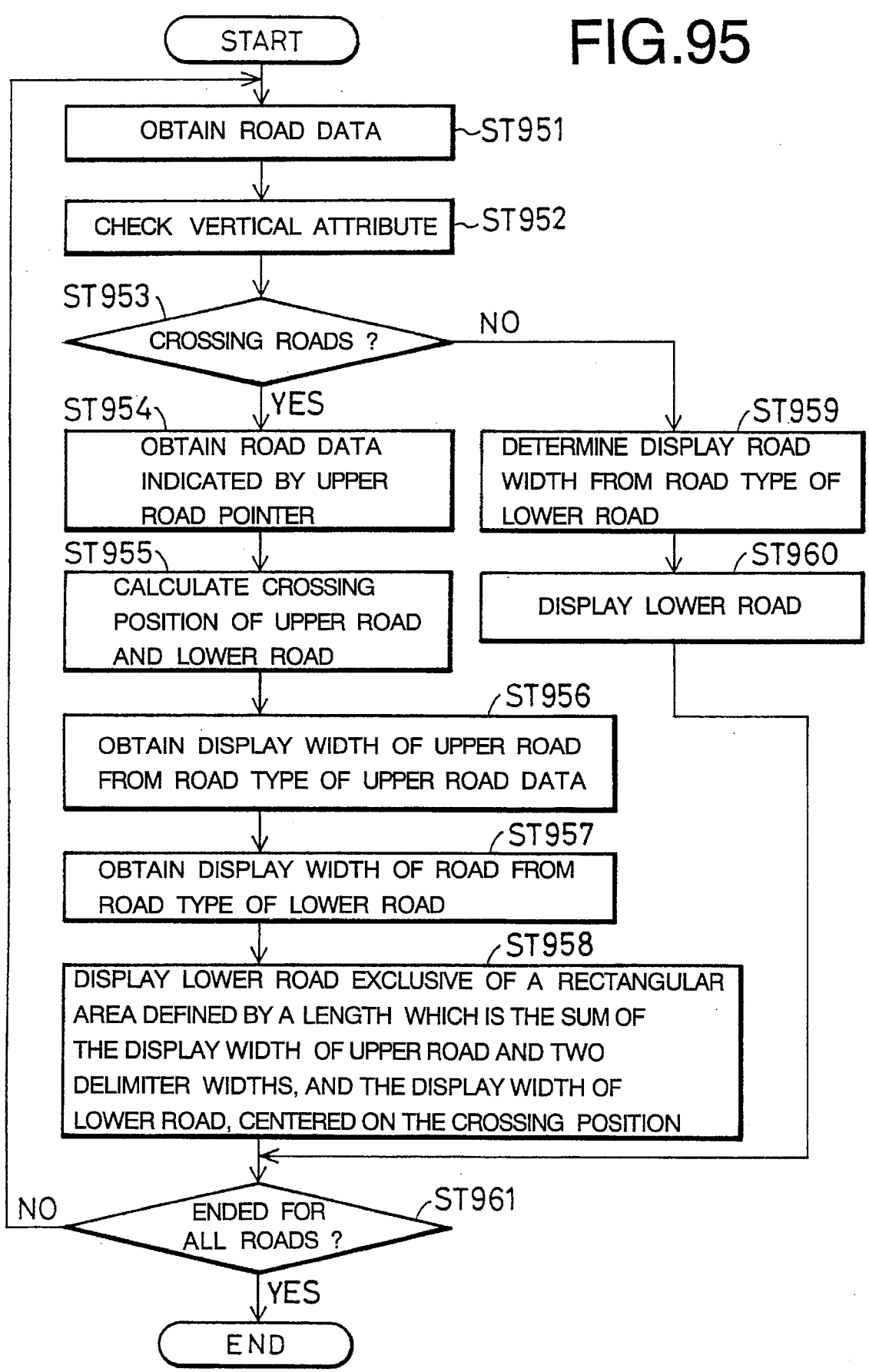
FIG. 95 is a flowchart showing the operation of the traffic information display system of the thirty-sixth embodiment.

The operation of this embodiment will now be described with reference to the flowchart of FIG. 95. First, the control means 2 fetches one road data out of roads to be displayed from the map information memory means 2 (step ST951) and checks a vertical attribute in the road data (step ST952). In the case where the vertical attribute shows that there is no road above this road, the control means 34 determines a display width of the road according to the contents of the road type contained in the road data (step ST959) and displays the portion from a start intersection up to an end intersection of the road having such display width on the display means 5 (step ST960).

Figure 96:
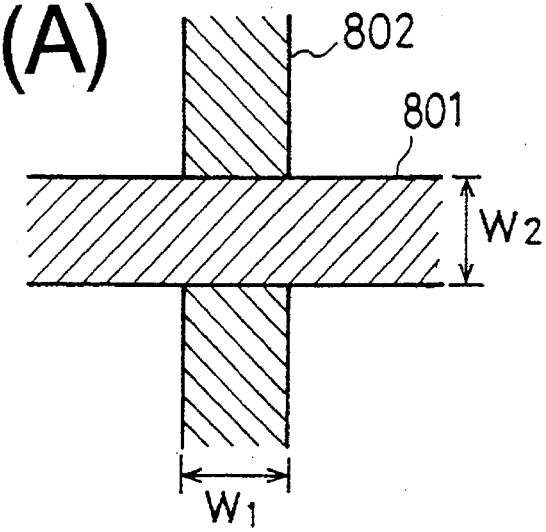
FIG. 96(A), 96(B) and 96(C) are explanatory views showing how to prepare road portions to be displayed.
Figure 96:
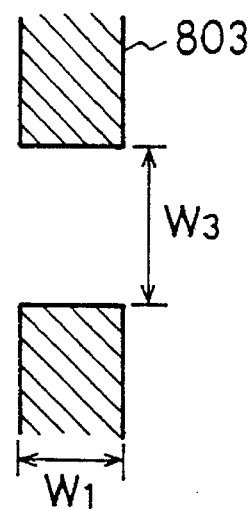
Figure 96:
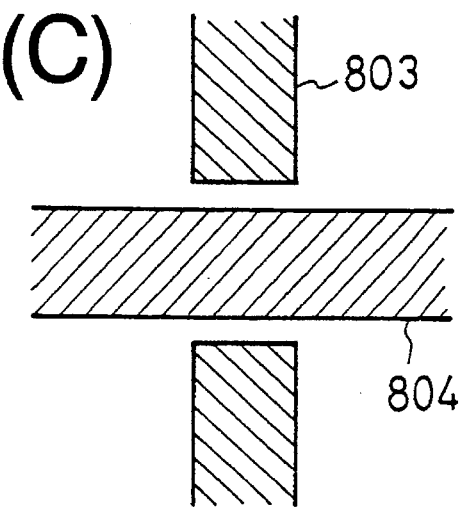

In the case where the vertical attribute shows that there is another road (upper road) above this road and both roads are judged to cross each other, for example, from the respective interpolation point coordinates, the control means 34 fetches road data of the upper road from the map information memory means 2 (step ST954), then calculates the coordinates of the crossing point of the two roads by using interpolation point coordinates of the roads (step ST955). The control means 34 and further calculates a display width of the upper road from the contents of the road type of the upper road contained in the road data (step ST956), and also calculates a display width of this road (lower road) from the contents of the road type thereof contained in the road data (step ST957). For example, when there are two such roads as shown in FIG. 96(A), the width of the upper road is $W_2$ and that of the lower road is $W_1$.

Then, the control means 34 determines a length $W_3$ which is the sum of the width $W_2$ of the upper road and a predetermined delimiter width, further determines a rectangular area of length $W_3$ and width $W_1$ centered on the crossing point, and displays the lower road exclusive of the said rectangular area on the display means 5 (step ST958). As a result of this processing there is displayed the road shown in FIG. 96(B) for example. The upper road is displayed as it is (steps ST959 and ST960), so that the grade separation portion is displayed as shown in FIG. 96(C). The operation is ended when the processings of steps ST951 to ST960 have been done with respect to all of the roads to be displayed (step ST961).

Embodiment 37

Figure 97:
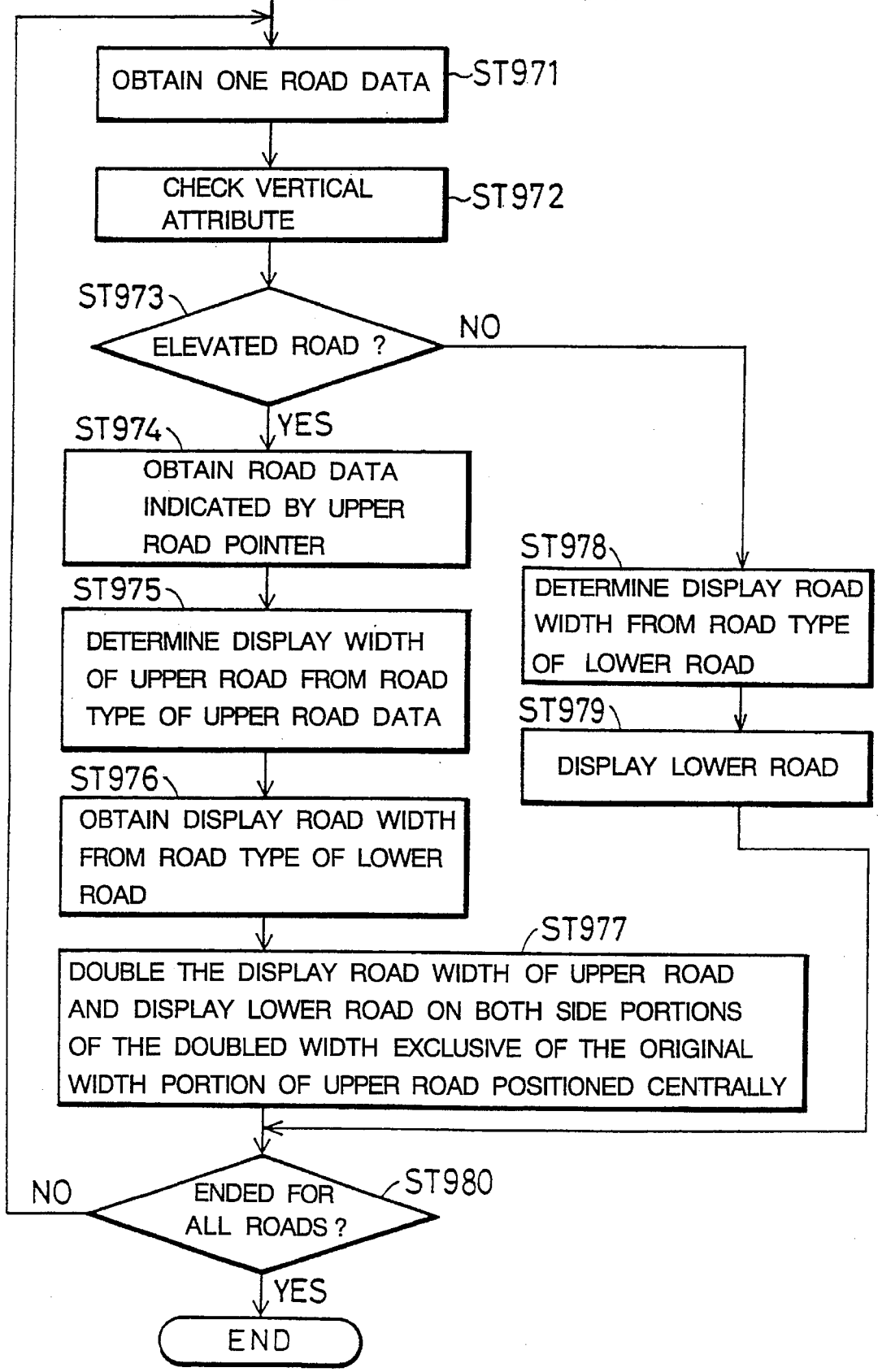
FIG. 97 is a flowchart showing the operation of a traffic information display system according to a thirty-seventh embodiment of the present invention.

FIG. 97 is a flowchart showing the operation of a traffic information display system according to a thirty-seventh embodiment of the present invention. The construction of this embodiment is the same as in FIG. 93 except that the control means 34 is replaced with a control means which, in the case of another road being present above a certain road, that is, in the case of two roads being in a parallel and vertically spaced relation to each other, displays those two roads in a predetermined form. The control means used in this embodiment will hereinafter be referred to as control means 34E.

The operation of this embodiment will now be described with reference to the flowchart of FIG. 97. First, the control means 34E fetches one road data out of roads to be displayed from the map information memory means 2 (step ST971)

and checks a vertical attribute contained in the road data (step ST972). When the vertical attribute shows that there is no road above this road, control means 34E determines a display width of the road according to the contents of the road type contained in the road data (step ST978) and displays the portion from a start intersection up to an end intersection of the road having such display width on the display means 5 (step ST979).

Figure 98:
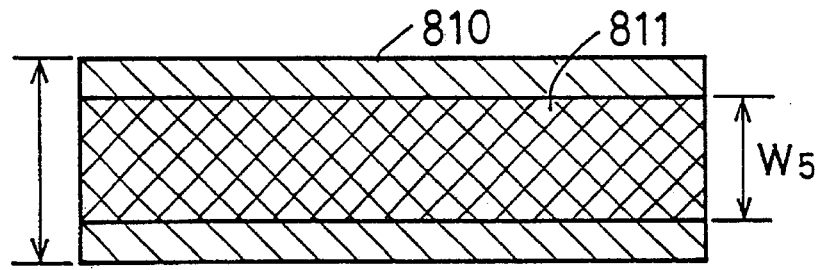
FIGS. 98A–B are explanatory view showing how to prepare road portions to be displayed.
Figure 98:
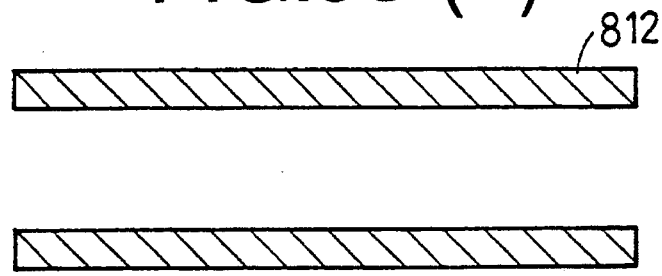

In the case where the vertical attribute shows that there is another road (upper road) above this road and both roads are judged to be in a parallel and vertically spaced relation to each other, the control means 34E fetches road data of the upper road (elevated road) from the map information memory means 2 (step ST974) and calculates a display width of the upper road from the contents of the road type of the upper road contained in the road data (step ST975). In the case where there are two such roads 810 and 811 as shown in FIG. 98(A), the width of the upper road 811 is $W_5$.

The control means 34E displays on the display means 5 a road having a width twice as large as the width $W_5$ of the upper road and with an inner portion thereof corresponding to the width $W_5$ being removed, as a lower road. As a result, for example as shown in FIG. 98(B), two road portions of a width of $W_5/2$ are displayed as lower road portions, indicated at 812, on both sides of the width $W_5$.

Figure 99:
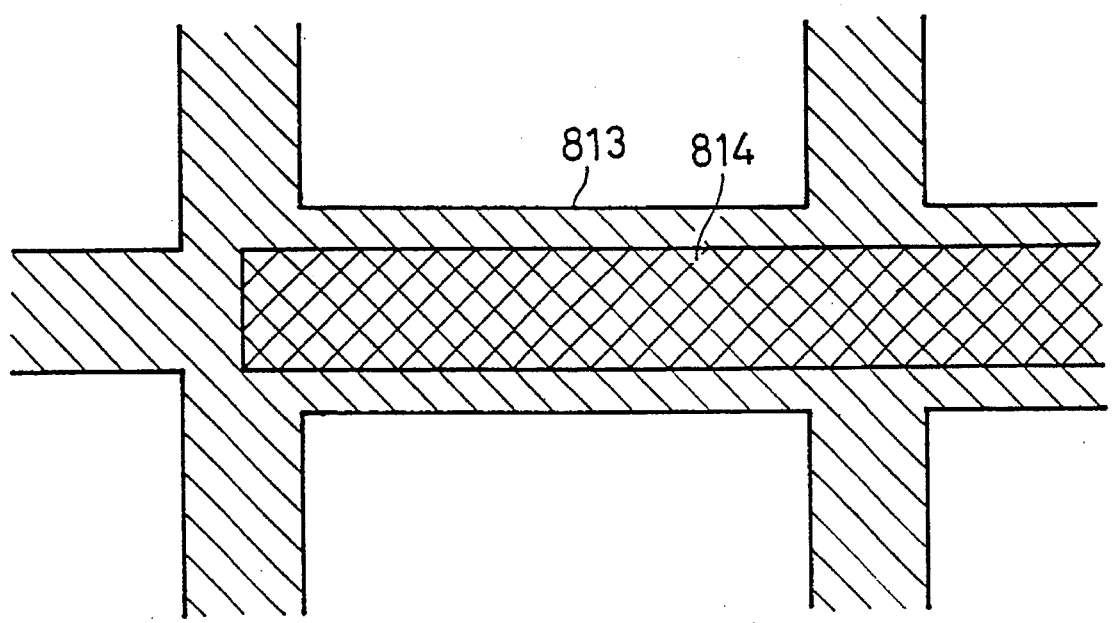
FIG. 99 is an explanatory view showing an example of a portion of a map for display.

The upper road is displayed as it is (steps ST978 and ST979). When the processings of steps ST971 to ST979 have been done with respect to all of the roads to be displayed (step ST980), there is displayed, for example, a map as is shown in FIG. 99 on the display means 5. In the same figure, the numerals 813 and 814 represent lower and upper roads, respectively. Although in this embodiment the display width of the lower road is adjusted, the display width of the upper road may be narrowed with the lower road width as a reference.

As set forth hereinabove, since the traffic information display system of the present invention is constructed as above, there are attained various effects as mentioned below.

(1) In the case where the display system is constructed in such a manner that roads which connect characteristic points are displayed using straight lines, the system is easy to use and safe and capable of providing a map which can be recognized quickly by the user.

(2) In the case where the display system is constructed in such a manner that display coordinates of characteristic points are fetched to display characteristic points and roads, the system can display a deformed map at high speed.

(3) In the case where the display system is constructed in such a manner that display positions of characteristic points are normalized, the system can provide a map easy to see in which the spacing between characteristic points is always above a predetermined value.

(4) Since the display system is constructed in such a manner that display positions of characteristic points are normalized and plural characteristic points are not allocated to one lattice point, the system can provide a map which is easier to see.

(5) In the case where the display system is constructed in such a manner that display positions of characteristic points are normalized and when plural characteristic points are allocated to one lattice point, the lattice point is displayed using a specific symbol, the system can provide a map which is easier to see.

(6) In the case where the display system is constructed in such a manner that a lattice having a lattice spacing larger than the display width of roads to be displayed and the display symbol size of characteristic points displayed is assumed and then display positions of characteristic points are displayed, the system can provide a map which is easy to see and in which symbols representing roads and characteristic points are not displayed in an overlapping state on the screen.

(7) In the case where the display system is constructed in such a manner that each road connecting characteristic points is displayed using a straight line and the present position of a vehicle is also displayed, the system can provide a map which is easy to see and permits the user to also recognize the position and advancing direction of the vehicle.

(8) In the case where the display system is constructed in such a manner that several discrete positions are displayed as display positions of a vehicle on a deformed map, the system can provide a map easy to see and also can diminish the burden on the control means, etc. based on switching of the screen.

(9) In the case where the display system is constructed in such a manner that a distance information from the present position of a vehicle up to a characteristic point present ahead of the present position is displayed on a deformed map, the system can provide a map in which the present position of the vehicle can be recognized more easily.

(10) In the case where the display system is constructed in such a manner that a symbol indicative of a vehicle is flickered on a deformed map with a period proportional to the distance from the present position of the vehicle up to a characteristic point present ahead of the present position, the system can provide a map which permits the user to recognize the present position of the vehicle more quickly.

(11) In the case where the display system is constructed so as to provide a deformed map for the display of a road on which a vehicle is present as well as roads having a predetermined relation to the road and facilities adjoining to those roads, the system can provide a map which permits the user to confirm the present position of the vehicle and a road on which the vehicle is to run, more easily.

(12) In the case where the display system is constructed so as to provide a deformed map for the display of optimum route roads from the present position of a vehicle up to a destination designated by the user as well as facilities adjoining to those roads, the system can provide a map which permits the user to confirm the present position and a road on which the vehicle is to run, more easily.

(13) In the case where the display system is constructed so as to provide a deformed map for the display of a road on which a vehicle is present as well as roads having a predetermined relation to the road and a traffic congestion information relating to those roads, the system can provide a map which permits the user to confirm the present position of the vehicle and present conditions of a road on which the vehicle is to run, more easily.

(14) In the case where the display system is constructed so as to provide a deformed map for the display of optimum display roads from the present position of a vehicle up to a destination designated by the user as well as facilities adjoining to those roads, the system can provide a map which permits the user to confirm the present position of the vehicle and grasp present conditions of a road on which the vehicle is to run, more easily.

(15) In the case where the display system is constructed so as to provide a deformed map for the display of roads of the same level as the level of a road on which a vehicle is present and provide a new such deformed map upon detection of the vehicle having passed a characteristic point, the system can provide a map which permits the user to confirm the present position according to the movement of the vehicle and also confirm a road on which the vehicle is to run, more easily.

(16) In the case where the display system is constructed so as to provide a deformed map for the display of a road on which a vehicle is present as well as roads of the same level as that of the road and facilities adjoining to those roads or a traffic congestion information, etc. relating to those roads, the system can provide a map which permits the user to confirm the present position of the vehicle and a road on which the vehicle is to run, more easily and particularly permits the user to obtain information relating to roads of the same level as the present road and present on an extension of the present road.

(17) In the case where the display system is constructed in such a manner that a deformed map displayed is updated in the unit of an intersection, the system can provide a map which is easier to understand for the user and which permits quick updating of the display screen.

(18) In the case where the display system is constructed so as to restrict the number of intersections displayed on a deformed map to nine at most, the system can provide a map which permits the user to obtain a desired information in an instant.

(19) In the case where the display system is constructed so as to provide a deformed map for the display of roads having a predetermined level or a higher level, the system can provide a map having displayed thereon information which is considered to be at least necessary for the user.

(20) In the case where the display system is constructed in such a manner that intersections to which are connected roads not displayed on a deformed map are displayed using specific symbols, the system can provide a map which permits the user to easily recognize information relating to the connection of low-level roads.

(21) In the case where the display system is constructed so as to provide a deformed map having symbols indicative of undisplayed roads and affixed to intersections to which are connected the undisplayed roads, the system can provide a map which permits the user to recognize information relating to the connection of low-level roads more easily.

(22) In the case where the display system is constructed so as to provide a deformed map for the display of a road on which a vehicle is present as well as roads of the same level as that of the road, the system can provide a map which permits the user to easily obtain information relating to the same-level roads present on an extension of the present road.

(23) In the case where the display system is constructed so as to display roads and destinations of the roads, the system can provide a map which permits the user to recognize the destination of each road more easily.

(24) In the case where the display system is constructed so as to display roads and a destination which has been selected by a predetermined selecting method from among a plurality of destinations corresponding to the roads, the system can provide a map including information which is considered important to the user.

(25) In the case where the display system is constructed so as to display both a destination located far away from the present road and a destination close to the present road, the system can provide a map including information which is important to the user in the route up to a final destination.

(26) In the case where the display system is constructed so as to display specific destinations on a preferential basis, the system can provide a map on which destinations desired by the user are always displayed, thereby permitting the user to grasp the route to the final destination accurately.

(27) In the case where the display system is constructed in such a manner that when the user selects a display destination, a previously selected destination is initialized, it is possible to diminish the selecting operation performed by the user.

(28) In the case where the display system is constructed so as to display the portion of grade separation in an eliminated form of the lower road, the system can provide a map which permits the user to recognize the existence of grade separation easily.

(29) In the case where the display system is constructed in such a manner that of two roads which are in a parallel and vertically spaced relation to each other, the upper road is displayed in a smaller display width than that of the lower road, the system can provide a map which permits the user to recognize the existence of an elevated road easily.

What is claimed is:

1. A traffic information display system comprising:

a map information memory means having road data involving information which represents start and end points of each road and also having characteristic point data involving coordinates relating to start and end points of each road;

a control means which fetches coordinates of start and end points of roads in a predetermined area from said map information memory means and transforms the fetched coordinates into display coordinates;

a deformed map preparing means which receives the display coordinates of start and end points, sets a straight line between each pair of start and end points and prepares a map for display; and a display means for displaying the map prepared by the deformed map preparing means, wherein said control means includes a coordinate normalizing means which transforms the display coordinates of start and end points into intersection coordinates of a plurality of intersections in a nondisplayed lattice superimposed on said display means which are closest to said display coordinates, and thereafter provides the intersectional coordinates to said deformed map preparing means, and wherein said control means further includes a coordinate shifting means which, when there are two sets of display coordinates which are located on a single intersection of the lattice after a transformation made by said coordinate normalizing means, shifts one set of coordinates to be displayed at another intersection of said lattice.

2. A traffic information display system comprising:

a map information memory means having road data involving information which represents start and end points of each road and also having characteristic point data involving coordinates relating to start and end points of each road;

a control means which fetches coordinates of start and end points of roads in a predetermined area from said map information memory means and transforms the fetched coordinates into display coordinates;

a deformed map preparing means which receives the display coordinates of start and end points, sets a straight line between each pair of start and end points and prepares a map for display; and a display means for displaying the map prepared by the deformed map preparing means, wherein said control means includes a coordinate normalizing means which transforms the display coordinates of start and end points into intersection coordinates of a plurality of intersections in a nondisplayed lattice superimposed on said display means which are closest to said display coordinates, and thereafter provides the intersectional coordinates to said deformed map preparing means, and wherein said control means further includes a display symbol indicating means which, when there are two sets of display coordinates located in a single intersection of the lattice after a transformation made by said coordinate normalizing means, provides a command to display a symbol which indicates that two intersections are displayed at the same display coordinates to said deformed map preparing means, and the deformed map preparing means displays start and end points using symbols in accordance with said command.

3. A traffic information display system including:

a map information memory means having road data involving information which represents start and end points of each road and the type of each road and also having characteristic point data involving coordinates relating to start and end points of each road;

a control means for fetching road data of roads present in a predetermined area, the coordinates of start and end points of each road and the type of the road from said map information memory means, for determining a display width of each road and a symbol size of the start and end points of each road on the basis of the type of the road, for transforming the start and end point coordinates into display coordinates, for determining intersection coordinates of a nondisplayed lattice having spacings larger than the display width of each road and the symbol size of the start and end points of each road, and for performing a coordinate transformation to transform said display coordinates into coordinates closest to intersection display coordinates of the intersections of the lattice;

a deformed map preparing means which receives the coordinates closest to the intersection display coordinates, the display width of each road and the symbol size of the start and end points of each road, then sets a straight line of a width corresponding to the display road width between each pair of start and end points, and prepares a map for display having the start and end points of each road represented by symbols of a size corresponding to the determined symbol size; and a display means for displaying the map prepared by said deformed map preparing means.

4. A traffic information display system comprising:

a map information memory means having road data involving information which represents start and end points of each road and also having characteristic point data involving coordinates relating to start and end points of each road;

a control means which fetches coordinates of start and end points of roads in a predetermined area from said map information memory means and transforms the fetched coordinates into display coordinates;

a deformed map preparing means which receives the display coordinates of start and end points, sets a straight line between each pair of start and end points and prepares a map for display; and a display means for displaying the map prepared by the deformed map preparing means, wherein said control means includes a coordinate normalizing means which transforms the display coordinates of start and end points into intersection coordinates of a plurality of intersections in a nondisplayed lattice superimposed on said display means which are closest to said display coordinates, and thereafter provides the intersectional coordinates to said deformed map preparing means, and wherein said control means calculates an angle of each said road relative to a reference direction, replaces said angle with an angle of a closest value out of angles of integer multiples of a predetermined angle, and provides the coordinates of start and end points after the replacement to said deformed map preparing means.

5. A traffic information display system comprising:

a map information memory means having road data involving information which represents start and end points of each road and also having characteristic point data involving coordinates relating to start and end points of each road;

a control means which fetches coordinates of start and end points of roads in a predetermined area from said map information memory means and transforms the fetched coordinates into display coordinates;

a deformed map preparing means which receives the display coordinates of start and end points, sets a straight line between each pair of start and end points and prepares a map for display; and a display means for displaying the map prepared by the deformed map preparing means, wherein said control means includes a coordinate normalizing means which transforms the display coordinates of start and end points into intersection coordinates of a plurality of intersections in a nondisplayed lattice superimposed on said display means which are closest to said display coordinates, and thereafter provides the intersectional coordinates to said deformed map preparing means, and wherein said control means transforms the coordinates of start points and end points so that each segment between a transformed coordinate of a start point and a transformed coordinate of an end point is equal to lengths of other segments.

6. A traffic information display system comprising:

a map information memory means having road data involving information which represents start and end points of each road and also having characteristic point data involving coordinates relating to start and end points of each road;

a control means which fetches coordinates of start and end points of roads in a predetermined area from said map information memory means and transforms the fetched coordinates into display coordinates;

a deformed map preparing means which receives the display coordinates of start and end points, sets a straight line between each pair of start and end points and prepares a map for display; and a display means for displaying the map prepared by the deformed map preparing means, wherein said control means includes a coordinate normalizing means which transforms the display coordinates of start and end points into intersection coordinates of a plurality of intersections in a nondisplayed lattice superimposed on said display means which are closest to said display coordinates, and thereafter provides the intersectional coordinates to said deformed map preparing means, and wherein said control means displays approximations of the lengths of the roads by comparing actual lengths between the start and end points of each road to a plurality of predetermined lengths and by selecting one of said plurality of predetermined lengths having a length closest to that of the actual length for each road; and said control means provides coordinates of start and end points of said selected one of said plurality of predetermined lengths to said deformed map preparing means.

7. A traffic information display system according to claim 4 or claim 6, wherein said control means provides the length of each road to said deformed map preparing means for making a length display on the map for display.

8. A traffic information display system comprising:

map information memory means having road data involving information which represents start and end points of each road and also having characteristic point data involving coordinates relating to start and end points of each road;

a control means which fetches coordinates of start and end points of roads in a predetermined area from said map information memory means and transforms the fetched coordinates into display coordinates;

a deformed map preparing means which receives the display coordinates of start and end points, sets a straight line between each pair of start and end points and prepares a map for display: and a display means for displaying the map prepared by the deformed map preparing means, wherein said control means further includes a flashing means which calculates the distance between the present position of the vehicle and either the start point or the end point located ahead of the vehicle on the road on which the vehicle is present, then determines a flashing period proportional to the thus-calculated distance, and provides a symbol display command and a symbol erase command to said deformed map preparing means in accordance with said deformed map preparing means in accordance with said flashing period, and the deformed map preparing means flashes the symbol added to the map for display in accordance with the symbol display command and the symbol erase command.

9. A traffic information display system including:

a present position and direction detecting means for detecting a present position and a moving direction of a vehicle;

a map information memory means having road data involving information which represents start and end points of each road and also having characteristic point data involving coordinates of start and end points of each road;

a control means which sets a characteristic point ahead of the road on which the vehicle is present, as a reference intersection, sets characteristic points at opposite ends of roads connected to the reference intersection, as primary intersections, further sets characteristic points at opposite ends of roads connected to any of the primary intersections, as secondary intersections, then selects nine or less intersections out of the reference intersection and the primary and secondary intersections, and transforms the coordinates of the selected intersections into display coordinates;

a deformed map preparing means which receives the display coordinates from said control means, sets a straight line between each pair of start and end points and prepares a map for display having the start and end points represented by symbols; and a display means for displaying the map prepared by the said deformed map preparing means.

10. A traffic information display system including:

a map information memory means having map data involving information which represents a relation of connection of roads and information which represents a destination of each road;

a control means which retrieves coordinates of roads present in a predetermined area and information representing destinations of the roads, from said map information memory means, and prepares a map for display involving the roads and information representing destinations; and a display means for displaying the map prepared by said control means, wherein said control means further includes a destination selecting means which, when plural pieces of information indicating destinations are present with respect to a certain road, selects for display one or plural pieces of said information which are of a higher level than a predetermined level; and a present position and direction detecting means for detecting a present position and a moving direction of a vehicle, and said control means further includes a destination selecting means which calculates the distance between the destination of each road and the present position of the vehicle and selects, for display, information indicating a destination in which the calculated distance is larger than a first reference value and whose degree of importance is higher than a first degree of importance and a destination in which the calculated distance is smaller than a second reference value and whose degree of importance is lower than a second degree of importance.

11. A traffic information display system including:

a map information memory means having map data involving information which represents a relation of connection of roads and information which represents a destination of each road:

a control means which retrieves coordinates of roads present in a predetermined area and information representing destinations of the roads, from said map information memory means, and prepares a map for display involving the roads and information representing destinations; and a display means for displaying the map prepared by said control means, wherein said control means further includes a destination selecting means which, when plural pieces of information indicating destinations are present with respect to a certain road, selects for display one or plural pieces of said information which are of a higher level than a predetermined level; and an operating means to which is input a destination, and wherein said control means further includes a specific destination registering means which, when the same destination as the destination input to said operating means is present in the map data, registers said destination, and a specific destination designating means which, when said destination has been registered, determines said destination as a destination for display at the time of displaying the map, while when said destination has not been registered, instructs the retrieval of said map information memory means.

12. A traffic information display system including:

a map information memory means having map data including information which represents relationships indicating whether or not respective roads are connected with other roads and information which represents a relative height of roads with respect to one another, the height of the road representing an amount above ground level of the road;

a control means which, at the time of display, fetches coordinates of roads present in a predetermined area and coordinates of intersections of pairs of roads which have different heights out of the roads present in the predetermined area, from said map information memory means, said pairs of roads having a grade separation portion at which an upper one of said roads passes over a lower one of said roads, said control means then eliminating the grade separation portion of the lower road of said pairs of roads, and then prepares a map for display involving the roads present in the predetermined area; and a display means for displaying the map prepared by said control means.

13. A traffic information display system including:

a map information memory means having map data including information which represents relationships indicating whether or not respective roads are connected with other roads and roads which run parallel and verticality spaced with respect to one another;

a control means which, at the time of display, fetches coordinates of roads present in a predetermined area and roads which run parallel and vertically-spaced to one another out of the roads present in the predetermined area, from said map information memory means, and prepares a map for display involving the roads present in the predetermined area such that a width of a lower road is displayed wider than an upper road of two roads which run parallel and vertically-spaced with respect to one another; and a display means for displaying the map prepared by said control means.

\* \* \* \* \*